(12) United States Patent
Banerjee et al.

(10) Patent No.: US 12,043,553 B2
(45) Date of Patent: Jul. 23, 2024

(54) QUANTUM MATERIAL/VANADIUM OXIDE HETEROSTRUCTURES, METHODS OF MAKING SAME, AND USES THEREOF

(71) Applicants: THE RESEARCH FOUNDATION FOR THE STATE UNIVERSITY OF NEW YORK, Amherst, NY (US); THE TEXAS A&M UNIVERSITY SYSTEM, College Station, TX (US)

(72) Inventors: Sarbajit Banerjee, College Station, TX (US); David F. Watson, Williamsville, NY (US); Justin L. Andrews, West Lafayette, IN (US); Junsang Cho, Mishawaka, IN (US); Nuwanthi Suwandaratne, Amherst, NY (US); Aaron Sheng, Buffalo, NY (US)

(73) Assignees: THE TEXAS A&M UNIVERSITY SYSTEM, College Station, TX (US); THE RESEARCH FOUNDATION FOR THE STATE UNIVERSITY OF NEW YORK, Amherst, NY (US)

( * ) Notice: Subject to any disclaimer, the term of this patent is extended or adjusted under 35 U.S.C. 154(b) by 396 days.

Patent file contains an affidavit/declaration under 37 CFR 1.130(b).

(21) Appl. No.: 17/084,746

(22) Filed: Oct. 30, 2020

(65) Prior Publication Data
US 2021/0130188 A1    May 6, 2021

Related U.S. Application Data

(60) Provisional application No. 62/929,021, filed on Oct. 31, 2019.

(51) Int. Cl.
*C01G 31/02* (2006.01)
*C01G 19/02* (2006.01)
(Continued)

(52) U.S. Cl.
CPC ............ *C01G 31/02* (2013.01); *C01G 19/02* (2013.01); *C01G 53/40* (2013.01); *C25B 1/02* (2013.01);
(Continued)

(58) Field of Classification Search
CPC ........ C01G 19/02; C01G 31/02; C01G 53/40; C01P 2004/16
See application file for complete search history.

(56) References Cited

U.S. PATENT DOCUMENTS

| | | | |
|---|---|---|---|
| 11,292,962 B2 * | 4/2022 | Banerjee | C01G 31/02 |
| 11,870,067 B2 * | 1/2024 | Banerjee | H01M 4/131 |

(Continued)

FOREIGN PATENT DOCUMENTS

| | | | | |
|---|---|---|---|---|
| CN | 103351027 A | * | 10/2013 | |
| CN | 105382268 A | * | 3/2016 | |
| WO | WO-2019129256 A1 | * | 7/2019 | H01L 33/06 |

OTHER PUBLICATIONS

Pelcher et al., Integrating β-Pb0.33V2O5 Nanowires with CdSe Quantum Dots:Toward Nanoscale Heterostructures with Tunable Interfacial Energetic Offsets for Charge Transfer, Chem. Mater. 2015, 27, 2468-2479.*

(Continued)

*Primary Examiner* — Jun Li
(74) *Attorney, Agent, or Firm* — SALIWANCHIK, LLOYD & EISENSCHENK

(57) ABSTRACT

The subject invention pertains to the synthesis and characterization of $V_2O_5$/CdE NW/QD heterostructures. The $V_2O_5$/CdE heterostructures are versatile new materials constructs for light harvesting, charge separation, and the photocatalytic production of solar fuels; polymorphism of $V_2O_5$ and compositional alloying of both components provides for a substantial design space for tuning of interfacial energy (Continued)

offsets. Also provided are a new class of type-II heterostructures composed of cadmium chalcogenide QDs (CdE where E=S, Se, or Te) and α-$V_2O_5$ nanowires (NWs). The synthesis and characterization of $V_2O_5$/CdE NW/QD heterostructures, prepared via successive ionic layer adsorption and reaction (SILAR) and linker-assisted assembly (LAA), the characterization of their photoinduced charge-transfer reactivity using transient absorption spectroscopy, and their performance in the photocatalytic reduction of protons to hydrogen are also disclosed.

**10 Claims, 34 Drawing Sheets
(15 of 34 Drawing Sheet(s) Filed in Color)**

(51) Int. Cl.
  *C01G 53/00*  (2006.01)
  *C25B 1/02*  (2006.01)
  *C25B 1/55*  (2021.01)
  *B82Y 30/00*  (2011.01)
  *B82Y 40/00*  (2011.01)
  *C25B 1/00*  (2021.01)
(52) U.S. Cl.
  CPC .................. *C25B 1/55* (2021.01); *B82Y 30/00* (2013.01); *B82Y 40/00* (2013.01); *C01P 2004/16* (2013.01); *C01P 2004/61* (2013.01); *C01P 2004/62* (2013.01); *C01P 2004/64* (2013.01); *C01P 2004/82* (2013.01); *C01P 2006/40* (2013.01)

(56) References Cited

U.S. PATENT DOCUMENTS

| | | | | |
|---|---|---|---|---|
| 2013/0101848 | A1* | 4/2013 | Banerjee | C09K 9/00 977/773 |
| 2020/0321613 | A1* | 10/2020 | Banerjee | H01M 10/0568 |
| 2021/0083144 | A1* | 3/2021 | Xiang | H01L 33/06 |

OTHER PUBLICATIONS

Machine translation of Qin (CN103351027A), publication date Oct. 16, 2013.*
Sutar et al. (Nanostructured Nickel Doped Vanadium Pentoxide Thin Films with Improved Surface Morphology and Electric Conductivity for Supercapacitor Applications, International Journal of Scientific & Engineering Research, vol. 8, Issue 2, Feb. 2017).*
Machine translation of Xiong et al. (CN105382268A), publication date Mar. 9, 2016.*
Marley et al., Transformers: the changing phases of low-dimensional vanadium oxide bronzes, Chem. Commun., 2015,51, 5181-5198.*
Alivisatos, A.P. et al. "Electron-vibration coupling in semiconductor clusters studied by resonance Raman spectroscopy" *J. Chem. Phys.*, Apr. 1, 1989, pp. 3463-3468, vol. 90, No. 7.
Amirtharaj, P.M. et al. "Raman scattering study of the properties and removal of excess Te on CdTe surfaces" *Appl. Phys. Lett.*, Oct. 1, 1984, pp. 789-791, vol. 45, No. 7.
Anderson, N.C. et al. "Soluble, Chloride-Terminated CdSe Nanocrystals: Ligand Exchange Monitored by $^1H$ and $^{31}P$ NMR Spectroscopy" *Chem. Mater.*, 2013, pp. 69-76, vol. 25.
Anderson, N.C. et al. "Ligand Exchange and the Stoichiometry of Metal Chalcogenide Nanocrystals: Spectroscopic Observation of Facile Metal-Carboxylate Displacement and Binding" *J. Am. Chem. Soc.*, 2013, pp. 18536-18548, vol. 135.
Andrews, J.L. et al. "Hole Extraction by Design in Photocatalytic Architectures Interfacing CdSe Quantum Dots with Topochemically Stabilized Tin Vanadium Oxide" *J. Am. Chem. Soc.*, 2018, pp. 17163-17174, vol. 140, No. 49.

Banerjee, S. et al. "Raman Microprobe Analysis of Elastic Strain and Fracture in Electrophoretically Deposited CdSe Nanocrystal Films" *Nano Letters*, 2006, pp. 175-180, vol. 6, No. 2.
Bera, D. et al. "Quantum Dots and Their Multimodal Applications: A Review" *Materials*, 2010, pp. 2260-2345, vol. 3.
Blaha, P. et al. "WIEN2k: An APW+lo program for calculating the properties of solids" *J. Chem. Phys.*, 2020, pp. 1-30, vol. 152.
Boles, M.A. et al. "The surface science of nanocrystals" *Nature Materials*, Feb. 2016, pp. 141-153, erratum p. 364, vol. 15.
Brus, L.E. "Electron-electron and electron-hole interactions in small semiconductor crystallites: The size dependence of the lowest excited electronic state" *J. Chem. Phys.*, May 1, 1984, pp. 4403-4409, vol. 80, No. 9.
Burda, C. et al. "The pump power dependence of the femtosecond relaxation of CdSe nanoparticles observed in the spectral range from visible to infrared" *J. Chem. Phys.*, Mar. 1, 2002, pp. 3828-3833, vol. 116, No. 9.
Chan, Y.-L. et al. "Synthesis of $V_2O_5$ Nanoflakes on PET Fiber as Visible-Light-Driven Photocatalysts for Degradation of RhB Dye" *Journal of Catalysts*, 2014, pp. 1-7, vol. 2014, Article ID 370696.
Cho, J. et al. "The Middle Road Less Taken: Electronic-Structure-Inspired Design of Hybrid Photocatalytic Platforms for Solar Fuel Generation" *Acc. Chem. Res.*, 2019, pp. 645-655, vol. 52, No. 3.
Coughlin, K.M. et al. "Aqueous-Phase Linker-Assisted Attachment of Cysteinate($2^−$)-Capped CdSe Quantum Dots to $TiO_2$ for Quantum Dot-Sensitized Solar Cells" *ACS Appl. Mater. Interfaces*, 2013, pp. 8649-8654, vol. 5.
Dalui, A. et al. "Chemical Tailoring of Band Offsets at the Interface of ZnSe—CdS Heterostructures for Delocalized Photoexcited Charge Carriers" *J. Phys. Chem. C*, 2016, pp. 10118-10128, vol. 120.
De Jesus, L.R. et al. "Mapping polaronic states and lithiation gradients in individual $V_2O_5$ nanowires" *Nature Communications*, 2016, pp. 1-9, vol. 7, No. 12022.
Dibbell, R.S. et al. "Distance-Dependent Electron Transfer in Tethered Assemblies of CdS Quantum Dots and $TiO_2$ Nanoparticles" *J. Phys. Chem. C*, 2009, pp. 3139-3149, vol. 113.
Dibbell, R.S. et al. "Excited-State Electron Transfer from CdS Quantum Dots to $TiO_2$ Nanoparticles via Molecular Linkers with Phenylene Bridges" *J. Phys. Chem. C*, 2009, pp. 18643-18651, vol. 113.
Freire, P.T.C. et al. "Pressure Raman scattering of CdTe quantum dots" *Physical Review B*, Mar. 15, 1997, pp. 6743-6746, vol. 55, No. 11.
Graff, B.M. et al. "Electron Transfer in Nanoparticle Dyads Assembled on a Colloidal Template" *J. Am. Chem. Soc.*, 2016, pp. 13260-13270, vol. 138.
Gross, D. et al. "Charge Separation in Type II Tunneling Structures of Close-packed CdTe and CdSe Nanocrystals" *Nano Letters*, 2008, pp. 1482-1485, vol. 8, No. 5.
Han, K. et al. "A complete inorganic colour converter based on quantum-dot-embedded silicate glasses for white light-emitting-diodes" *Chem. Commun.*, 2016, pp. 3564-3567, vol. 52.
Hines, D.A. et al. "Predicting the Rate Constant of Electron Tunneling Reactions at the CdSe-$TiO_2$ Interface" *J. Phys. Chem. B.*, 2015, pp. 7439-7446, vol. 119.
Horrocks, G.A. et al. "Finite size effects on the structural progression induced by lithiation of $V_2O_5$: a combined diffraction and Raman spectroscopy study" *J. Mater. Chem. A*, 2013, pp. 15265-15277, vol. 1.
Huang, J. et al. "Exciton Dissociation in CdSe Quantum Dots by Hole Transfer to Phenothiazine" *J. Phys. Chem. C*, 2008, pp. 19734-19738, vol. 112, No. 49.
Jalilehvand, F. et al. "Cadmium(II) Complex Formation with Cysteine and Penicillamine" *Inorg. Chem.*, 2009, pp. 5758-5771, vol. 48, No. 13.
Kamat, P.V. "Quantum Dot Solar Cells. Semiconductor Nanocrystals as Light Harvesters" *J. Phys. Chem. C*, 2008, pp. 18737-18753, vol. 112, No. 48.
Kim, S. et al. "Type-II Quantum Dots: CdTe/CdSe(Core/Shell) and CdSe/ZnTe(Core/Shell) Heterostructures" *J. Am. Chem. Soc.*, 2003, pp. 11466-11467, vol. 125, No. 38.

(56) References Cited

OTHER PUBLICATIONS

Kim, Y.-K. et al. "Control of adsorption and alignment of $V_2O_5$ nanowires via chemically functionalized patterns" *Nanotechnology*, 2007, pp. 1-6, vol. 18.

Klimov, V.I. et al. "Electron and hole relaxation pathways in semiconductor quantum dots" *Physical Review B*, Nov. 15, 1999, pp. 13740-13749, vol. 60, No. 19.

Kocevski, V. et al. "First-principles study of the influence of different interfaces and core types on the properties of CdSe/CdS core-shell nanocrystals" *Scientific Reports*, 2015, pp. 1-12, vol. 5, No. 10865.

Kodaimati, M.S. et al. "Viewpoint: Challenges in Colloidal Photocatalysis and Some Strategies for Addressing Them" *Inorg. Chem.*, 2018, pp. 3659-3670, vol. 57.

Kundu, S. et al. "Nanoscale Strategies for Light Harvesting" *Chem. Rev.*, 2017, pp. 712-757, vol. 117.

Liu, H.-X. et al. "Lattice structures and electronic properties of $WZ$-$CuInS_2$/$WZ$-CdS interface from first-principles calculations" *Chin. Phys. B*, 2016, pp. 123101-1-123101-10, vol. 25, No. 12.

Marley, P.M. et al. "Emptying and filling a tunnel bronze" *Chem. Sci.*, 2015, pp. 1712-1718, vol. 6.

Menéndez-Proupin, E. et al. "Electronic structure of CdTe using GGA + $U^{SIC}$" *Physica B*, 2014, pp. 119-123, vol. 452.

Milleville, C.C. et al. "Directional Charge Transfer Mediated by Mid-Gap States: A Transient Absorption Spectroscopy Study of CdSe Quantum Dot/$\beta$-$Pb_{0.33}V_2O_5$ Heterostructures" *J. Phys. Chem. C*, 2016, pp. 5221-5232, vol. 120.

Morris-Cohen, A.J. et al. "Simultaneous Determination of the Adsorption Constant and the Photoinduced Electron Transfer Rate for a Cds Quantum Dot—Viologen Complex" *J. Am. Chem. Soc.*, 2011, pp. 10146-10154, vol. 133.

Morris-Cohen, A.J. et al. "Chemical, Structural, and Quantitative Analysis of the Ligand Shells of Colloidal Quantum Dots" *Chem. Mater.*, 2013, pp. 1155-1165, vol. 25.

Myung, S. et al. "'Focused' assembly of $V_2O_5$ nanowire masks for the fabrication of metallic nanowire sensors" *Nanotechnology*, 2007, pp. 1-4, vol. 18.

Nevins, U.S. et al. "Attachment of CdSe Nanoparticles to $TiO_2$ via Aqueous Linker-Assisted Assembly: Influence of Molecular Linkers on Electronic Properties and Interfacial Electron Transfer" *ACS Appl. Mater. Interfaces*, 2011, pp. 4242-4253, vol. 3.

Othonos, A. et al. "Ultrafast transient spectroscopy and photoluminescence properties of $V_2O_5$ nanowires" *Appl. Phys. Lett.*, 2013, pp. 133112-1-13112-4, vol. 103.

Pan, Z. et al. "Quantum dot-sensitized solar cells" *Chem. Soc. Rev.*, 2018, pp. 7659-7702, vol. 47.

Pelcher, K.E. et al. "Integrating $\beta$-$Pb_{0.33}V_2O_5$ Nanowires with CdSe Quantum Dots: Toward Nanoscale Heterostructures with Tunable Interfacial Energetic Offsets for Charge Transfer" *Chem. Mater.*, 2015, pp. 2468-2479, vol. 27.

Pelcher, K.E. et al. "Programming Interfacial Energetic Offsets and Charge Transfer in B-$Pb_{0.33}V_2O_5$/Quantum-Dot Heterostructures: Tuning Valence-Band Edges to Overlap with Midgap States" *J. Phys. Chem. C*, 2016, pp. 28992-29001, vol. 120.

Rawalekar, S. et al. "Ultrafast Charge Carrier Relaxation and Charge Transfer Dynamics of CdTe/CdS Core-Shell Quantum Dots as Studied by Femtosecond Transient Absorption Spectroscopy" *J. Phys. Chem. C*, 2010, pp. 1460-1466, vol. 114, No. 3.

Rossetti, R. et al. "Quantum size effects in the redox potentials, resonance Raman spectra, and electronic spectra of CdS crystallites in aqueous solution" *J. Chem. Phys.*, Jul. 15, 1983, pp. 1086-1088, vol. 79, No. 2.

Schwarz, K. et al. "Solid state calculations using WIEN2k" *Computational Materials Science*, 2003, pp. 259-273, vol. 28.

Selinsky, R.S. et al. "Quantum dot nanoscale heterostructures for solar energy conversion" *Chem. Soc. Rev.*, 2013, pp. 2963-2985, vol. 42.

Sellers, D.G. et al. "Excited-State Charge Transfer within Covalently Linked Quantum Dot Heterostructures" *J. Phys. Chem. C*, 2015, pp. 27737-27748, vol. 119.

Singhal, P. et al. "Ultrafast Hole/Electron Transfer Dynamics in a CdSe Quantum Dot Sensitized by Pyrogallol Red: A Super-Sensitization System" *J. Phys. Chem. C*, 2014, pp. 16358-16365, vol. 118.

Sun, J. et al. "Composite photoanodes for photoelectrochemical solar water splitting" *Energy Environ. Sci.*, 2010, pp. 1252-1261, vol. 3.

Tvrdy, K. et al. "Photoinduced electron transfer from semiconductor quantum dots to metal oxide nanoparticles" *PNAS*, Jan. 4, 2011, pp. 29-34, vol. 108, No. 1.

Van De Walle, C.G. et al. "Universal alignment of hydrogen levels in semiconductors, insulators and solutions" *Nature*, Jun. 5, 2003, pp. 626-628, vol. 423.

Velazquez, J.M. et al. "Near Edge X-ray Absorption Fine Structure Spectroscopy Studies of Single-Crystalline $V_2O_5$ Nanowire Arrays" *J. Phys. Chem. C*, 2009, pp. 7639-7645, vol. 113, No. 18.

Wang, P. et al. "Shell Thickness Engineering Significantly Boosts the Photocatalytic $H_2$ Evolution Efficiency of CdS/CdSe Core/Shell Quantum Dots" *ACS Appl. Mater. Interfaces*, 2017, pp. 35712-35720, vol. 9.

Watson, D.F. "Linker-Assisted Assembly and Interfacial Electron-Transfer Reactivity of Quantum Dot-Substrate Architectures" *J. Phys. Chem. Lett.*, 2010, pp. 2299-2309, vol. 1.

Wu, M. et al. "Electron Transfer and Fluorescence Quenching of Nanoparticle Assemblies" *J. Phys. Chem. C*, 2010, pp. 5751-5759, vol. 114, No. 13.

Yu, W.W. et al. "Experimental Determination of the Extinction Coefficient of CdTe, CdSe, and CdS Nanocrystals" *Chem. Mater.*, 2003, pp. 2854-2860, vol. 15, No. 14.

Yue, S. et al. "Metal chalcogenide quantum dot-sensitized 1D-based semiconducting heterostructures for optical-related applications" *Energy Environ. Sci.*, 2019, pp. 1454-1494, vol. 12.

Zhu, H. et al. "Wave Function Engineering for Ultrafast Charge Separation and Slow Charge Recombination in Type II Core/Shell Quantum Dots" *J. Am. Chem. Soc.*, 2011, pp. 8762-8771, vol. 133.

Zhu, H. et al. "Wavefunction engineering in quantum confined semiconductor nanoheterostructures for efficient charge separation and solar energy conversion" *Energy Environ. Sci.*, 2012, pp. 9406-9418, vol. 5.

\* cited by examiner

QUANTUM MATERIAL/VANADIUM OXIDE HETEROSTRUCTURES, METHODS OF MAKING SAME, AND USES THEREOF

CROSS-REFERENCE TO RELATED APPLICATION

This application claims the benefit of U.S. Provisional Application Ser. No. 62/929,021, filed Oct. 31, 2019, the disclosure of which is hereby incorporated by reference in its entirety, including all figures, tables and amino acid or nucleic acid sequences.

STATEMENT REGARDING FEDERALLY SPONSORED RESEARCH

This invention was made with government support under contract nos. 1627197 and 1626967 awarded by the National Science Foundation and 80NSSC17K0182 awarded by the National Aeronautics and Space Administration. The government has certain rights in the invention.

BACKGROUND OF THE INVENTION

Tackling the complex challenge of harvesting solar energy to generate energy-dense fuels such as hydrogen requires the design of photocatalytic nanoarchitectures interfacing components that synergistically mediate a closely interlinked sequence of light-harvesting, charge separation, charge/mass transport, and catalytic processes. The design of such architectures requires consideration of both thermodynamic offsets and interfacial charge-transfer kinetics to ensure long-lived charge carriers that can be delivered at low overpotentials to the appropriate catalytic sites while mitigating parasitic reactions such as photocorrosion.

Nanoscale semiconductor heterostructures are intriguing materials architectures for light harvesting, excited-state charge transfer, and solar energy conversion. Interfacial energetics within heterostructures dictate the thermodynamic favorability of excited-state charge-transfer processes that can ultimately lead to the generation of electrical power or the storage of energy in chemical bonds. Type-II energetic offsets, in which the conduction- and valence-band edges of one semiconducting component lie at higher energies than the corresponding band edges of the other component, are desirable. This staggered bandgap alignment renders the separation of photogenerated electrons and holes thermodynamically favorable following the photoexcitation of either constituent semiconductor.

BRIEF SUMMARY OF THE INVENTION

This application provides for the synthesis and characterization of $V_2O_5$/CdE NW/QD heterostructures. The $V_2O_5$/CdE heterostructures are versatile new materials constructs for light harvesting, charge separation, and the photocatalytic production of solar fuels; polymorphism of $V_2O_5$ and compositional alloying of both components provides for a substantial design space for tuning of interfacial energy offsets. Detailed herein is the design and synthesis of nanowire/quantum dot heterostructures with interfacial electronic structure specifically tailored to promote light-induced charge separation and photocatalytic proton reduction. We report here on a new class of type-II heterostructures composed of cadmium chalcogenide QDs (CdE where E=S, Se, or Te) and $\alpha$-$V_2O_5$ nanowires (NWs). We synthesized a new class of heterostructures by depositing CdS, CdSe, or CdTe quantum dots (QDs) onto $\alpha$-$V_2O_5$ nanowires (NWs) via either successive ionic layer adsorption and reaction (SILAR) or linker-assisted attachment (LAA). The synthesis and characterization of $V_2O_5$/CdE NW/QD heterostructures, prepared via successive ionic layer adsorption and reaction (SILAR) and linker-assisted assembly (LAA), the characterization of their photoinduced charge-transfer reactivity using transient absorption spectroscopy, and their performance in the photocatalytic reduction of protons to hydrogen are also disclosed. For a fuller understanding of the nature and objects of the disclosure, reference should be made to the following detailed description taken in conjunction with the accompanying figures and examples.

BRIEF DESCRIPTION OF THE DRAWINGS

The patent or application file contains at least one drawing executed in color. Copies of this patent or patent application publication, with color drawing(s), will be provided by the Office upon request and payment of the necessary fee.

(FIG. 2G) Indexed SAED pattern acquired for heterostructures with individual diffraction spots indexed to β-$Sn_{0.23}V_2O_5$ and broad rings indexed to CdSe QDs.

BRIEF DESCRIPTION OF THE TABLES

Table 1. Energetic positioning of the valence band edges used to create FIG. 1, FIG. 3G, FIG. 3H, and FIG. 14.

Table 2. Refinement statistics, lattice parameters, and atom positions as obtained from Rietveld refinement of pattern for β-Sn$_{0.23}$V$_2$O$_5$ depicted in FIG. 2B.

Table 3. Bond angles and lengths for MO$_x$ polyhedra (M=V, Sn) as obtained from Rietveld refinement of pattern for β-Sn$_{0.23}$V$_2$O$_5$ depicted in FIG. 2B.

Table 4. Refinement statistics, lattice parameters, and atom positions as obtained from Rietveld refinement of pattern for β-Ni$_{0.331}$V$_2$O$_5$ depicted in FIG. 9.

Table 5. Bond angles and lengths for MO$_x$ (M=V, Ni) polyhedral as obtained from Rietveld refinement of pattern for β-Ni$_{0.331}$V$_2$O$_5$ depicted in FIG. 9.

Figure 9:
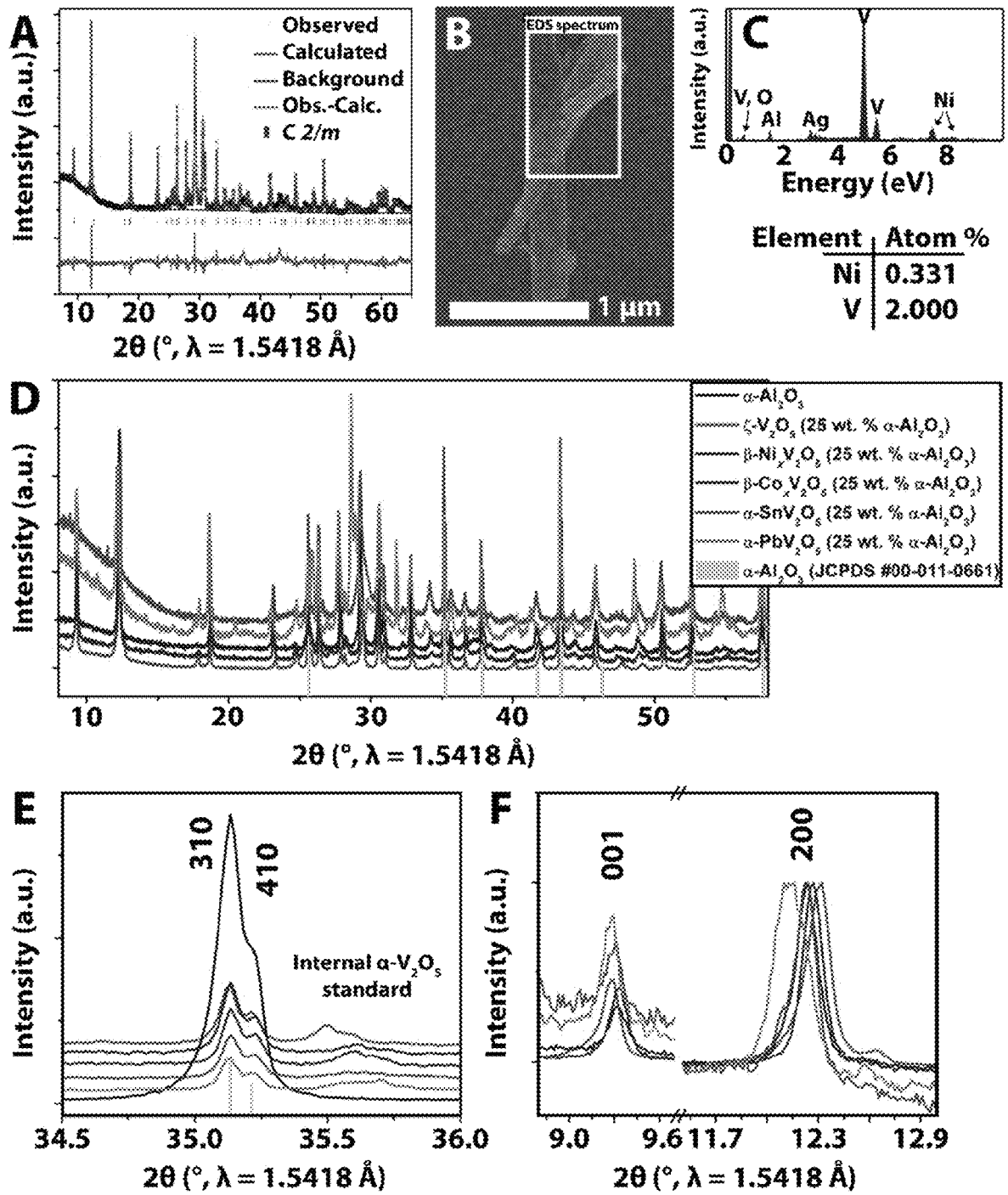
FIG. 9. Structural and morphological characterization of metastable β-$M_xV_2O_5$ bronzes (M=Ni, Co, Sn) prepared by the versatile oxalate decomposition route. (A) Rietveld refinement of powder XRD data collected for β-$Ni_xV_2O_5$ (x of ca. 0.331). Black crosses correspond to collected data, the red line is the calculated pattern, the blue line is the background function, and the teal line plots the residual of the refinement. Calculated reflections are marked below the observed data with vertical purple tick marks. Rietveld refinement statistics, lattice parameters, atom positions, and bond angles are listed in Tables 4 and 5. (B) SEM image of β-$Ni_{0.331}V_2O_5$ on a $Si/SiO_2$ substrate. (C) Energy dispersive X-ray spectrum collected across the region of the wire indicated by the purple box in (B). The integrated peak areas of the spectrum indicate a stoichiometry of β-$Ni_{0.331}V_2O_5$. (D) Powder X-ray diffraction patterns collected for various transition (Ni, Co) and post-transition metal (Sn, Pb)-intercalated materials. The powder diffraction patterns are normalized to the intensity of the (11-1) reflection positioned at ca. 2θ=26.27° to better facilitated comparison of changes in peak location and intensity. All the powder diffraction patterns shown in (D) have been collected with the inclusion of an internal standard (α-$Al_2O_3$, 25 wt. %) to verify shifts in the reflections. The (310) and (410) reflections of α-$Al_2O_3$ are shown in (E). (F) Expanded view of the 2θ region between 8.8-12.8° shown for XRD patterns of ζ-$V_2O_5$, β-$Ni_{0.331}V_2O_5$, β-$Co_{0.270}V_2O_5$, β-$Sn_{0.225}V_2O_5$, and β-$Pb_{0.22}V_2O_5$. The solid tick marks denote the maxima of the (200) reflection for each pattern and illustrate that the expansion of the tunnels is proportional to the ionic radii of the inserted cations.[18]

Table 6. Tabulated lattice parameters for β-M$_x$V$_2$O$_5$ materials (M=Ni, Co, Sn, and Pb) obtained by fitting lattice parameters of XRD data, as depicted in FIG. 9.

Table 7. Kinetic fitting parameters and calculated average lifetimes for picosecond TA decay traces of β-Sn$_{0.23}$V$_2$O$_5$/CdSe and β-Sn$_{0.23}$V$_2$O$_5$/CdTe heterostructures.

Table 8. Amplitude-weighted average lifetimes ($\langle\tau\rangle$) from nanosecond-timescale TA decay traces for SILAR-derived α-V$_2$O$_5$/CdS, α-V$_2$O$_5$/CdSe, and α-V$_2$O$_5$/CdTe heterostructures. These values of $\langle\tau\rangle$ are indicative of charge-recombination timescales.

Table 9. Amplitude-weighted average lifetimes ($\langle\tau\rangle$) from nanosecond-timescale TA decay traces for α-V$_2$O$_5$ NWs and LAA-derived α-V$_2$O$_5$/CdS and α-V$_2$O$_5$/CdSe heterostructures. These values of $\langle\tau\rangle$ for heterostructures are indicative of charge-recombination timescales.

DETAILED DISCLOSURE OF THE INVENTION

Although claimed subject matter will be described in terms of certain examples, other examples, including examples that do not provide all of the benefits and features set forth herein, are also within the scope of this disclosure. Various structural, logical, process step, and electronic changes may be made without departing from the scope of the disclosure.

Ranges of values are disclosed herein. The ranges set out a lower limit value and an upper limit value. Unless otherwise stated, the ranges include the lower limit value, the upper limit value, and all values between the lower limit value and the upper limit value, including, but not limited to, all values to the magnitude of the smallest value (either the lower limit value or the upper limit value).

The present disclosure provides vanadium oxide compositions and quantum-confined material/vanadium oxide heterostructures. The present disclosure also provides methods of making the quantum-confined material/vanadium oxide structures and uses thereof.

In an aspect, the present disclosure provides vanadium oxide compositions. In various examples, the composition is vanadium oxide (e.g., V$_2$O$_5$) with a plurality of intercalated metal cations. The intercalated cations occupy/are sited at periodic sites in the vanadium oxide structure. The intercalated cations do not occupy/are not sited at random sites. Non-limiting examples of vanadium oxide materials are provided in the Examples and in the sample embodiments.

In an aspect, the present disclosure provides quantum-confined material/vanadium oxide heterostructures (which may be referred to as "heterostructures"). In various examples, a quantum-confined material/vanadium oxide heterostructure of the present disclosure is made by a method of the present disclosure. Non-limiting examples of heterostructures are provided in the Examples and in the sample embodiments.

In an aspect, the present disclosure provides methods of making quantum-confined material/vanadium oxide heterostructures. The methods may be dry methods (no solvent used). Non-limiting examples of methods of making heterostructures of the present disclosure are provided in the Examples and in the sample embodiments.

In an aspect, the present disclosure provides uses of quantum-confined material/vanadium oxide heterostructures of the present disclosure. Non-limiting uses of heterostructures include use in various devices, photocatalysis methods, photoelectrocatalysis methods, methods of making hydrogen, and the like. Non-limiting examples of uses of heterostructures of the present disclosure are provided in the Examples and in the sample embodiments.

In various examples, the present disclosure provides a method for producing hydrogen. In the methods, a combination of one or more quantum-confined material/vanadium oxide heterostructure(s), catalyst, and a source of electrons (e.g., electron donor), which may or may not be present in the aqueous medium, in an aqueous medium is exposed to electromagnetic radiation (e.g., electromagnetic radiation in the solar region of the spectrum) resulting in the production of hydrogen. Without intending to be bound by any particular theory, it is considered that transfers an electron to the catalyst that then reduces a proton resulting in formation of hydrogen. It may be desirable to use mixtures of heterostructures. For example, mixtures of heterostructures where the heterostructures have different or at least partially different electromagnetic radiation (e.g., solar spectrum) absorption profiles are used. There must be the opportunity for contact between the catalyst and a photoexcited more quantum-confined material/vanadium oxide heterostructure (s). This contact can be physical contact, as exists in solution, or electrical contact.

In various examples, a method for producing hydrogen comprises a) contacting one or more heterostructure(s) and a catalyst in the presence of a source of electrons (e.g., a sacrificial electron donor) in an aqueous solution; and b) exposing the mixture from a) to electromagnetic radiation, such that hydrogen is produced.

The catalyst is any metal complex that can accept an electron from a photoexcited quantum-confined material/vanadium oxide heterostructure. Mixtures of catalysts (e.g., two or more distinct catalysts) can be used. Transition metal salts can be used. Transitions metal salts of group 6 to group 11 metals can be used. Transition metal salts of 3d metals and 4d metals (e.g., bioavailable metals such as Mo) can be used. Suitable transition metal salts include Cr, Mn, Fe, Co, Ni, Cu, Mo, Ru, Rh, Pd, Ag, W, Os, Ir, Pt, and Au salts. Mixtures of salts can be used. The salts can have one or more ligands. The ligands can be organic ligands. The ligands can be monodentate or polydentate. Examples of suitable monodentate and polydentate ligands include thiolate and other sulfur ligands, as well as substituted pyridine, imine, amine, phosphine, oxime, and carboxylate ligands. The counterions are, for example, nitrate, sulfate, chloride, or any other related ion. The salts are soluble in an aqueous medium (e.g., water) or in mixed aqueous/organic solvents. It is desirable that the catalyst have at least 1 micromolar solubility. For example, nickel catalysts having a solubility of 1 μM to 40 μM, including all values to the uM and ranges therebetween, are used. In an embodiment, the catalyst does not comprise a Noble metal (ruthenium, rhodium, palladium, silver, osmium, iridium, platinum, or gold).

The catalyst may be a monometallic catalyst (i.e., comprise a single metal center) or a multimetallic (e.g., bimetallic) catalyst (i.e., comprise two or more metal centers). The ligands can be monodentate ligands or multidentate ligands. The catalyst may have a 1:1 metal:ligand composition or have another ligand to metal ratio.

The catalysts may be cationic or anionic metal-ligand complexes. The catalysts can have one or more redox active ligands. For example, the catalysts one or more MPA, benzenedithiolate (bdt), dithiolene, pyridinethiolate ligands, or a combination thereof.

In various examples, the catalyst is a $Ni^{2+}$ catalyst. Non-limiting examples of $Ni^{2+}$ catalysts include Ni(3-MPA) complexes, Ni(II)(DHLA) complexes, $(Et_4N)Ni(pyS)_3$, $Ni(pySH)_4(NO_3)_2$, $Ni(mpo)_2$ (mpo=2-mercaptopyridine N-oxide), $Ni(NO_3)_2$, $NiCl_2$, $Ni(acetate)_2$, $Ni(P_2N_2)_2$, and the like. Other non-limiting examples of suitable catalysts include $Co(BF_4)_2$, $Co(C_{1-2}bdt)_2$, $CuCl_2$, $K_2PtCl_4$, and the like.

The catalyst may formed in situ from a metal source and ligand. The metal source may be a metal salt. Examples of metal salt include, but are not limited to, metal chlorides, nitrates, carboxylates (e.g., acetates and the like), hydrates thereof, and the like. Non-limiting examples of suitable salts include nickel (II), copper (II), cobalt (II), iron (II) salts, and the like.

A wide range of quantum-confined material/vanadium oxide heterostructure(s) concentration and/or catalyst concentrations can be used. In order to increase the production of hydrogen, it can be desirable to select the concentration of the quantum-confined material/vanadium oxide heterostructure(s) and/or catalyst(s).

The source of electrons may reduce the photoexcited quantum-confined material/vanadium oxide heterostructure(s). It is desirable the source of electrons be inexpensive. Mixtures of electron sources can be used. The source of electrons can be an internal (i.e., a part of the heterostructure(s)/catalyst(s) mixture) electron donor. The internal source of electrons may form a homogeneous mixture with the heterostructure(s) and catalyst(s). Internal sacrificial electron donors may be used. A fixed amount of source of electrons may be used. An additional source of electrons may be added to the mixture to provide a continuous hydrogen production. Hydrogen production may be continued as long as sufficient source of electrons is added to the mixture. For example, the sacrificial electron donor is present at concentrations of 0.1 M to 1 M, including all values to 0.1 M and ranges therebetween.

Examples of suitable internal sacrificial electron donors include, but are not limited to, molecular electron donors such as tertiary amines having alpha C—H bonds (e.g., triethylamine (TEA), triethanolamine (TEOA), ethylenediamine tetraacetic acid (EDTA), and the like), hydroquinones (e.g., 1,4-dihydroxybenzene, and the like), carbohydrates (e.g., glucose, fructose, and the like), carboxylic acids/carboxylates (e.g., lactic acid, ascorbic acid, and the like), alcohols (e.g., methanol, ethanol, and the like). Other non-limiting examples of suitable discrete sacrificial electron donors include elemental carbon, elemental iron, and the like.

The source of electrons may be an external source of electrons, as opposed to an internal source of electrons. The external source of electrons is exogenous relative to the mixture of heterostructure(s) and catalyst(s). Non-limiting examples of external electron sources include solar cells, electrochemical bias, alternative energy sources, and the like.

The aqueous medium can have a variety of compositions. In an example, the aqueous medium is water. In another example, the aqueous medium comprises water. In yet another example, the aqueous medium further comprises an organic solvent (or mixture of organic solvents). The organic solvent may be a protic solvent, an aprotic solvent, or a combination thereof. Non-limiting examples of suitable organic solvents include alcohols, such as, for example, ethanol, methanol, ethylene glycol, and the like, and combinations thereof. The pH of the medium may be from 2.0 to 11.0, including all pH values to the 0.1 and ranges therebetween.

Any wavelength (or wavelength range) of electromagnetic radiation that forms photoexcited quantum-confined material/vanadium oxide heterostructures can be used. In various examples, depending on the quantum-confined material/vanadium oxide heterostructure(s), wavelengths in the ultraviolet, visible, near infrared, or a combination thereof are used. In an example, wavelengths in the solar spectrum (e.g., solar flux) are used.

The electromagnetic radiation can be provided in a variety of ways. Any radiation source providing the desired electromagnetic energy wavelength(s) can be used. In non-limiting examples, the electromagnetic radiation can be provided by a lamp (e.g., xenon lamp), arc lamp, black body radiation source, light emitting diode (LED), laser, sunlight, or the like, or a combination thereof. The electromagnetic radiation may be provided in a continuous manner or intermittently as desired to control hydrogen production.

The quantum-confined material/vanadium oxide heterostructure(s), catalyst(s), source(s) of electrons, and aqueous medium mixture may be present in a vessel. The container allows exposure of the mixture to the desired electromagnetic radiation. The size of the vessel can be scaled to the desired rate of hydrogen production. Non-limiting examples of suitable containers include flasks, vials, reactors, and the like.

The mixture may be present in an inert atmosphere. The atmosphere may be a mixture of inert gases. In non-limiting examples, the mixture is present in a nitrogen or argon atmosphere.

The methods can be carried out at a wide range of temperatures. The mixture may be at ambient temperature or elevated temperature. By ambient temperature, it is meant a temperature of 15° C. (59° F.) to 25° C. (77° F.), including all 0.1° C. values and ranges therebetween, though differences in climate may acclimate people to higher or lower temperatures. The mixture may be present at an elevated temperature of, for example, 25° C. to 40° C., including all 0.1° C. values and ranges therebetween.

In various examples, the present disclosure provides compositions for producing hydrogen. The compositions comprise quantum-confined material/vanadium oxide heterostructure(s), catalyst(s), an aqueous medium, and, optionally, one or more source(s) of electrons (e.g., a sacrificial electron donor). On exposure to electromagnetic radiation as described herein the compositions produce hydrogen.

The steps of the method described in the various examples disclosed herein are sufficient to carry out the methods of the present disclosure. Thus, in an example, the method consists essentially of a combination of the steps of the methods disclosed herein. In another example, the method consists of such steps.

The following examples are presented to illustrate the present disclosure. They are not intended to be limiting in any matter.

All patents, patent applications, provisional applications, and publications referred to or cited herein are incorporated by reference in their entirety, including all figures and tables, to the extent they are not inconsistent with the explicit teachings of this specification.

Following are examples which illustrate procedures for practicing the invention. These examples should not be construed as limiting. All percentages are by weight and all solvent mixture proportions are by volume unless otherwise noted.

Example 1

All references found in this Example are listed in References List 1.

Tackling the complex challenge of harvesting solar energy to generate energy-dense fuels such as hydrogen requires the design of photocatalytic nanoarchitectures interfacing components that synergistically mediate a closely interlinked sequence of light-harvesting, charge separation, charge/mass transport, and catalytic processes. The design of such architectures requires consideration of both thermodynamic offsets and interfacial charge-transfer kinetics to ensure long-lived charge carriers that can be delivered at low overpotentials to the appropriate catalytic sites while mitigating parasitic reactions such as photocorrosion. Detailed herein is the design and synthesis of nanowire/quantum dot heterostructures with interfacial electronic structure specifically tailored to promote light-induced charge separation and photocatalytic proton reduction. Topochemical synthesis yields a metastable $\beta$-$Sn_{0.23}V_2O_5$ compound exhibiting Sn 5s-derived midgap states ideally positioned to extract photogenerated holes from interfaced CdSe quantum dots. The existence of these midgap states near the upper edge of the valence band (VB) has been confirmed and $\beta$-$Sn_{0.23}V_2O_5$/CdSe heterostructures have been shown to exhibit a 0 eV midgap state-VB offset, which underpins ultrafast sub-picosecond hole transfer. The $\beta$-$Sn_{0.23}V_2O_5$/CdSe heterostructures are further shown to be viable photocatalytic architectures capable of efficacious hydrogen evolution. The results of this study underscore the criticality of precisely tailoring the electronic structure of semiconductor components to effect rapid charge separation necessary for photocatalysis.

Achieving efficient conversion of solar energy incident on the planet to energy-dense, combustible fuels as required to generate power is arguably one of the defining challenges of our time.[1-4] Accomplishing this objective using photocatalytic architectures constituted from earth-abundant elements would represent a transformative step in the journey towards a low-carbon, environmentally sound, and sustainable economy. Solar photocatalysis requires absorption of photons, separation of excitons to mobile charge carriers, diffusion of such carriers to catalytic sites, diffusion of reactive species to active sites, and ultimately catalysis of redox processes at the active sites. Given the myriad challenges and their individual difficulties, it is unlikely that a single material can be designed to simultaneously fulfill each requisite role. Consequently, an alternative approach to solar energy conversion has focused on the design of heterostructures comprising a light harvesting semiconductor acting as a charge donor and a wide-bandgap semiconducting material functioning as a charge acceptor.[5-8] In such a configuration, wherein the two components are closely interfaced, charge carriers are generated in the charge donor upon photoexcitation, and charge separation occurs across one or more interfaces, necessarily outcompeting various possible recombination channels. The mobile carriers are then supplied to redox catalysts at the appropriate potentials to catalyze oxidation and reduction half-reactions.[4,9]

The design of architectures for solar water splitting is subject to several constraints. First, as a result of the high overpotential of the water oxidation reaction, wide-bandgap semiconductors have been typically used, such as $TiO_2$ in the seminal work by Honda-Fujishima;[13] however, these materials have low absorption cross-sections in the visible region and much of the harvested free energy is squandered in overcoming the large activation energy that is reflected in the high overpotential of the reaction. The discovery of water-oxidation catalysts that operate at much lower overpotentials[14,15] implies that wide bandgap semiconductors are no longer necessary, allowing for better utilization of the solar spectrum. The design of charge acceptors that can supply holes to water-oxidation catalysts at potentials only slightly positive of the water-oxidation potential is desired. Chalcogenide quantum dots (QDs) are promising light-harvesting elements given their high absorption coefficients as well as considerable compositional and dimensional tunability.[16,17] However, their utilization in photocatalytic architectures has been limited because of anodic photocorrosion, which is mediated by photogenerated holes localized at surface traps, resulting in the rapid oxidation of nanoparticle surfaces.[17,18] While several strategies for mitigating photocorrosion have been developed, including the growth of core-shell structures, substitutional doping, and the addition of sulfide-based hole-scavenging electrolytes,[17,19-21] it is desirable for viable QD-based photocatalysis is to extract holes from the photoexcited QDs on ultrafast timescales before they are able to participate in surficial oxidation reactions. In the research reported here, we have addressed both goals—namely extracting holes from QDs and transferring them into states at potentials appropriate for water oxidation—through the design of a novel metastable $\beta$-$Sn_{0.23}V_2O_5$ compound, which has midgap states derived from the stereoactive lone pairs of $Sn^{2+}$ ions that are strategically positioned to extract holes from photoexcited CdSe QDs. Rapid sub-picosecond hole extraction is evidenced in CdSe/$\beta$-$Sn_{0.23}V_2O_5$ heterostructures, which are furthermore demonstrated to function as viable architectures for photocatalytic water splitting.

Efficient hole extraction from a light-harvesting semiconductor requires both suitable energetic offsets of the valence and conduction band edges of the donor and acceptor as well as optimal dynamics of charge transfer as dictated by interfacial structure and thermodynamic driving forces. The valence and conduction band edges of semiconductors are primarily reflective of the chemical bonding and the extent of covalency/ionicity within the structures and are thus largely immutable. One strategy to address this constraint and develop reconfigurable materials involves open framework structures into which cations can be incorporated through intercalation chemistry to introduce electronic states at specific energies. We hypothesize that in the case of specific cations, such electronic states can be positioned to enable desired overlap with the valence band edges of photoexcited semiconductor QDs, thereby providing a means of tuning energetic offsets and thermodynamic driving forces for charge transfer within heterostructures.[10-12] In recent work, we have demonstrated that $\beta$-$Pb_{0.31}V_2O_5$ can serve as a charge acceptor in $\beta$-$Pb_{0.31}V_2O_5$/CdX (X=S, Se, Te) QD heterostructures. Midgap states derived from the $6s^2$ stereoactive lone-pairs of intercalated $Pb^{2+}$ cations[22,23] overlap the valence bands of the QDs, which enables the extraction of photogenerated holes.[10-12] FIG. 1A sketches the band alignments of $\beta$-$Pb_{0.31}V_2O_5$ with CdX (X=S, Se, Te) QDs as determined from hard X-ray photoelectron spectroscopy (HAXPES) and density functional theory (DFT) calculations.[10-12] However, FIG. 1A illustrates that the energetic positioning of the $Pb^{2+}$-derived midgap states is at much too positive of a potential to permit hole extraction from the valence band edges of QDs.[10,11,24] In order to obtain the desired thermodynamic alignment of energy levels, the acceptor component of the heterostructure needs to be designed with midgap states positioned at less positive potentials such as to facilitate hole extraction from the top of the QD valence band. The structural and compositional diversity of $M_xV_2O_5$ bronzes,[24,25] where M is a cation drawn from across the periodic table, and the ability to intercalate different cations within V—O frameworks of varying connectivity[26,27] provides considerable design space for installing an electronic state formulated to have optimal energetic offsets. We report on the design of a metastable $M_xV_2O_5$ compound with optimally-positioned midgap states and demonstrate charge separation within corresponding $M_xV_2O_5$/QD heterostructures, which can in turn be exploited in photocatalysis. Importantly, the midgap states described here are intrinsic to the composition of the material and are derived from periodically inserted ions, specifically main group $ns^2np^0$ cations, residing within well-defined crystallographic sites. As such, these states differ fundamentally from midgap states derived from stochastic surface traps and defect states localized within certain regions of the material.[28,29]

The inclusion of a metal cation, M, into the $V_2O_5$ framework necessitates a concomitant reduction of the $d^0$ ($V^{5+}$) framework to a partially reduced $d^1/d^0$ ($V^{4+}/V^{5+}$) framework. Depending on the electronic structure specific to the inserted cations, new states can overlap with valence or conduction band edges of the $V_2O_5$ framework or give rise to primarily non-bonding states between these bands.[30,31] Extensive studies of p-block $ns^2np^0$ cations across a variety of compounds indicate that in the solid state, such cations reside on a continuum between truly inert pairs and stereoactive lone pairs.[31,32] Indeed, based on elucidation of the atomistic and electronic structure of $\beta$-$Pb_xV_2O_5$,[22,23] the latter lone pair scenario seems to most accurately capture the nature of the $Pb^{2+}$ ions in this compound.[10-12] Replacing $Pb^{2+}$ cations with other post-transition metal cations to improve the energetic offsets depicted in FIG. 1A is important. However, despite unparalleled compositional diversity,[33-38] the only thermodynamically stable $M_xV_2O_5$ structures bearing main-group lone pairs accessible from direct synthesis are $\beta$-$Pb_{0.31}V_2O_5$ and $\delta$-$Tl_{0.48}V_2O_5$.[22,23,38]

Consequently, the development of synthetic methods to prepare metastable $\beta$-$M_xV_2O_5$ phases with varying p-block cations is an urgent imperative.[27] The recent stabilization of the empty tunnel-structured $\zeta$-$V_2O_5$ phase based on topochemical extraction of Ag-ions from $\beta$-$Ag_{0.33}V_2O_5$[27,39] yields an important synthetic building block, although intercalation chemistry approaches for filling the tunnels have thus far been confined to electropositive s-block cations.[27,35]

In this work, we demonstrate the design and topochemical stabilization of a metastable $\beta$-$Sn_{0.23}V_2O_5$ compound that is predicted from first-principles calculations to have $5s^2$ midgap states situated at a higher energy (more negative potential) than the midgap states of $\beta$-$Pb_xV_2O_5$, thereby enabling the directional charge transfer of photoexcited holes from the valence band edges of CdSe QDs to the midgap states. The compound has been prepared through a novel and versatile intercalation method that allows for intercalation of late-transition-metal and post-transition-metal cations within the tunnels of quasi-1D $\zeta$-$V_2O_5$, and has been further verified using HAXPES to have a diffuse midgap state located close to the Fermi level, as predicted by DFT calculations. Ultrafast transient absorption (TA) spectroscopy measurements demonstrate sub-picosecond hole-transfer kinetics in $\beta$-$Sn_{0.23}V_2O_5$/CdSe heterostructures prepared by the successive ionic layer adsorption and reaction (SI-LAR) process. These heterostructures furthermore demonstrate photocatalytic hydrogen evolution (0.20 μmol $H_2$ $h^{-1}$ with the passage of 50 mC) with excellent Faradaic efficiency (82±5%). These results illustrate a new approach to catalyst design inspired by the application of chemical intuition to the prediction and elucidation of electronic structure and capitalize on the installation of intercalative states through topochemical modification of a metastable structure. The synthetic methods detailed herein render $M_xV_2O_5$/QD heterostructures a versatile and compositionally reconfigurable platform for energy-relevant light harvesting, charge separation, and redox photocatalysis.

Results and Discussion

Computationally guided design of target p-block $M_xV_2O_5$ compounds. In order to address the limitations of $Pb_xV_2O_5$ noted above, we have used DFT calculations to design novel $M_xV_2O_5$ compounds with lone-pair-derived midgap states situated closer to the Fermi level than previously observed in $\beta$-$Pb_xV_2O_5$. FIG. 1A shows DFT-calculated projected density of states (DOS) for $\beta$-$Pb_xV_2O_5$ illustrating that the relatively weak Pb 6s-O 2p hybridization yields filled midgap states (antibonding Pb 6s-O 2p in origin)[23] just slightly higher in energy than the O 2p valence band edge, which is still somewhat lower in energy than desired for hole extraction from QDs. Anion mixing is expected to be substantially increased for fifth-period post-transition metals in the absence of relativistic effects, improved shielding of nuclear charge by 4d states, and higher bond energies facilitated by lower cation-anion bond distances. A more pronounced lone pair distortion is expected to furthermore allow for mixing of Sn 5p character resulting in more diffuse non-bonding states shifted up towards the Fermi level, as observed in the case of $SnWO_4$ and $SnO$.[31,32] Such a shift in the energy positioning of midgap states would indeed be welcome for the design of heterostructures, as it would render hole transfer thermodynamically more favorable from the valence band edges of CdSe QDs. One practical impetus for selecting Sn $5s^2$-derived states for hole extraction derives from the difficulties of stabilizing oxidation states that preserve filled $ns^2$ states in the solid state (which follows $Pb^{2+}$>$Sn^{2+}$>$Ge^{2+}$). Depending on the energy positioning of the midgap state, such a material could perhaps facilitate hole transfer from smaller-bandgap CdTe QDs, thereby allowing for more effective utilization of the solar spectrum.[17] DFT calculations performed for the hypothetical $\beta$-$Sn_xV_2O_5$ structure are shown in FIG. 1B. Indeed, the atom-projected density of states suggest filled antibonding Sn 5s-O 2p midgap states energetically positioned at more negative potentials, closer to the Fermi level as compared to the 6s midgap states of $\beta$-$Pb_xV_2O_5$, and thus should exhibit considerably improved band alignment with the QD components of the heterostructures (FIG. 1B). Table 1 delineates the energies used to construct the band alignment diagrams based on HAXPES measurements of midgap states, X-ray photoemission spectroscopy (XPS) measurements of valence band edges, diffuse reflectance spectroscopy (DRS) measurements of the band gaps of the $M_xV_2O_5$ materials, and literature values for the bandgaps of bulk chalcogenide QDs. The implications of the electronic structure of $\beta$-$Sn_xV_2O_5$ for hole extraction within heterostructures is discussed in greater detail below.

Topochemical synthesis and structural characterization of metastable late-transition-metal and p-block $\beta$-$M_xV_2O_5$. The hypothetical compound $\beta$-$Sn_xV_2O_5$ has not thus far been reported and is inaccessible from solid-state and hydrothermal reactions between conventional metal salt, metallic, and $V_2O_5$ precursors (indeed no $Sn_xV_2O_5$ phases are known even for alternative V—O connectivities[24,25] entirely different from the tunnel-structured phase predicted above). Given the prospect of improved energetic overlap, we have instead designed a topochemical means of preparing this compound by inserting divalent Sn ions within a 1D metastable ζ-$V_2O_5$ phase. While chemical methods for inserting Li—, Mg—, and similar electropositive metal cations are well established,[27,41,42] the palette of synthetic methods for incorporating late transition metal and post-transition-metal cations in interstitial sites remains almost entirely unexplored. Metastable β-$Sn_xV_2O_5$ has been prepared by a modified oxalate decomposition reaction (where M=Sn) as per the following equation:

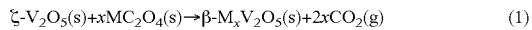
$$\zeta\text{-}V_2O_5(s)+xMC_2O_4(s)\rightarrow\beta\text{-}M_xV_2O_5(s)+2xCO_2(g) \quad (1)$$

Figure 2:
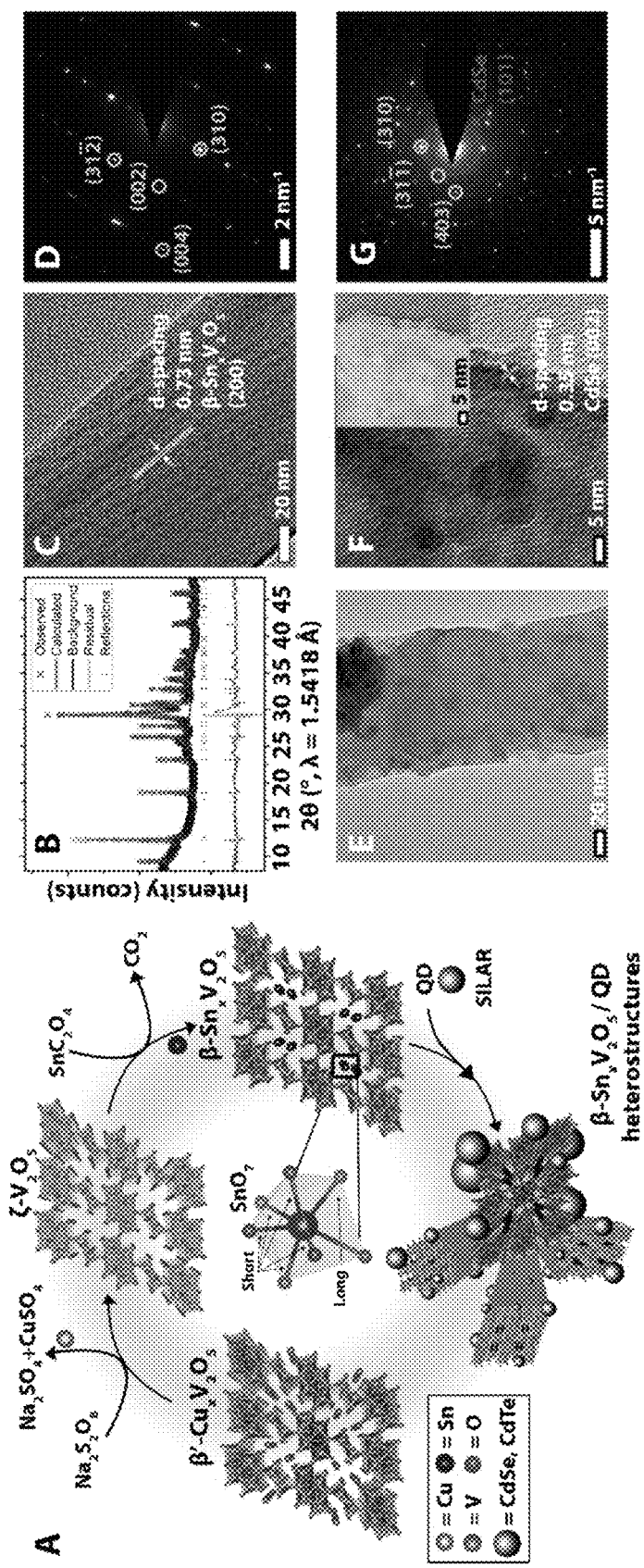
FIG. 2. Synthetic approach and structural characterization of $\beta$-$Sn_{0.23}V_2O_5$ nanowires and $\beta$-$Sn_{0.23}V_2O_5$/QD heterostructures. (A) Illustration of topochemical synthetic approach for the stabilization of metastable $\beta$-$Sn_{0.23}V_2O_5$ nanowires and their surface functionalization with CdTe and CdSe QDs using the SILAR process. Metastable $\zeta$-$V_2O_5$ nanowires have been stabilized by topochemical deintercalation of Cu ions from $\beta'$-$Cu_xV_2O_5$ (FIG. 6). The reaction of $\zeta$-$V_2O_5$ nanowires with metal oxalates yields intercalated $\beta$-$M_xV_2O_5$ (M: Pb, Sn, Ni, Co, FIGS. 7-9). The refined $\beta$-$Sn_{0.23}V_2O_5$ structure is shown with the pentagonal bipyramidal local coordination environment of the inserted Sn cations depicted at the center of the graphic. $\beta$-$Sn_{0.23}V_2O_5$/QD heterostructures have been prepared by the SILAR deposition of CdSe and CdTe QDs onto the surfaces of $\beta$-$Sn_{0.23}V_2O_5$ nanowires. (B) Powder XRD pattern measured for $\beta$-$Sn_{0.23}V_2O_5$ nanowires. The collected data are plotted as black crosses, the calculated diffraction pattern is plotted in red, residuals are shown in light blue, and the reflections from the Rietveld refinement are delineated as pink ticks. Further refinement details, lattice parameters, and atom positions are provided in Tables 2 and 3. (C) Lattice-resolved HRTEM image acquired for a $\beta$-$Sn_{0.23}V_2O_5$ nanowire indicating the separation between (002) planes. (D) Indexed SAED pattern acquired for the nanowire depicted in C. (E) Low-magnification HRTEM image of CdSe-coated β-$Sn_{0.23}V_2O_5$ nanowires. (F) HRTEM image of β-$Sn_{0.23}V_2O_5$/CdSe heterostructures; the observed lattice spacing of 0.37 nm corresponds to the separation between the (002) planes of CdSe (PDF #77-2307).[40] The inset shows false-color maps derived from diffraction imaging that illustrate the spatial localization of β-$Sn_{0.23}V_2O_5$ and CdSe phases. Red corresponds to regions of greater QD coverage and green corresponds to regions with relatively lower QD coverage.
Figure 3:
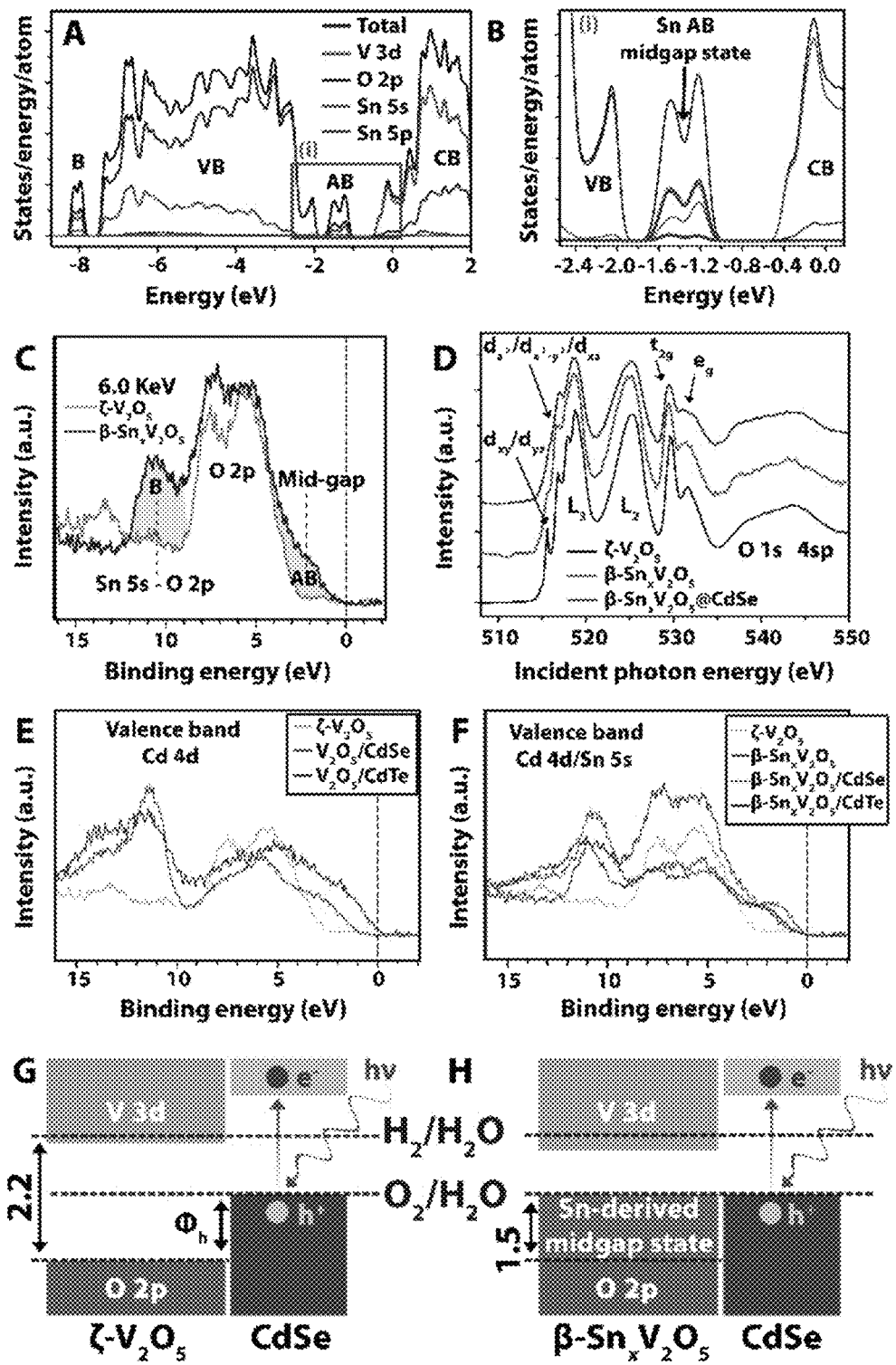
FIG. 3. Electronic structure of metastable β-$Sn_{0.23}V_2O_5$ and experimental evidence of Sn-derived midgap states. (A) DFT calculated density of states and atom-projected density of states for β-$Sn_{0.23}V_2O_5$ showing contributions from: Sn 5s and 5p orbitals; O 2s and 2p orbitals; and V 3d orbitals. Core states (<−9 eV) comprise primarily O 2 s and Sn 4d states and are not depicted. The valence band (VB) primarily comprises O 2p states with some V 3d character, whereas the conduction band (CB) primarily comprises hybridized O 2p-V 3d states. The bonding (labeled 'B') and antibonding (labeled 'AB') bands below and above the VB, respectively are primarily Pb 6s and O 2p in character. (B) An expanded region of the DOS in A more clearly elucidates the nature of the Sn-derived antibonding states, or 'midgap' state predicted for β-$Sn_{0.23}V_2O_5$. (C) HAXPES data collected for β-$Sn_{0.23}V_2O_5$ provide a detailed picture of the valence band and confirm the existence of the Sn 5s midgap-derived states predicted by DFT. Bonding (B) and antibonding (AB) states are assigned in the spectra. The bonding states have strong Sn 5s character, whereas anionic O 2p states mediate mixing of Sn 5s and 5p character in the antibonding states. (D) X-ray absorption spectra collected for ζ-$V_2O_5$ (black), β-$Sn_{0.23}V_2O_5$ (red), and β-$Sn_{0.23}V_2O_5$/CdSe heterostructures (blue) provide a detailed picture of the conduction band and provide further evidence of the intercalation of tin within the nanowires by illustrating filling of the lowest-lying unoccupied V $3d_{xy}$ states. Corresponding HAXPES measurements were collected for (E) bare and CdSe/CdTe-coated ζ-$V_2O_5$ (F) and bare and CdSe/CdTe-coated β-$Sn_{0.23}V_2O_5$. Vertical dashed lines in C, E, and F indicate the Fermi energy. HAXPES-determined band alignments for (FIG. 3G) ζ-$V_2O_5$/CdSe and (H) β-$Sn_{0.23}V_2O_5$/CdSe. The band alignments are oriented with respect to the positioning of the $H_2/H_2O$ (hydrogen evolution) and $O_2/H_2O$ (oxygen evolution) couples as indicated by the blue dashed lines. The positioning of the Sn-derived midgap state 1.5 eV above the V—O derived valence band edge onset of the pristine material is indicated by a shaded blue box.

The synthetic approach to prepare the desired β-$Sn_{0.23}V_2O_5$ compound, which involves the hydrothermal preparation of β'-$Cu_xV_2O_5$ nanowires, topochemical persulfate leaching of Cu-ions to stabilize the quasi-1D metastable ζ-$V_2O_5$ phase, and finally reaction with a tin oxalate precursors as per Eq. 1, is schematically depicted in FIG. 2A. The reaction is entropically driven by the formation of gaseous $CO_2$ and is thought to result in the formation of oxide/reactive metallic intermediates (for less electropositive metals, e.g., Sn, Ni, Co, Pb), which subsequently diffuse into $V_2O_5$ to form ternary vanadium oxide bronzes.[43] Since oxalate decomposition occurs at relatively low temperatures in the range between ca. 170 to 390° C. (depending on the metal oxalate), the V—O metastable phase can be preserved without reversion to the thermodynamically stable α-$V_2O_5$ polymorph (which is initiated above approximately 490° C.).[39] Consequently, this versatile oxalate decomposition method can be further generalized to insert late-transition-metal cations within the tunnels of quasi-1D ζ-$V_2O_5$ (vide infra).

Figure 6:
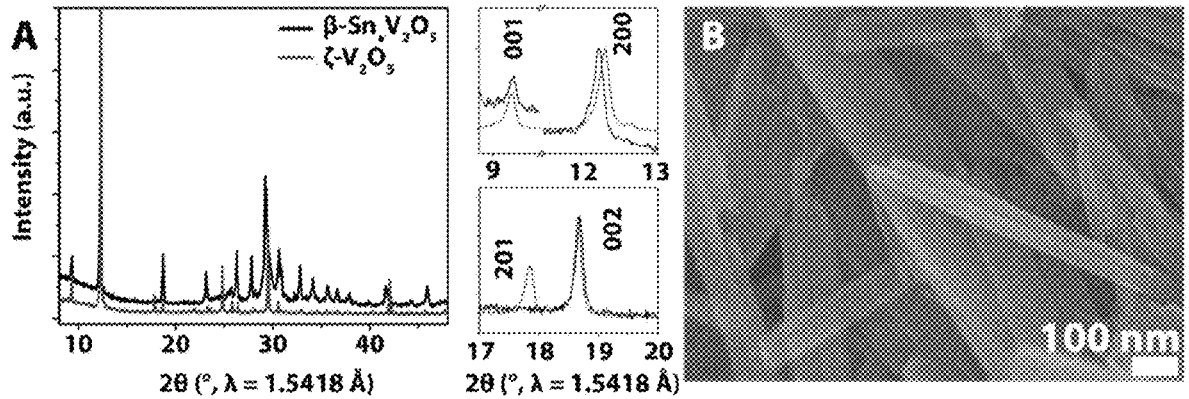
FIG. 6. Powder X-ray diffraction (XRD) evidence for tunnel expansion of the 1D tunnels of ζ-$V_2O_5$ upon insertion of $Sn^{2+}$ ions. (A) Powder XRD pattern of the metastable ζ-$V_2O_5$ precursor material contrasted with the diffraction pattern for β-$Sn_xV_2O_5$ illustrating the changes in several key reflections as a result of the insertion of $Sn^{2+}$ ions. An expanded view of the (001) and (200) Bragg reflections are shown as insets to A to better illustrate expansion of the unit cell, primarily along the crystallographic a-axis. The expanded views have been independently normalized to the (200) reflection (top) and (002) reflection (bottom). (B) SEM image of ζ-$V_2O_5$ nanowires prepared by topochemical extraction of Cu-ions from β'-$Cu_xV_2O_5$ indicating an average width of ca. 100-150 nm.
Figure 7:
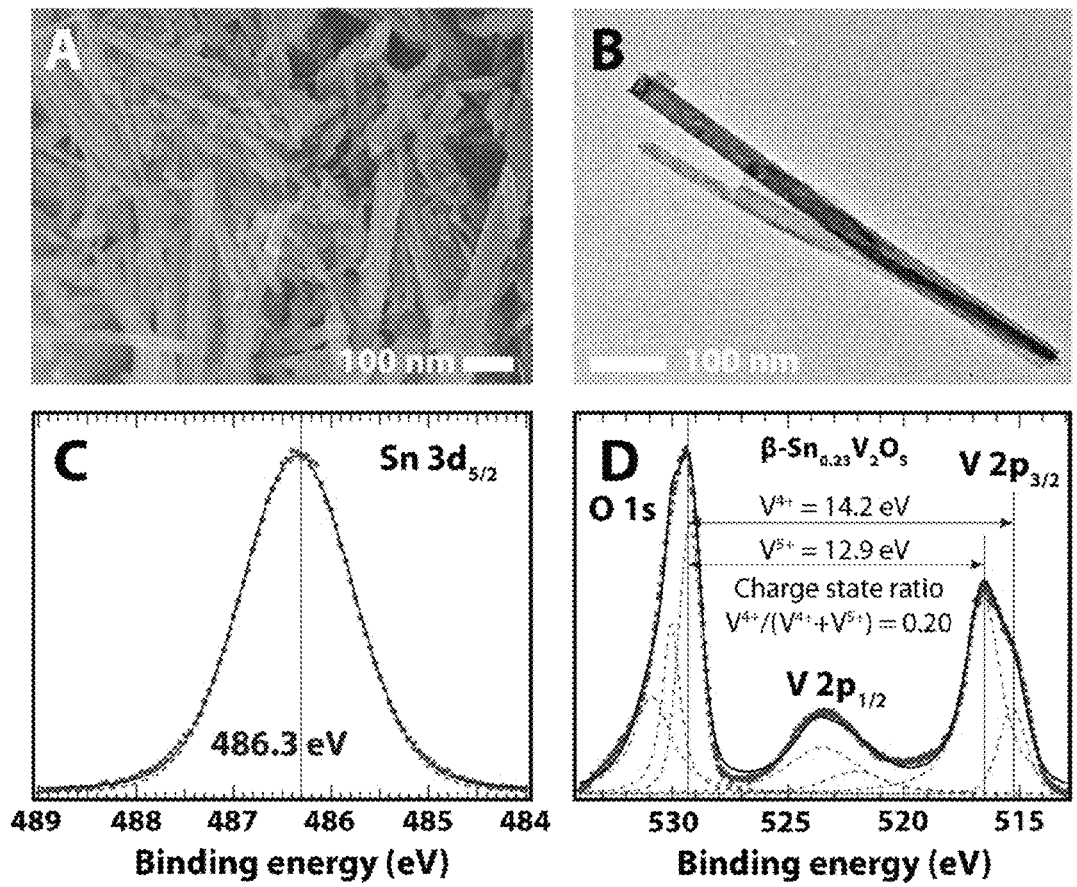
FIG. 7. Electron microscopy and XPS characterization of β-$Sn_{0.23}V_2O_5$ nanowires. (A) A SEM image and (B) a low-magnification TEM image of β-$Sn_{0.23}V_2O_5$ nanowires indicating retention of the nanowire morphology of the ζ-$V_2O_5$ precursor following $Sn^{2+}$ insertion. (C) XPS peak fitting of β-$Sn_xV_2O_5$, which indicates a single oxidation state ($Sn^{2+}$) for tin within the ζ-$V_2O_5$ structure. (D) Fitting of O 1 s and V 2p core level spectra of β-$Sn_{0.23}V_2O_5$, consistent with reduction of the vanadium host lattice upon $Sn^{2+}$ intercalation.

FIG. 6 contrasts the powder X-ray diffraction (XRD) patterns of the ζ-$V_2O_5$ precursor and the β-$Sn_xV_2O_5$ compound prepared using the oxalate decomposition reaction. A pronounced modulation in the intensity of several reflections is noted; in addition, a clear expansion of the tunnels upon Sn-insertion is observed, as indicated by shifts of the 200 and 002 Bragg reflections to lower 2θ values. FIG. 2B shows powder XRD data for β-$Sn_xV_2O_5$ (x~0.23) as well as a Rietveld refinement performed to solve the structure and determine the atomic positions. Table 2 lists refinement statistics as well as obtained lattice parameters and atom positions. FIG. 2A depicts the refined structure of the prepared metastable β-$Sn_{0.23}V_2O_5$ compound and further illustrates the seven-coordinated sites occupied by the inserted $Sn^{2+}$ ions. Select bond angles and bond lengths of the vanadium-centered polyhedra and $SnO_7$ pentagonal bipyramid are listed in Table 3. The insertion of $Sn^{2+}$ ions proceeds with complete retention of the nanowire morphology of the ζ-$V_2O_5$ precursor. FIG. 6B shows that the latter are ca. 100-150 nm in width with lengths spanning tens of microns. The SEM and TEM images in FIGS. 7A and 7B, respectively, show that the β-$Sn_{0.23}V_2O_5$ nanowires are similarly ca. 100-150 nm in width, consistent with an entirely topochemical insertion process. FIGS. 2C and 2D show a high-resolution transmission electron microscopy (HRTEM) image and indexed selected area electron diffraction (SAED) pattern, respectively, acquired for β-$Sn_{0.23}V_2O_5$ nanowires. The HRTEM image and SAED pattern confirm the single-crystalline nature of the β-$Sn_{0.23}V_2O_5$ nanowires; well-defined lattice fringes with a lattice spacing of 0.73 nm are observed, and can be assigned to the interplanar separations between (200) planes of β-$Sn_{0.23}V_2O_5$, as determined from the Rietveld refinement to the powder XRD pattern depicted in FIG. 2B. The nanowires are observed to grow along the (200) crystallographic plane with the quasi-1D tunnel direction oriented parallel to the growth direction of nanowires, consistent with previous observations for the hydrothermal growth of β-$Cu_xV_2O_5$.[44] High-resolution XPS spectra in the Sn $3d_{5/2}$ region could only be fit with one peak, as shown in FIG. 7C; this peak is centered around 486.3 eV, as expected for a $Sn^{2+}$ charge state.[45,46] The single peak profile shape fitting furthermore supports the conclusion that formation of the tetravalent tin species is avoided. Furthermore, the $Sn^{2+}$ assignment is corroborated by the measured valence band spectrum (FIG. 3C and vide infra), as predicted by DFT (FIG. 1B). In the case of $Sn^{4+}$, only occupied V 3d states at the top of the valence band would be expected. In the $Sn^{2+}$ oxidation state, the Sn 5s orbital is occupied and therefore contributes to states at the top of the valence band. This confirms that the top of the valence band for $Sn_xV_2O_5$ comprises hybridized states of Sn 5s, Sn 5p, and O 2p contribution, which is in accordance with the lone pair formation mechanism.[31,47] The retention of the Sn $5s^25p^0$ configuration is important to the utilization of this compound for hole extraction. XPS data in FIG. 7(D) further attest to the mixed $V^{4+}/V^{5+}$ valence, owing to the reduction of vanadium $V^{5+}$ sites of ζ-$V_2O_5$ to compensate for the insertion of $Sn^{2+}$ ions. Comparison of the $V^{4+}/V^{5+}$ XPS peak areas (FIG. 7D) suggest a material stoichiometry consistent with the fractional tin occupancy obtained by Rietveld refinement. Procedures for peak fitting of the Sn 3d and V 2p XPS data are further detailed in Example 2 and in FIG. 7. The mixed vanadium valence is further confirmed by X-ray absorption spectroscopy data shown in FIG. 3 (vide infra).

Figure 8:
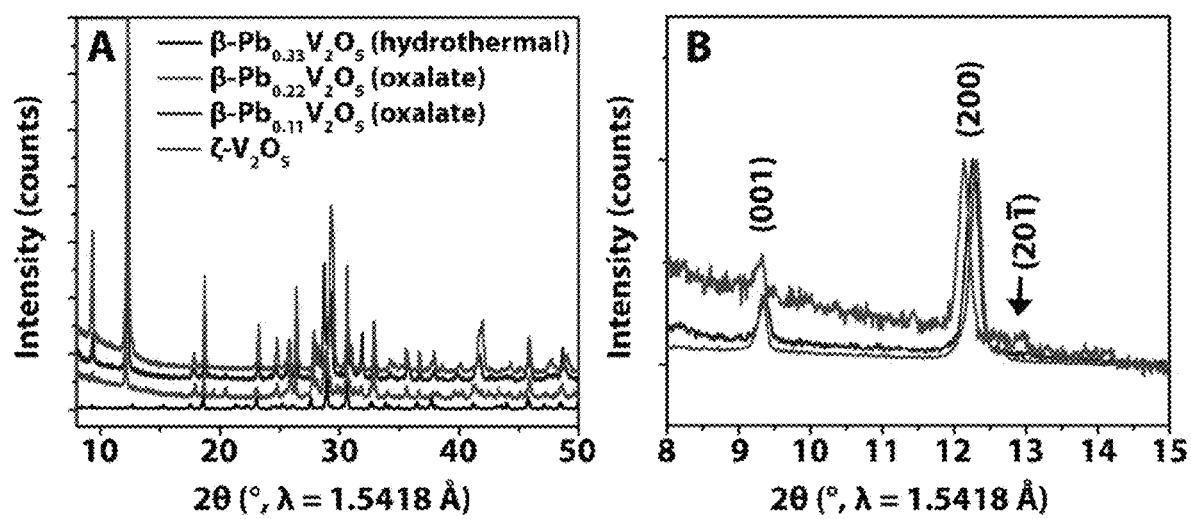
FIG. 8. Powder XRD patterns acquired for β-$Pb_xV_2O_5$ prepared by topochemical insertion of Pb ions. (A) Powder XRD patterns for β-$Pb_xV_2O_5$ synthesized with intended occupancies of x=0.11 (blue), x=0.22 (red), and x=0.33 (black) contrasted with the XRD pattern of ζ-$V_2O_5$. The $x_{intended}$=0.11 and 0.22 materials have been synthesized by topochemical insertion using the oxalate decomposition approach, whereas the $x_{intended}$=0.33 material was synthesized according to a previously reported hydrothermal route.[15] (B) An expanded view of the 2θ region between 8.5-13.0° showing monotonic expansion of the lattice with increasing Pb insertion. The expanded region is independently normalized to the intensity of the (200) reflection to better allow for visualization of the peak shifts.

As noted above, soft chemical approaches for inserting late-transition-metal and p-block cations are relatively unexplored. In addition to the synthesis of β-$Sn_{0.23}V_2O_5$, the oxalate reaction method (more generally described by Eq. 51) has been used to prepare β-$Pb_xV_2O_5$ nanowires with control over the Pb stoichiometry (x) by reacting the appropriate amount of lead oxalate with ζ-$V_2O_5$ nanowires at a temperature of 400° C., above the decomposition temperature of $PbC_2O_4$.[48] Unlike β-$Sn_{0.23}V_2O_5$, β-$Pb_xV_2O_5$ is indeed accessible from direct hydrothermal synthesis[22] but varying the Pb content (below x=0.31) inserted within the tunnels by hydrothermal synthesis is difficult. FIG. 8 indicates that the Pb content in β-$Pb_xV_2O_5$ can be varied from x=0.11-0.33 by the oxalate method reported here. The versatile oxalate decomposition approach has furthermore been used to prepare vanadium oxide bronzes of the late transition metals, specifically β-$Ni_xV_2O_5$ and β-$Co_xV_2O_5$ (FIG. 9). FIG. 9A shows the Rietveld refinement of the powder XRD pattern for a topochemically stabilized β-$Ni_{0.331}V_2O_5$ phase. Table 4 lists refinement statistics as well as the refined lattice parameters and atom positions. Select bond angles and bond lengths of the vanadium-centered octahedra and $NiO_5$ pentagonal bipyramid are listed in Table 5. Comparing powder XRD data for the different intercalated compounds, the tunnel framework is found to increase monotonically with increasing radius of the inserted cations (FIG. 9 and Table 6).

Figure 10:
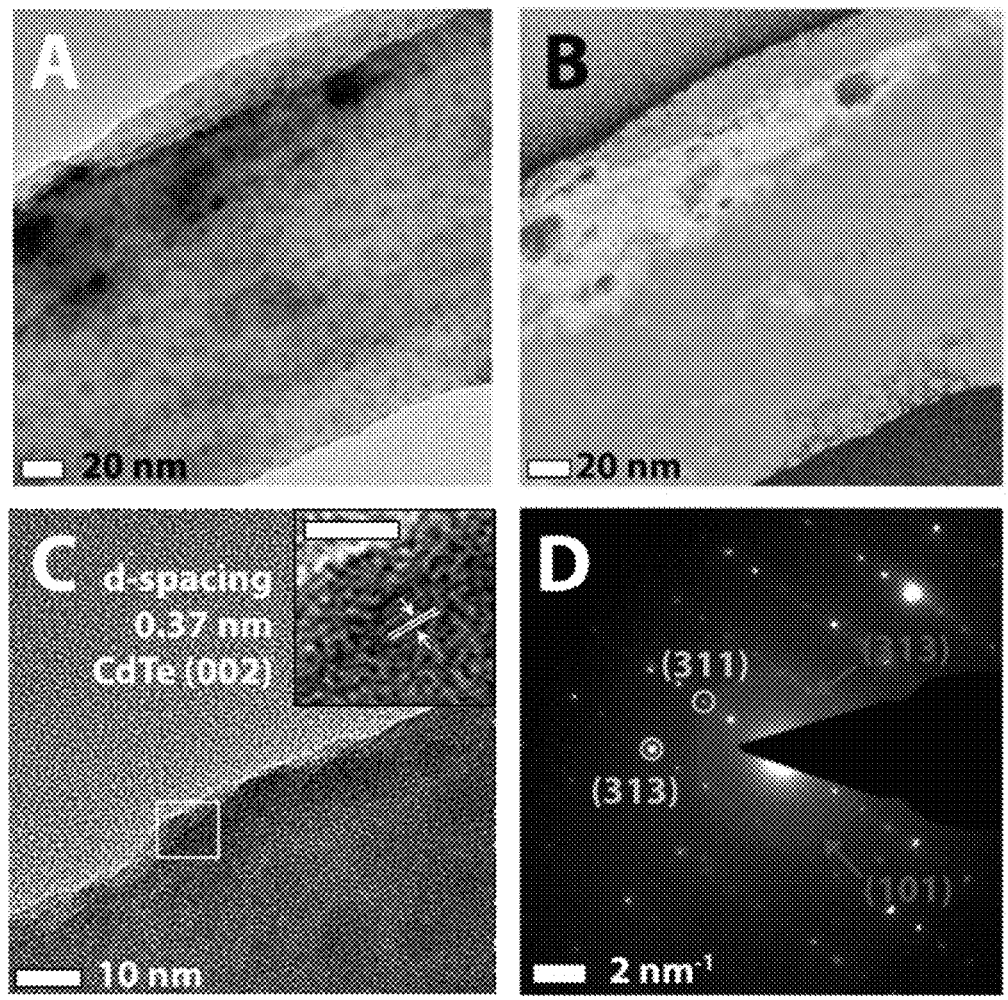
FIG. 10. Structural characterization (TEM) of β-$Sn_xV_2O_5$/CdTe QD heterostructures. (A) TEM image of β-$Sn_xV_2O_5$/CdTe heterostructures. (B) Colorized phase domain map indicating the relative surface coverage of β-$Sn_xV_2O_5$ nanowires with CdTe QDs. (C) HRTEM image and (D) corresponding SAED pattern of the β-$Sn_xV_2O_5$/CdTe heterostructure. The inset to (C) shows lattice fringes corresponding to the separation between the (002) planes of wurtzite CdTe lattice (JCPDS #19-013).[19] The SAED pattern in (D) comprises diffraction spots from β-$Sn_xV_2O_5$ and diffuse rings derived from CdTe QDs.[19]
Figure 11:
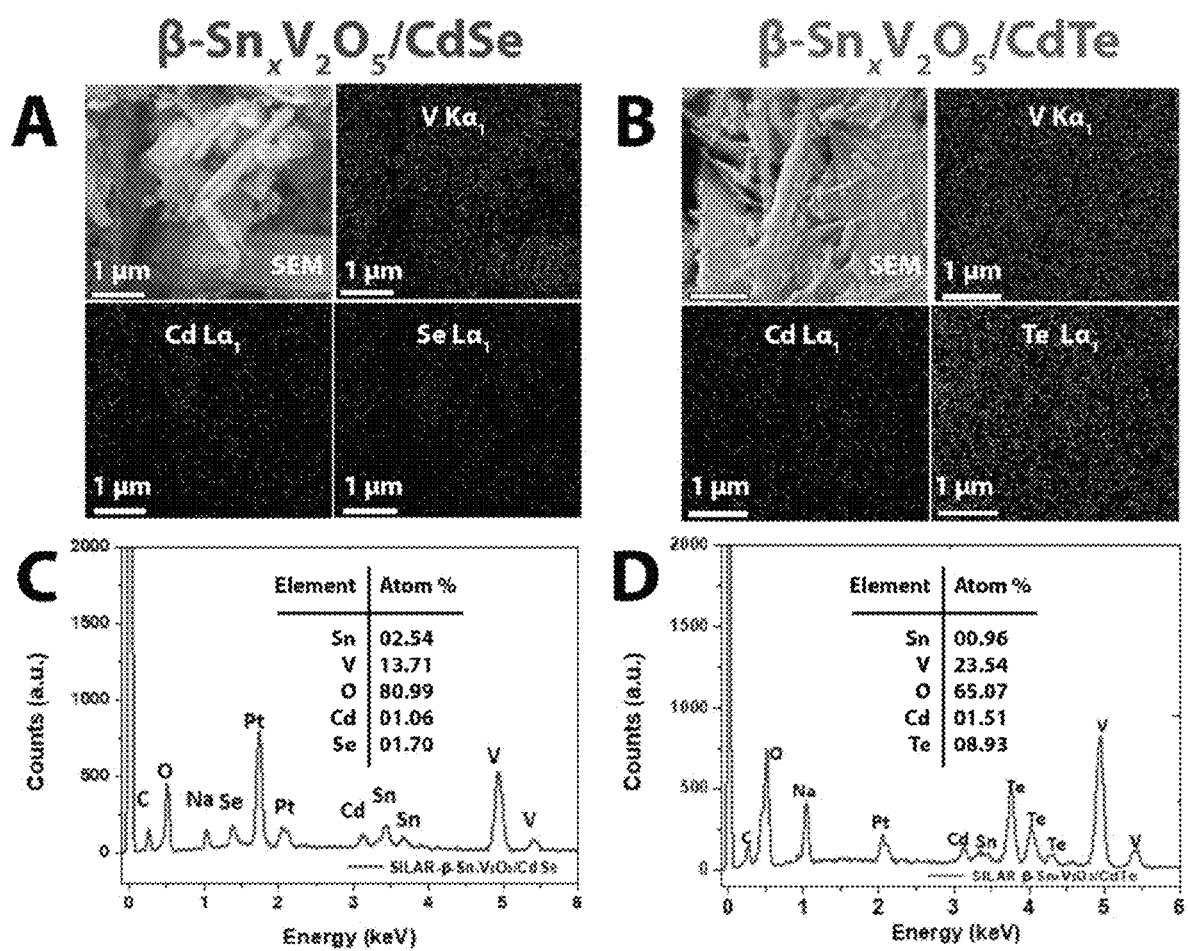
FIG. 11. Energy dispersive X-ray (EDX) spectroscopy analysis of β-$Sn_xV_2O_5$/CdX (X=Se, Te) heterostructures. (A) SEM image of β-$Sn_xV_2O_5$/CdSe heterostructures and corresponding EDX maps showing the distribution of V (yellow), Cd (green), and Se (purple). (B) SEM image of β-$Sn_xV_2O_5$/CdTe heterostructures and corresponding maps showing the spatial distribution of V (yellow), Cd (green) and Te (white). (C, D) The integrated EDX spectra corresponding to the elemental maps in (A) and (B), respectively.

Synthesis and characterization of β-$Sn_xV_2O_5$/QD heterostructures. The topochemically stabilized β-$Sn_{0.23}V_2O_5$ nanowires have been interfaced with CdX (X=Se, Te) QDs through the SILAR process,[10-12] a modified chemical bath deposition method comprising sequential dispersion in anionic and cationic solutions of II-VI chalcogenide precursors[49,50] (FIG. 2A). In contrast to the smooth facets of the $Sn_{0.23}V_2O_5$ nanowires (FIG. 2C and FIG. 7B), TEM images acquired for the β-$Sn_{0.23}V_2O_5$/CdSe heterostructures (FIGS. 2E and 2F) show a distinctly speckled appearance; agglomerated particles observed on the nanowire surfaces correspond to surface-grown CdSe QDs. Lattice fringes indexed to the separation between the (002) crystallographic planes of wurtzite CdSe are observed by HRTEM in FIG. 2F, corroborating the growth of crystalline CdSe QDs on the surfaces of β-$Sn_{0.23}V_2O_5$ nanowires.[40] The inset of FIG. 2F shows a false-color phase domain TEM image of β-$Sn_{0.23}V_2O_5$/CdSe heterostructures, allowing for visualization of the spatial localization of QDs across the surfaces of β-$Sn_{0.23}V_2O_5$ nanowires. Higher QD coverage is reflected as red/yellow coloration in the intensity map. A SAED pattern acquired for the heterostructures shows a combination of diffraction spots indexed to β-$Sn_{0.23}V_2O_5$ (FIG. 2D) and diffuse ring patterns derived from wurtzite CdSe QDs (FIG. 2G). A similar approach has furthermore been used to interface β-$Sn_{0.23}V_2O_5$ nanowires with CdTe QDs. FIG. 10 shows HRTEM images, colorized diffraction maps, and SAED patterns acquired for similarly prepared β-$Sn_{0.23}V_2O_5$/CdTe heterostructures. FIG. 11 shows EDX spectra and maps acquired for the β-$Sn_{0.23}V_2O_5$/CdSe and β-$Sn_{0.23}V_2O_5$/CdTe heterostructures further verifying the integration of QDs onto the nanowire surfaces. The maps indicate the homogeneous distribution of CdSe and CdTe quantum dots across the nanowire surfaces.

Figure 12:
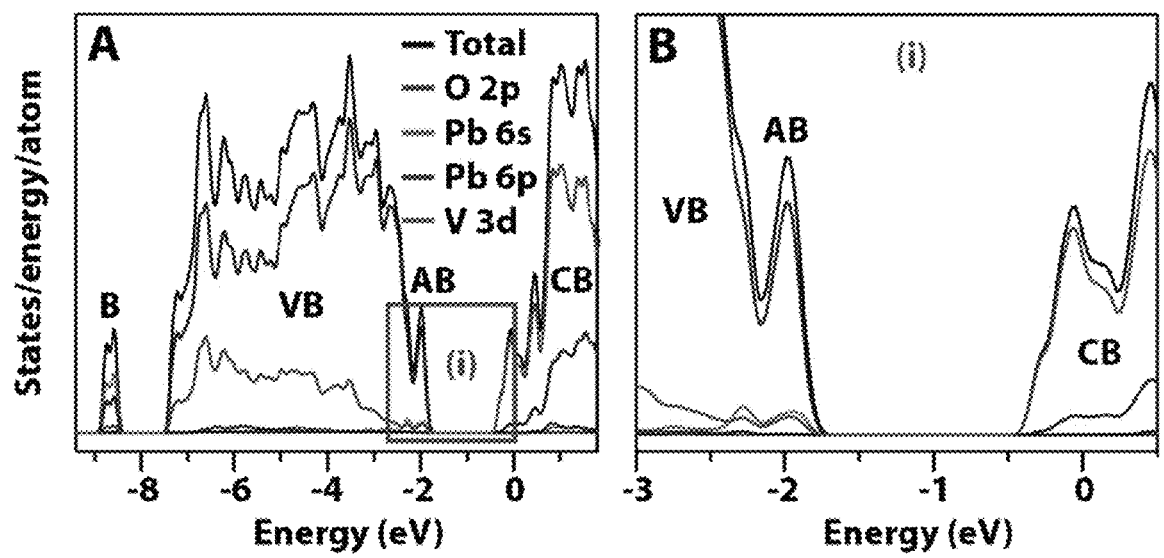
FIG. 12. DFT-calculated electronic structure of β-$Pb_xV_2O_5$ nanowires. (A) DFT-calculated density of states for β-$Pb_xV_2O_5$. Similar to β-$Sn_xV_2O_5$, the valence band comprises V—O hybridized state of primarily O 2p character, whereas the conduction band comprises V O hybridized states. The Pb 6s-O2p hybrid bonding states are situated below the valence band, whereas the antibonding states are situated adjacent to the upper edge of the valence band. An expanded view of this region, labeled (i) is given in (B), where the Pb 6s contribution is discernible.

Deciphering the electronic structure of β-$Sn_xV_2O_5$ and emergent midgap states. A key motivation for stabilizing metastable β-$Sn_{0.23}V_2O_5$ and its heterostructures is that the Sn $5s^2$-derived midgap state is expected to be energetically favorably positioned for the extraction of photogenerated holes from QDs (as suggested by the DFT calculations shown in FIG. 1B). FIG. 3A plots the orbital-projected density of states of β-$Sn_{0.23}V_2O_5$ calculated using DFT. Consistent with the electronic structure of ternary vanadium oxides, the valence band (VB) is primarily O 2p in character, whereas the conduction band (CB) comprises V 3d-O 2p hybrid states.[27,33,34,51,52] Sn 5s-derived bonding (B) and antibonding (AB) states appear below and above the VB, respectively.[10] An expanded view of the midgap state and band gap region (red box labeled (i) in FIG. 3A) is provided in FIG. 3B, and more clearly delineates the nature of the Sn-derived midgap state. Based on the lower binding energy of the Sn 5s states relative to Pb 6s states,[10,23] the Sn 5s midgap state is positioned closer to the Fermi level. The midgap state comprises contributions from V 3d, O 2p, O 2s, Sn 5s, and Sn 5p states (O 2s not depicted for clarity). The Sn 5p as well as V 3d states are observed to contribute to the hybridization of the filled Sn $5s^2$ and oxygen 2p states as a result of the reduced symmetry of the $Sn^{2+}$ site, which is distinctly different from previous findings for Pb $6s^2$-derived states in β-$Pb_xV_2O_5$ (orbital-projected density of states of β-$Pb_xV_2O_5$ are shown in FIG. 12 for direct comparison), and gives rise to a more diffuse state with classical stereoactive lone pair character near the Fermi level.[31,32]

The electronic structure of β-$Sn_{0.23}V_2O_5$ has also been examined by XPS, HAXPES, and scanning transmission X-ray microscopy (STXM) in order to probe the existence of the midgap state, examine its energy positioning with respect to the valence and conduction band edges of this material, and further understand the influence of $Sn^{2+}$ insertion on the electronic structure of ζ-$V_2O_5$. FIG. 3C exhibits HAXPES (6 keV) measurements, which probe the upper edge of the VB near the Fermi level, that were collected for β-$Sn_{0.23}V_2O_5$ and ζ-$V_2O_5$. As indicated in the DFT calculations, the VB is primarily O 2p in character and indeed this is the most prominent feature in spectra measured for both compounds. FIG. 3C illustrates the appearance of two distinct states centered at 2.20 eV (spanning ca. 0.8-3.0 eV) and 10.52 eV (spanning ca. 8.4-12.4 eV) in HAXPES spectra acquired for β-$Sn_{0.23}V_2O_5$ which are not observed for ζ-$V_2O_5$ (light grey). Based on their relative energy positioning, the features are assigned to the antibonding (AB) and bonding (B) Sn-hybridized states predicted by DFT (FIG. 3A). HAXPES measurements thus confirm that a broad state reaching much closer to the Fermi level (as compared to previous measurements of the midgap states in β-$Pb_xV_2O_5$),[23] which is desirable for improving alignment with the valence band edges of QDs, is thereby obtained upon insertion of $Sn^{2+}$ within ζ-$V_2O_5$.

Figure 13:
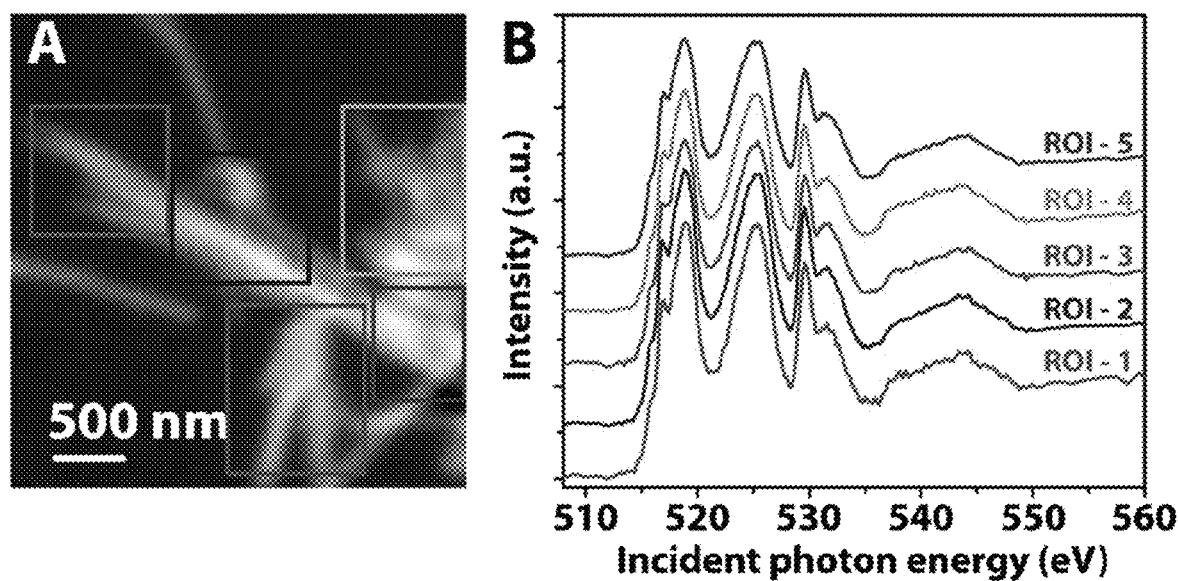
FIG. 13. Region of interest analysis of scanning transmission X-ray microscopy (STXM) data collected for β-$Sn_xV_2O_5$. (A) Stack-averaged optical density STXM image of β-$Sn_xV_2O_5$ nanowires illustrating retention of nanowire morphology after insertion of Sn ions into ζ-$V_2O_5$, consistent with SEM and TEM results (FIG. 7). (B) Spectra integrated across different regions of the nanowires, with colors corresponding to the indicated rectangular regions in (A) are strikingly similar and suggest that Sn-intercalation across the length of the nanowires and across different nanowires proceeds homogeneously.

STXM measurements at the V L- and O K-edges have been used to probe the unoccupied density of states of ζ-$V_2O_5$ and β-$Sn_{0.23}V_2O_5$ (FIG. 3D). The spectra show characteristic absorption features corresponding to transitions from V 2p-V 3d (V $L_{III}$- and V $L_{II}$-edges separated by spin-orbit coupling of ca. 7 eV in ζ-$V_2O_5$) and O 1s-O 2p states concordant with a change in angular momentum quantum number, $\Delta l = \pm 1$. The fine structure at the V $L_{III}$-edge arises from transitions to $V_3d$ states of the three crystallographically inequivalent vanadium atoms of ζ-$V_2O_5$ that are split by crystal field and multiple effects. The assignments to final V 3d states delineated in FIG. 3D are based on DFT calculations of the orbital-projected density of states with V $3d_{xy/yz}$ states situated at the bottom of the conduction band.[52-55] Similarly, at the O K-edge, two distinct sets of absorption features can be distinguished, reflecting the hybridization of O 2p states with V 3d states that are split in energy as a result of crystal field effects. Considering the quasi-octahedral $VO_6$ polyhedra of ζ-$V_2O_5$, states with $t_{2g}$ symmetry corresponding to V—O π* antibonding and $e_g$ symmetry corresponding to end-on V—O σ* anti-bonding states can be distinguished.[53-55] A pronounced modification of the electronic structure is observed upon Sn-intercalation and concomitant reduction of the $V_2O_5$ lattice (FIG. 3D and FIG. 13). Specifically, the relative intensity of the lowest-lying V $d_{xy}/d_{yz}$ states is greatly diminished at the V $L_{III}$-edge as a result of Pauli blocking owing to these states at the bottom of the conduction band being filled upon partial reduction of the vanadium sublattice (as corroborated by XPS measurements plotted in FIG. 7D). This darkening signifies a repositioning of these states to below the Fermi level as they are filled, and such states likely further contribute to the hybrid midgap state. Similarly, the relative ratio of $t_{2g}$ to $e_g$ states is strongly decreased, again suggesting the filling of hybrid V 3d-O 2p states at the CB edge. Notably, STXM measurements acquired across topochemically stabilized β-$Sn_{0.23}V_2O_5$ nanowires show essentially homogeneous V $L_{III}$-edge and O K-edge spectra within the limits of resolution, suggesting that the topochemical intercalation of $Sn^{2+}$ ions proceeds homogeneously across the wires (FIG. 13).

Figure 14:
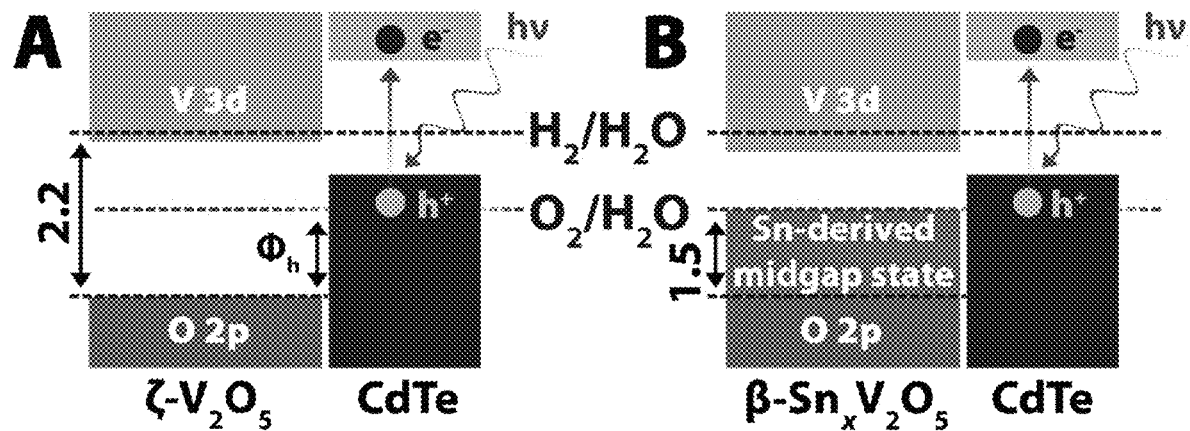
FIG. 14. Calculated and experimentally observed band alignments for β-$Sn_xV_2O_5$. Band alignments for (A) ζ-$V_2O_5$/CdTe and (B) β-$Sn_xV_2O_5$/CdTe heterostructures. The band alignments are oriented with respect to the positioning of the $H_2$/$H_2O$ (hydrogen evolution) and $O_2$/$H_2O$ (oxygen evolution) redox couples as indicated by the blue dashed lines. The positioning of the Sn-derived midgap state 1.5 eV above the V—O derived valence band edge onset of the pristine material is indicated by a shaded blue box in (B). A major advance here is illustrated by the improved alignment of the Sn-derived midgap state (blue) with the valence band of the CdTe quantum dots (green), leading to a diminished thermodynamic barrier ($\Phi_h$) for hole transfer from the photoexcited quantum dot to the semiconducting nanowire, potentially enabling the use of CdTe QDs in heterostructures.
Figure 15:
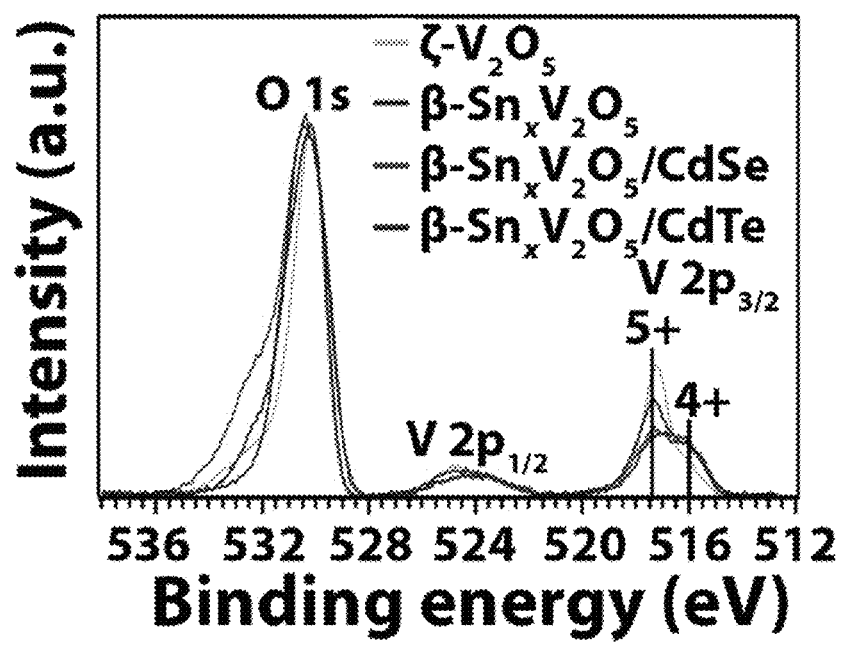
FIG. 15. Hard X-ray photoelectron spectroscopy (HAXPES) measurements for β-$Sn_xV_2O_5$ and β-$Sn_xV_2O_5$/CdX heterostructures (X=Se, Te).

Achieving 'downhill' hole transfer by improved band alignment of β-$Sn_xV_2O_5$ with QD VB edges. FIGS. 3E and 3F contrast HAXPES measurements collected for β-$Sn_{0.23}V_2O_5$/CdX (X=Se, Te) heterostructures, empty ζ-$V_2O_5$ and bare β-$Sn_{0.23}V_2O_5$ nanowires. Comparing the VB onsets for β-$Sn_{0.23}V_2O_5$ and β-$Sn_{0.23}V_2O_5$/CdX heterostructures confirms the excellent alignment of the CdSe VB edge and Sn-derived midgap states, indicating that excited-state hole transfer is thermodynamically favorable from the valence band edge, as well as from deeper and more energetic holes within the valence band, of CdSe QDs. Indeed, the HAXPES measurements indicate an offset of 0 eV between the valence bands of β-$Sn_{0.23}V_2O_5$ and CdSe QDs. Despite a considerably improved overlap of the Sn-derived midgap states of β-$Sn_{0.23}V_2O_5$ with the VB of CdTe, as compared to the Pb-derived midgap states in the β-$Pb_xV_2O_5$ case shown in FIG. 1A, a thermodynamic barrier to hole transfer from the VB edge still exists in heterostructures of the heavier chalcogenide. Energetic offsets and band alignments calculated from HAXPES data are listed in Table 1 and have been used to sketch the band alignments shown in FIGS. 3G and H (for CdSe alignment) and in FIG. 14 (for CdTe alignment). Bulk CdX (X=S, Se, and Te) bandgaps have been used to calculate the relative band alignments;[56] notably, quantum confinement is known to most substantially alter the energy positioning of the CB edges of QDs but has much less of an effect on the VB edges, which instead are determined by the electronegativity of the anion as per Fajan's formalism.[57,58] FIG. 15 shows HAXPES data which provide further evidence of the retention of the mixed valence vanadium oxidation state upon SILAR deposition of the chalcogenide QDs, consistent with XANES spectra collected for β$Sn_{0.23}V_2O_5$/CdSe (FIG. 3D). In summary, using HAXPES measurements, the existence of these midgap states near the upper edge of the VB has been confirmed and the anticipated overlap of the Sn-derived midgap states with the VB of CdSe QDs within β-$Sn_{0.23}V_2O_5$/CdSe heterostructures has been experimentally verified, achieving remarkable band alignment with an energetic offset of 0 eV.

Figure 4:
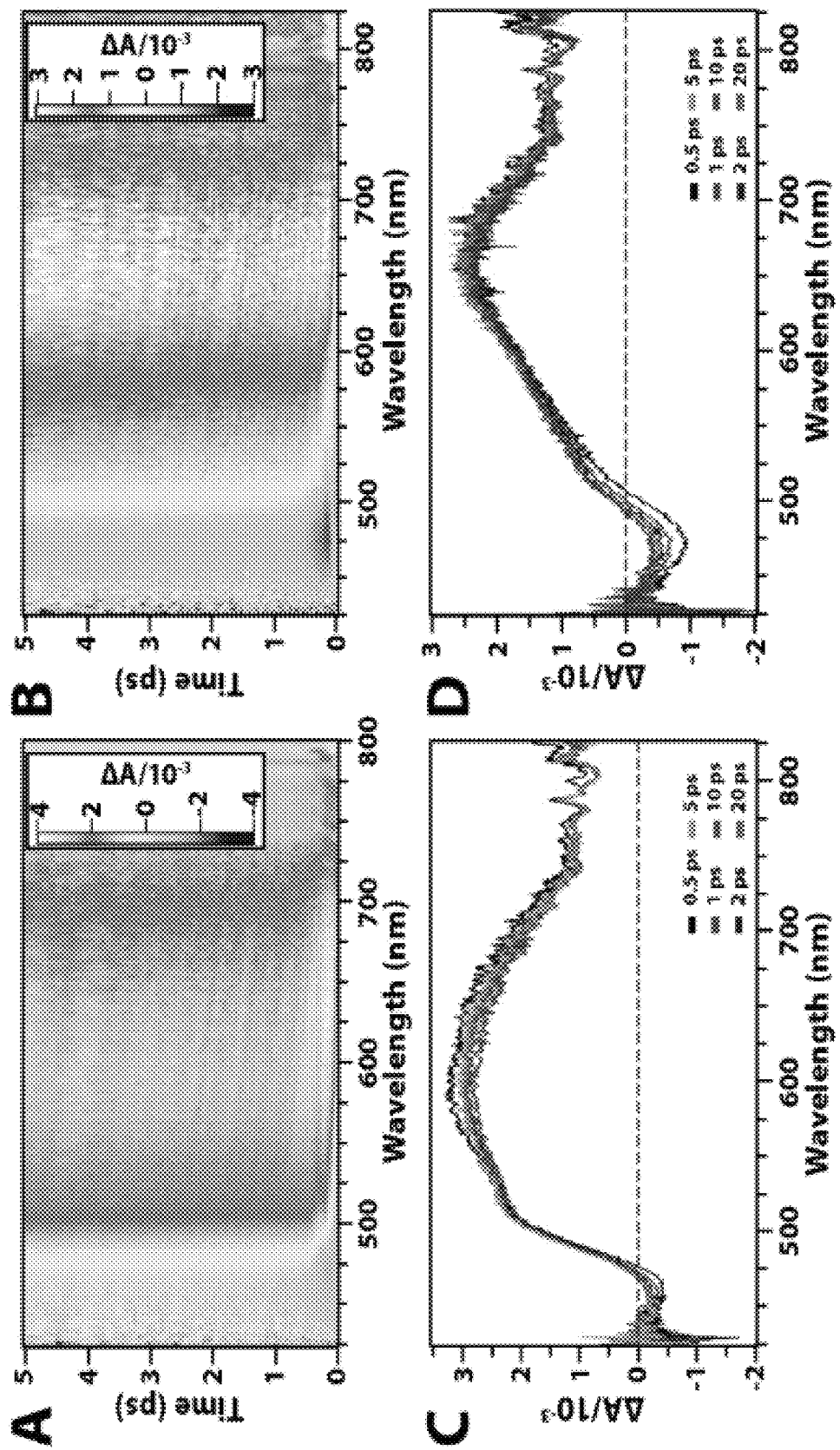
FIG. 4. Evidence of fast hole transfer dynamics from photoexcited CdSe QDs to occupied midgap states of β-$Sn_{0.23}V_2O_5$. Transient absorption (TA) intensity maps acquired for (A) β-$Sn_{0.23}V_2O_5$ nanowires and (B) β-$Sn_{0.23}V_2O_5$/CdSe heterostructures at delay times from 0-5 ps across a probe wavelength range of 425-825 nm at an excitation wavelength of 360 nm. TA spectra collected within the same time range for (C) β-$Sn_{0.23}V_2O_5$ nanowires and (D) β-$Sn_{0.23}V_2O_5$/CdSe heterostructures. Each individual spectrum in C and D is taken as a horizontal 'slice' of the 3D maps in A and B at specific delay times (integrated across: a ±0.1 ps time window for the 0.5 ps decay; a ±0.5 ps time window for 1, 2.5, and 5 ps decay traces; and a ±2.5 ps time window for 10, 20 ps decay traces). TA decay and recovery traces as well as multiexponential fits are shown in FIG. 16.

Dynamics of hole transfer between photoexcited CdX (X=Se, Te) and β-$Sn_xV_2O_5$. The central advance of this work is the experimentally realized improvement of the alignment of the Sn-derived midgap state with the VB of the CdSe QDs relative to the alignment of Pb-derived midgap states with CdSe QDs. We next turn our attention to determining whether the observed optimal interfacial energetics indeed promote efficacious or rapid hole extraction from the VB of photoexcited QDs using transient absorbance (TA) spectroscopy measurements.[11,12] FIG. 4 depicts three-dimensional (3D) TA color maps ranging between 0-5 ps and TA spectra acquired at various delay times (from 0.5-20 ps) for β-$Sn_{0.23}V_2O_5$ nanowires and β-$Sn_{0.23}V_2O_5$/CdSe heterostructures. The 3D TA color maps clearly elucidate the presence of transient induced absorption features (indicated in red) and the recovery of the transient bleaches (indicated in blue) as a function of delay time. The bare β-$Sn_{0.23}V_2O_5$ nanowires (FIGS. 4A and 4C) are characterized by two broad induced absorption bands at 500-600 nm and 650-750 nm as well as a bleach centered at ca. 465 nm. We have previously conducted TA spectroscopy studies of charge transfer processes in the structurally related β-$Pb_xV_2O_5$ and employed spectroelectrochemical measurements to assist in the interpretation of the nature of the observed induced absorption features;[11,12] accordingly, the short-wavelength induced absorption feature observed here for β-$Sn_{0.23}V_2O_5$ can be ascribed to transitions from deep VB states into the midgap states following initial photoexcitation of electrons from the midgap states (and thus is indicative of oxidation of the nanowires). The induced absorption band observed at longer-wavelengths can in turn be assigned to excitation of electrons in the conduction band of β-$Sn_{0.23}V_2O_5$ to higher energy states (corresponding to the reduction of the nanowires).[10,11] In other words, the shorter wavelength (500-600 nm) and longer wavelength (650-750 nm) induced absorption features can be assigned to excited-state holes in the midgap gap state and electrons situated in the conduction bands of β-$Sn_{0.23}V_2O_5$ nanowires, respectively. Upon direct photoexcitation at 360 nm, both bands are present in TA spectra within the instrument response time, corresponding to the creation of holes in the midgap states and excited electrons in the conduction band. The TA spectra of β-$Sn_{0.23}V_2O_5$/CdSe heterostructures (FIGS. 4B and 4D) show some stark differences from spectra acquired for the bare β-$Sn_{0.23}V_2O_5$ nanowires. A significant reduction in the induced absorption band at 500-600 nm is clearly discernible, which is a result of overlap with the characteristic excitonic bleach of CdSe QDs.[11] The bleach of the ground-state absorption of CdSe QDs, combining both first and second excitonic transitions, gives rise to an initial broad bleach feature in the ΔA spectra.[11,59] A pronounced rise of the β-$Sn_{0.23}V_2O_5$ induced absorption bands and the recovery of the CdSe bleach (to the blue-shifted bleach of β-$Sn_{0.23}V_2O_5$) is clearly distinguishable in the differential absorption spectra (ΔA) acquired within 5 ps. The recovery of the CdSe excitonic bleach at picosecond timescales is attributed to electron transfer from the conduction band of the QDs to the CB of β-$Sn_{0.23}V_2O_5$ nanowires (bleaches observed in excited QDs primarily reflect electron dynamics).[60,61] Note that this process occurs in binary heterostructures in the absence of protons or an electron-accepting reduction catalyst that would facilitate spatial separation of the hole and electron in photocatalysis. Given that the only time-resolvable event is electron transfer, hole-transfer from photoexcited CdSe QDs to the midgap states of β-$Sn_{0.23}V_2O_5$ occurs within the instrument response time on ultrafast sub-picosecond timescales,[11,12] whereas the electron transfer process can be resolved within the first few picoseconds. The excellent transfer kinetics observed for β-$Sn_{0.23}V_2O_5$/CdSe are consistent with those expected based on the quantitative band alignments shown in FIG. 1B. The photocatalysis measurements described below provide further evidence of improved charge separation and ultrafast hole transfer kinetics.

Figure 16:
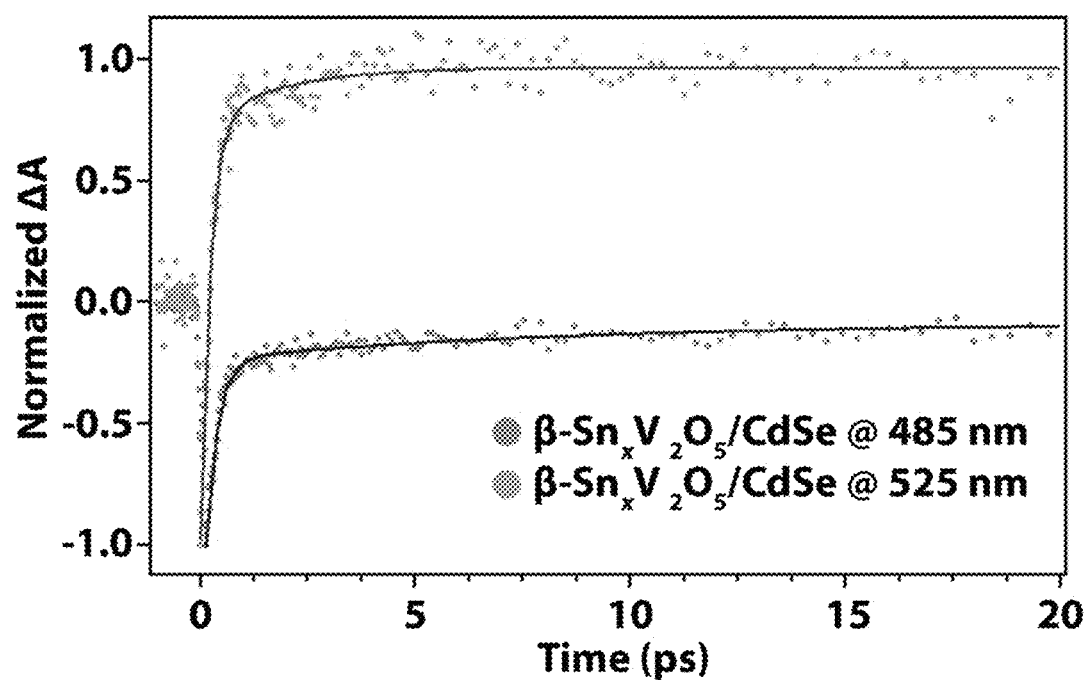
FIG. 16. Transient absorption (TA) kinetic traces with multiexponential fitting. A kinetic trace of collected TA data and multiexponential kinetic fitting for β-$Sn_xV_2O_5$/CdSe heterostructures at a probe wavelength of 485 nm (which effectively isolates the contribution from bleach feature of CdSe QDs) and 525 nm (which is a convolution of the contribution from the bleach feature of CdSe QDs and the induced absorption feature of the β-$Sn_xV_2O_5$ nanowires). The experimentally-observed absorbance difference values at each probe wavelength are displayed as red (525 nm) and blue (485 nm) dots, while the multiexponential kinetic fit to the data at each wavelength is displayed as a solid line of the same color. Kinetic fitting parameters and calculated average lifetimes are listed in Table 7.

TA recovery traces have been extracted and fitted for the exciton bleach feature attributed solely to QDs (centered at 485 nm); similarly, TA decay traces have been analyzed for an induced absorption band coupled to the QD bleach centered at 525 nm (FIG. 16). The TA recovery and decay traces have been fitted using multiexponential functions since multiple relaxation pathways are operational, including multiple trap-state-mediated recombination processes.[10,12] The fitting parameters used to describe the decay and recovery kinetics are listed in Table 7. Decay traces obtained for the β-$Sn_{0.23}V_2O_5$/CdSe heterostructures are well described using biexponential decay functions. As noted above, the hole transfer kinetics cannot be resolved within the instrument response time; however, the multiexponential fits suggest that complete recovery of the CdSe excitonic bleach and growth of the corresponding induced absorption band at 525 nm (both corresponding to electron transfer processes) occur within 1-2 ps. The deduced average lifetimes <τ> at probe wavelengths of 485 and 525 nm are calculated to be 0.4±0.1 ps and 0.3±0.1 ps, respectively (Table 7).

Figure 17:
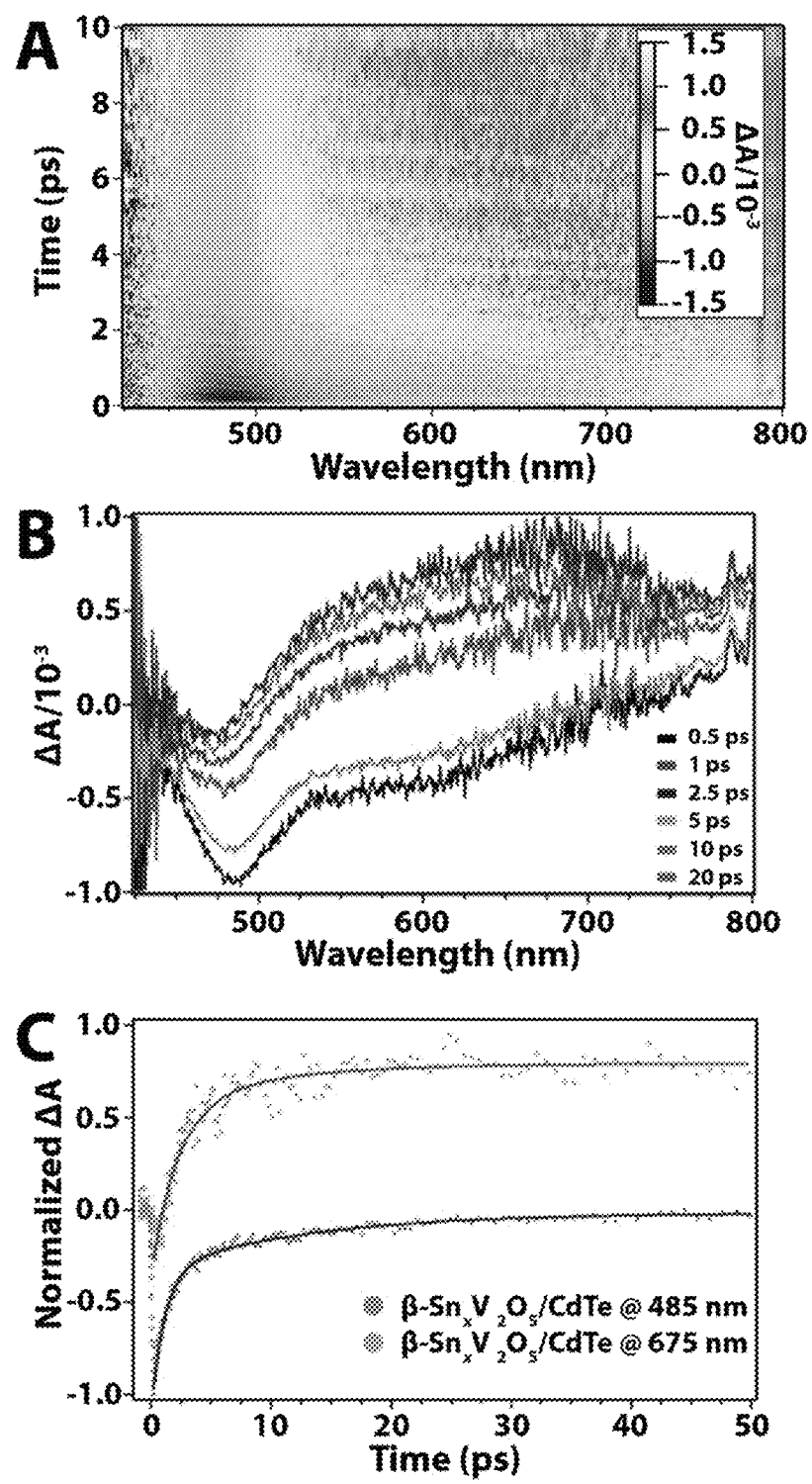
FIG. 17. Transient absorption data collected for β-$Sn_xV_2O_5$/CdTe heterostructures. (A) TA intensity map acquired for β-$Sn_xV_2O_5$/CdTe heterostructures in the delay time range of 0-10 ps across probe wavelength range of 425-800 nm at an excitation wavelength of 360 nm. TA spectra collected within a greater range of 0-20 ps for the same material. Each individual spectrum in (B) is taken as a horizontal 'slice' of the 3D intensity map in (A) at specific delay times (integrated across: a ±0.1 ps time window for the 0.5 ps decay; a ±0.5 ps time window for 1, 2.5, and 5 ps decay traces; and a ±2.5 ps time window for 10, 20 ps decay traces). (C) TA kinetic trace of the TA spectra and multiexponential kinetic fit for β-$Sn_xV_2O_5$/CdTe heterostructures at a probe wavelength of 485 nm (which effectively isolates the contribution from the bleach feature of CdTe QDs) and 675 nm (which is a convolution of the contribution from the bleach feature of CdTe QDs and the induced absorption of β-$Sn_xV_2O_5$ nanowires). The experimentally-observed absorbance difference values at each probe wavelength are displayed as red (675 nm) and blue (485 nm) dots, while the multiexponential kinetic fit to the data at each wavelength is displayed as a solid line of the same color. Kinetic fitting parameters and calculated average lifetimes are listed in Table 7.

Analogous TA data acquired for β-$Sn_{0.23}V_2O_5$/CdTe heterostructures is shown in FIGS. 17A and 17B. The stabilization of β-$Sn_{0.23}V_2O_5$ and the optimal placement of the Sn midgap state enable the use of CdTe QDs as the light-harvesting component, since the energetic offset (FIG. 1B and FIG. 14) is similar to the offset between β-$Pb_{0.31}V_2O_5$ and CdSe, which we have previously demonstrated to have sub-picosecond hole transfer.[11,12] Hole transfer kinetics are expected to be slower owing to the larger CB offset with β-$Sn_{0.23}V_2O_5$ as compared to CdSe (FIG. 1B and FIG. 14). The 3D TA intensity maps and time-resolved TA spectra are again consistent with ultrafast sub-picosecond hole transfer (which cannot be resolved within the instrument response time), whereas electron transfer (observed as recovery of the excitonic bleach of CdTe QDs)[62] is demonstrably slower as compared to the CdSe heterostructures. The pronounced rise of $\Delta A$ over time arises from the diminution of the excitonic bleach of CdTe, which is attributable to the injection of electrons from the CB of CdTe QDs to the CB of $\beta\text{-Sn}_{0.23}V_2O_5$. FIG. 17C illustrates the TA decay and recovery traces and their corresponding multiexponential fits measured for $\beta\text{-Sn}_{0.23}V_2O_5/\text{CdTe}$ heterostructures at 485 nm and 675 nm. The former corresponds to excitonic bleach CdTe QDs, whereas the latter has contributions from both the first excitonic feature of CdTe QDs and the induced absorption feature of $\beta\text{-Sn}_{0.23}V_2O_5$. The average lifetimes $<\tau>$ at 485 and 675 nm are 4.3±0.3 and 3.5±0.8 ps, respectively, which suggest a considerably slower electron transfer process as compared to the $\beta\text{-Sn}_{0.23}V_2O_5/\text{CdSe}$ heterostructures. The slower electron transfer dynamics can be attributed to the decreased thermodynamic driving force for charge transfer relative to $\beta\text{-Sn}_{0.23}V_2O_5/\text{CdSe}$ (FIG. 4).[63-66] In summary, the TA results attest to the ultra-fast hole extraction mediated by Sn-derived midgap states within $\beta\text{-Sn}_{0.23}V_2O_5/\text{CdX}$ heterostructures with notably improved offsets for charge transfer for CdSe as compared to CdTe.

Figure 5:
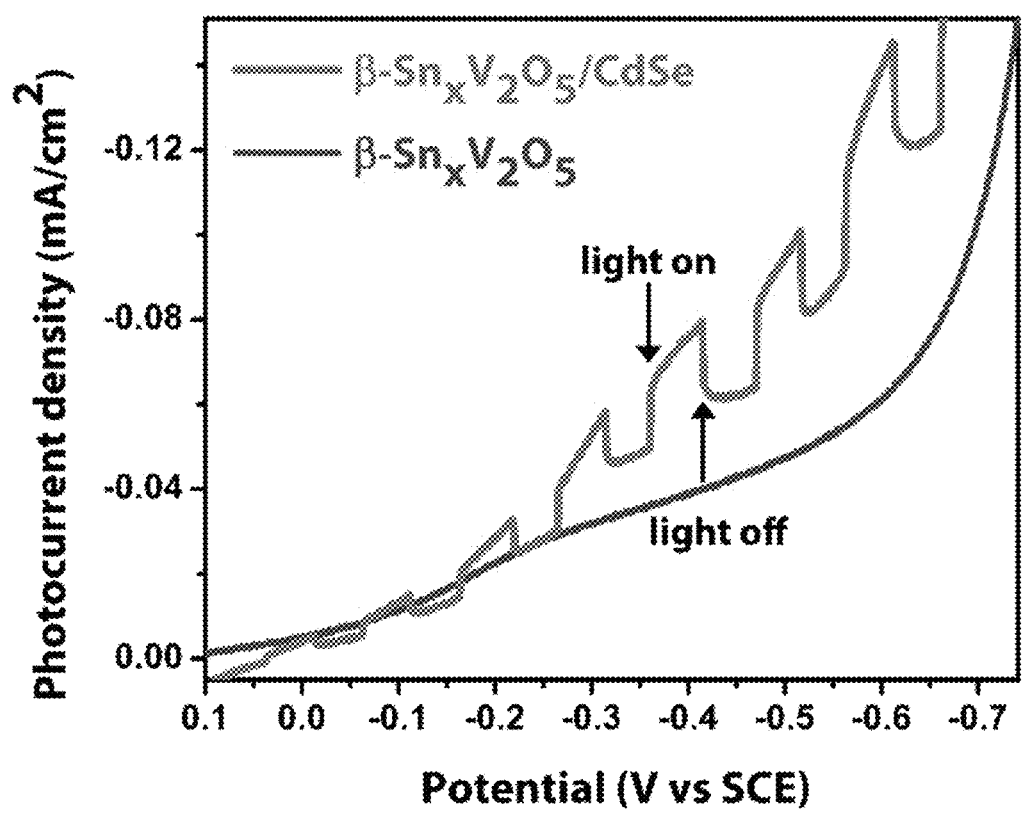
FIG. 5. Catalytic hydrogen evolution from β-$Sn_{0.23}V_2O_5$/CdSe heterostructures. Linear sweep voltammograms of three-electrode cells with β-$Sn_{0.23}V_2O_5$/CdSe-modified (orange) and the bare β-$Sn_{0.23}V_2O_5$-modified (green) working electrodes, under chopped white-light illumination (60 mW $cm^{-2}$). Only the β-$Sn_{0.23}V_2O_5$/CdSe-modified electrode (orange) exhibits reductive photocurrent, indicative of improved hole transfer.

Catalytic hydrogen-evolution activity of $\beta\text{-Sn}_{0.23}V_2O_5/\text{CdS}$ heterostructures. Finally, we have performed photoelectrochemical measurements to evaluate whether ultrafast charge separation could be exploited in the photocatalytic reduction of protons to hydrogen. Linear sweep voltammograms were acquired for bare fluorine-doped tin oxide (FTO) electrodes modified with $\beta\text{-Sn}_{0.23}V_2O_5/\text{CdS}$ heterostructures within a single-compartment three-electrode cell under chopped visible-light (400-720 nm) illumination. The electrolyte contained lactic acid as the source of protons and a sacrificial reductant. Reductive photocurrents were measured at applied potentials more negative than 0.05 V versus SCE. The onset of photocurrent is more than 600 mV positive relative to the onset of dark reduction (FIG. 5), consistent with the reduction of photogenerated holes rather than ground-state holes situated in the conduction band of QDs or NWs. The observed photocurrent saturates at approximately −0.6 V versus SCE. It is crucial to note that, despite its semiconducting nature, no photocurrents were measurable for bare $\beta\text{-Sn}_{0.23}V_2O_5$ electrodes (FIG. 5, green trace). Taken together, these data are consistent with the measured TA data, suggesting that the transfer of photoinduced holes from CdSe to $\beta\text{-Sn}_{0.23}V_2O_5$ increases the lifetimes of electrons and holes and promotes subsequent reduction processes, giving rise to the measured photocurrents.

Figure 18:
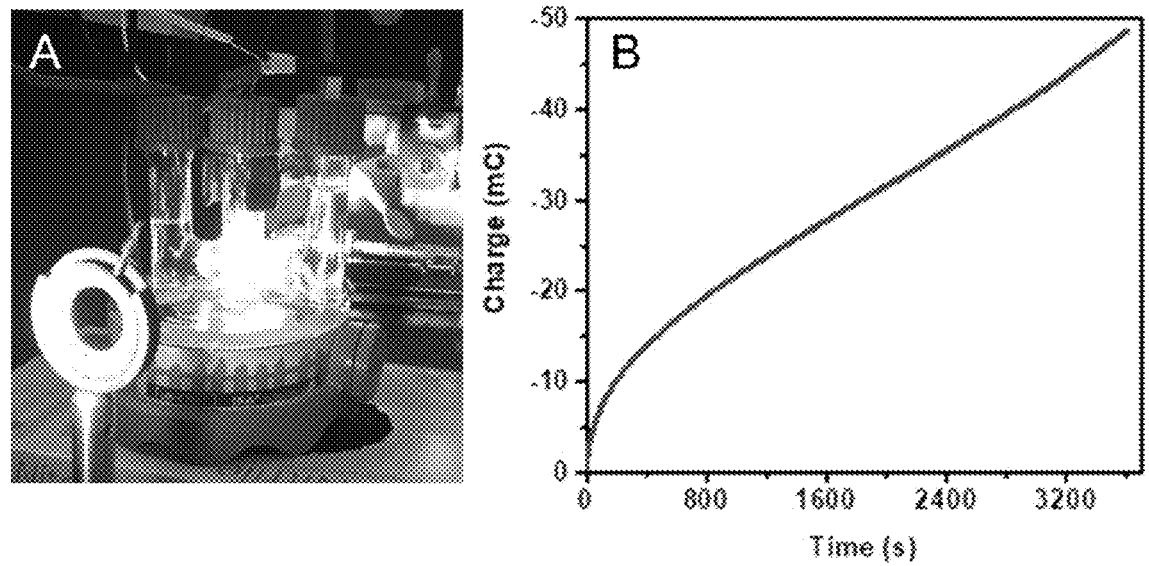
FIG. 18. Chronocoulometry data collected for β-$Sn_xV_2O_5$/CdSe heterostructures. (A) Three-electrode photoelectrochemical cell with β-$Sn_xV_2O_5$/CdSe photocathode, Pt mesh counter electrode, and SCE reference electrode. (B) Chronocoulometry (charge versus time) data collected under visible-light illumination at 120 mW/$cm^2$ at an applied potential of 0 V versus NHE. The electrolyte was a solution of $Ni^{2+}$ (10 mM), 3-MPA (20 mM), 0.2 M $KNO_3$, and 0.1 M lactic acid in a 1:4 (v:v) water:acetonitrile (pH=3) mixture and was degassed with Ar prior to the measurements.
Figure 19:
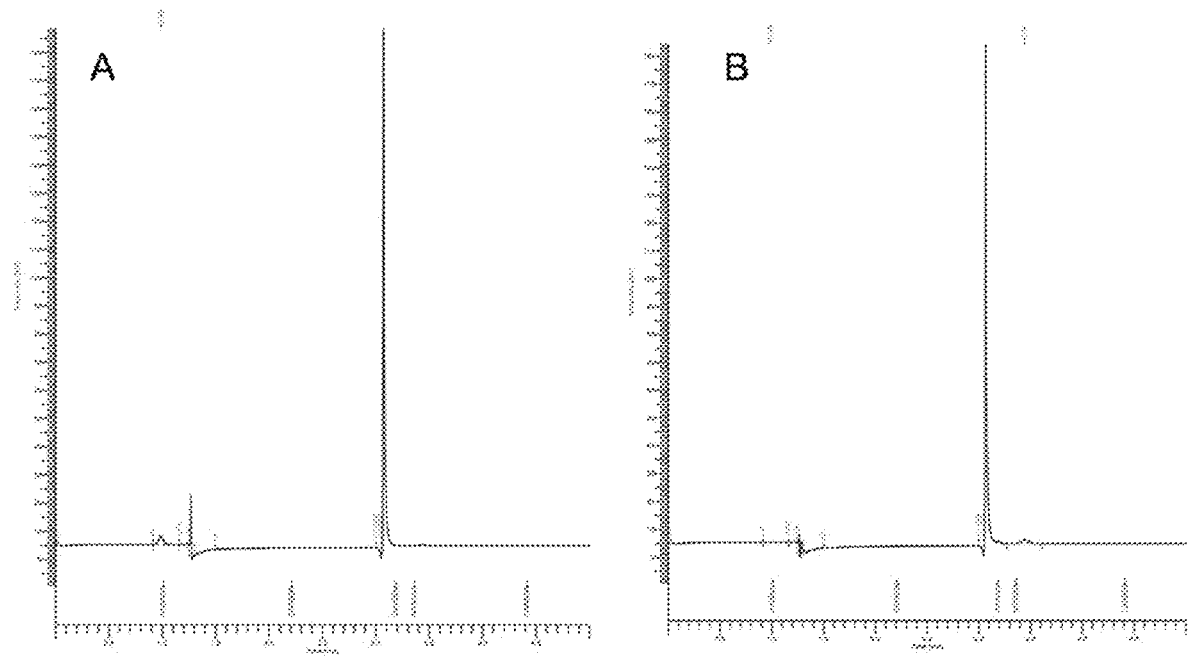
FIG. 19. Quantitative analysis of headspace by gas chromatography (GC) following catalytic measurements. A gas chromatogram of the headspace above the electrolyte following chronocoulometry measurements under visible-light illumination at 120 mW/$cm^2$ (A) and in the dark (B). Peaks attributable to $H_2$ are observed in the data for the illuminated sample, at a retention time of approximately 1 min. The peaks at longer retention times correspond to column switches.

To further investigate the mechanism of reductive photocatalysis, chronocoulometry data were acquired for heterostructure-modified electrodes (FIG. 18), and, following prolonged white-light illumination, the headspace above the electrolyte was sampled by gas chromatography (FIG. 19). Hydrogen was the sole photoproduct with no other detectable products in the headspace. In a typical measurement, 0.20 μmol of $H_2$ was evolved with the passage of 50 mC of cathodic charge upon 1 h of illumination; the average Faradaic efficiency was 82±5%. In control experiments, no $H_2$ was detectable as a product in the absence of illumination or photocatalyst, or for electrodes modified with bare, unfunctionalized $\beta\text{-Sn}_{0.23}V_2O_5$ nanowires. These results provide compelling evidence that photoinduced transfer of holes from CdSe QDs to midgap states of $\beta\text{-Sn}_{0.23}V_2O_5$ nanowires and the corresponding increase in charge-carrier lifetimes both enable the photocatalytic reduction of protons to hydrogen.

Conclusions

Rapid and efficient extraction of holes from the valence band of photoexcited QDs represents a formidable challenge that requires consideration of both thermodynamic offsets and interfacial charge transfer kinetics. The theory-guided design and topochemical synthesis of metastable $\beta\text{-Sn}_{0.23}V_2O_5$ paves the way to $\beta\text{-Sn}_{0.23}V_2O_5/\text{CdSe}$ heterostructures wherein Sn 5s-derived midgap states are ideally positioned to extract photogenerated holes from CdSe QDs. The energetic offsets have been verified by photoemission spectroscopy measurements and <0.5 ps hole transfer kinetics have been observed within these heterostructures. The reconfiguration of $\zeta\text{-V}_2O_5$ to precisely position states derived from stereoactive lone pairs of p-block cations, achieved through development of a novel and highly versatile topochemical synthesis route, represents a significant advance in materials design and suggest a versatile strategy for optimizing energetic offsets. The $\beta\text{-Sn}_{0.23}V_2O_5/\text{CdSe}$ heterostructures evidence rapid excited-state charge-transfer kinetics and are shown to be viable light-harvesting and charge-separating photocatalytic architectures capable of efficacious hydrogen evolution. It may be desirable to ternary heterostructures with the inclusion of an electron acceptor to enhance charge separation.

Experimental Section

Experimental methods employed for DFT calculations, preparation of the empty $\zeta\text{-V}_2O_5$ nanowire precursor compound, preparation of $\beta\text{-Sn}_{0.23}V_2O_5/\text{CdX}$ (X=Se, Te) heterostructures, preparation of additional $\beta\text{-M}_xV_2O_5$ bronzes (M=Ni, Co), and in performing additional characterization techniques (SEM, TEM, STXM) are described in Example 2.

Topochemical Synthesis of Metastable $\beta\text{-M}_xV_2O_5$ Nanowires and Heterostructure Assembly. Metastable $\beta\text{-Sn}_{0.23}V_2O_5$ nanowires were synthesized by reacting $\zeta\text{-V}_2O_5$ nanowires with metal oxalate precursors. In a typical reaction, stoichiometric amounts of $\zeta\text{-V}_2O_5$ (described in Example 2) and $SnC_2O_4$ (oxalate salt) were mixed in a 4:1 molar ratio and lightly ground together using a mortar and pestle in a slurry of dry hexanes for 30 min. The dried mixture was then transferred to a ceramic crucible and placed inside a tube furnace (Thermo Scientific). The materials were heated at 350° C. for 12 h under a combination of vacuum and flowing Ar atmosphere (100 mL·min$^{-1}$), to help facilitate removal of evolved $CO_2$ and avoid metal oxide/carbonate byproduct formation. The green powders obtained after the first thermal treatment were again manually ground together using a mortar and pestle and annealed for second time at the same temperature and pressure detailed above for 4 h to obtain phase-pure samples. $\beta\text{-Sn}_{0.23}V_2O_5$ nanowires were subsequently interfaced with CdX QDs using the SILAR method.[10-12] During this process, the nanowires were dispersed sequentially in cationic and anionic precursor solutions to grow CdX (X=Se, Te) QDs on the surface of the nanowires as described in Example 2.

HAXPES and XPS measurements. Hard X-ray photoelectron spectroscopy (HAXPES) measurements were conducted at the Surface and Interface Structural Analysis beamline (beamline I09) of the Diamond Light Source, Ltd. (DLS), UK. The beamline has two canted undulators that enable access to photon energies spanning the range from 100 eV to 20 keV. The photon beam was monochromated using a channel-cut Si (004) crystal following a Si(111) double-crystal monochromator. Photoelectron spectra were energy resolved and measured using a VG Scienta EW40000 high-energy analyzer with a 60° acceptance angle. Measurements were performed at hv≈keV with an overall energy resolution of better than 250 meV.[67] XPS measurements were performed using a Phi VersaProbe 5000 laboratory instrument outfitted with a monochromated Al Kα source and a hemispherical analyzer with an overall resolution of 450 meV. A flood-gun was employed to achieve charge neutralization. All samples were measured with both XPS and HAXPES. For HAXPES, the samples were rastered to avoid possible beam damage. The (HA)XPS spectra were energy calibrated to O 1s and V 2p core-levels of reference ζ-$V_2O_5$ (energy aligned to the Fermi level of a gold foil) in order to account for any shifts due to charging. Further details of the instrumental set up have been described by Lee and Duncan.[67]

Transient absorption measurements. Ultrafast TA spectra were collected using a Ti:sapphire amplified laser (Spectra-Physics Spitfire Pro, 800 nm, 1 kHz repetition rate, 100 fs pulse) with detection using Helios spectrometers (Ultrafast Systems). The majority (90%) of the laser pulse from the amplifier was passed through an optical parametric amplifier (OPA; Light Conversion Ltd.) to produce pump pulses of tunable wavelengths. The remaining 10% of the amplifier output was used to generate a white light continuum from 425-900 nm by focusing a fraction of the 800 nm laser pulse into a sapphire disc. The resulting broadband white light continuum was split into probe and reference beams. Both probe and reference beams were directed into a fiber-coupled silicon (visible) or InGaAs (infrared) diode array on a shot-by-shot basis. The delay time between pump and probe was mechanically controlled by a motorized delay stage (Newport). TA decay traces were compiled by averaging ΔA values over a given range of probe wavelengths at each delay time. Thin films prepared by spray-coating a dispersion of β-$Sn_{0.23}V_2O_5$/CdX (X=Se, Te) powders in ethanol onto glass microscope slides at a concentration of 1 mg/mL were used for all TA measurements. Methods for analyzing decay traces are described in Example 2.

Photoelectrochemical measurements. Photoelectrochemical measurements, including linear sweep voltammetry and chronocoulometry, were acquired with a Princeton Applied Research (PAR) VersaSTAT 3 potentiostat. Data were acquired at room temperature using a custom-built, air-tight three-compartment electrochemical cell (FIG. 18) with β-$Sn_{0.23}V_2O_5$/CdSe-modified FTO or β-$Sn_{0.23}V_2O_5$-modified FTO as the working electrode, a coiled Pt wire as the auxiliary electrode, and saturated calomel electrode (SCE) as the reference electrode. The electrolyte consisted of $KNO_3$ (0.2 M), lactic acid (0.1 M), and a Ni(3-MPA) co-catalyst (formed in situ from $Ni^{2+}$ (10 mM) and 3-MPA (20 mM)) dissolved in a 1:4 (v:v) water:acetonitrile (pH=3) solution. Linear sweep voltammograms were measured at a scan rate of 10 mV·$s^{-1}$ under manually chopped illumination (5 s on/off). A Luxeon Rebel Star cool white 700 mA LED was used as the light source with an intensity of 60 mW/$cm^2$. For $H_2$ generation measurements, the electrochemical cell was first purged with Ar for 30 min. The light source was a 100 W Xe arc lamp (Oriel 133 Photomax) equipped with a filter transmitting light from 400 to 720 nm (120 mW/$cm^2$). Further details of the analysis of $H_2$ generation are included in Example 2.

Example 2

All references found in this Example are listed in References List 2.

DFT calculations. DFT-based[1,2] electronic structure calculations of β-$Sn_{0.23}V_2O_5$ and β-$Pb_{0.33}V_2O_5$ were carried out using the QUANTUM ESPRESSO package.[3] The Perdew-Burke-Ernzerhof functional[4] was used to describe the exchange and correlation terms along with ultrasoft pseudopotentials to accurately describe the electron-ion interactions.[4,5] Vanadium 3s and 3p, tin 4d, and lead 5d semicore electrons were included in the calculations. A relatively high cutoff energy of 60 Ry was used for the plane wave expansion of the wave functions. All structures were optimized until the residual forces were smaller than $10^{-4}$ Ry/a.u. The Brillouin zone integration was carried out using a 5×5×5 uniform k-grid for structural models containing 88 atoms. For the density of states (DOS) calculations, a higher k-grid density of 10×10×10 was used.

Fitting of XPS peak areas and determination of Sn oxidation states. XPS peak areas were determined by fitting with Voight profile peaks having a Gaussian width of 0.5 eV to match the experimental resolution. FIG. 7D displays curve-fitting results of the XPS O 1s and V 2p spectra of β-$Sn_{0.23}V_2O_5$. The inelastic background has been subtracted using Shirley-like profile. The charge state was assigned based on the relative energy difference between the O 1s and V $2p_{3/2}$ peaks, using the method described by Silversmit et al.[6] Peak centroid values obtained by fitting the XPS data in FIG. 7D (12.9 eV and 14.2 eV) are in good agreement with expected values for $V^{5+}$ and $V^{4+}$, respectively. The amount of vanadium reduction, based on the peak $V^{5+}$ and $V^{4+}$ areas (i.e. $V^{4+}/(V^{4+}+V^{5+})$), was determined to be 0.20. This value further confirms the expected ratio of 0.23 fractional occupancy obtained for tin (β-$Sn_{0.23}V_2O_5$) by Rietveld refinement of the PXRD data. Given that XPS is surface-sensitive, we expect a small contribution of the $V^{4+}$ is surface, which would account for the small discrepancy between 0.20 and 0.23.

Synthesis of metastable ζ-$V_2O_5$ precursor. ζ-$V_2O_5$, a tunnel-structured metastable polymorph of $V_2O_5$, has previously been stabilized based on topochemical extraction of Ag-ions from β-$Ag_{0.33}V_2O_5$;[7,8] however, this method leaves residual Ag-ions within the structure ranging between x=0.04-0.06, which obscure the upper edge of the valence band in X-ray emission spectroscopy measurements owing to the large absorption cross-section of Ag 4d states. Consequently, an alternate method has been developed here based on extraction of Cu-ions from β'-$Cu_xV_2O_5$, which reduces the copper content down to x=0.0004 based on refinement of the powder XRD pattern.[7,8] In a typical reaction, β'-$Cu_{0.5}V_2O_5$ nanowires were synthesized hydrothermally, adapting a previously reported synthesis.[9] In a typical reaction, $V_2O_5$ (Beantown Chemical, 99.5%), $VO(C_5H_7O_2)_2$ (Beantown Chemical), and $Cu(NO_3)_2$ hemipentahydrate (Sigma Aldrich, 98%) (total mass loading of 300 mg, in a 3:5:3 stoichiometric ratio) were dispersed in 16 mL of deionized water (p=18 MΩ·$cm^{-1}$) and subsequently added to a 23 ml polytetrafluoroethylene-lined autoclave (Parr) and subsequently allowed to react at 210° C. for 24 h.[9] The resulting nanowires were washed with copious amounts for water and 2-propanol and dried in air overnight. Subsequently, Cu-ions were leached out of the material by reacting the nanowires with a 0.5 M aqueous solution of $Na_2S_2O_8$ at 80° C. for 48 h using a 8:1 $Na_2S_2O_8$:$Cu_{0.5}V_2O_5$ molar ratio. The resulting nanowires were washed several times with deionized water (p=18 MΩ·$cm^{-1}$) to facilitate complete removal of surface-adsorbed Na-ions.

Design strategies for the oxalate decomposition route and synthesis of additional β-$M_xV_2O_5$ bronzes (M=Ni, Co, Pb). Divalent oxalate salts decompose at various temperatures,[10] as per:

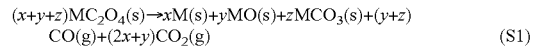

$(x+y+z)MC_2O_4(s) \rightarrow xM(s)+yMO(s)+zMCO_3(s)+(y+z)CO(g)+(2x+y)CO_2(g)$ (S1)

where the specific decomposition product (metal, metal oxide, metal carbonate) or ratio of products is contingent on both synthetic conditions and on the electronegativity of the cation, M. When decomposed under ambient atmosphere, oxide and carbonate (y, z>0) are predominantly observed, as would be expected with oxidation of any metal products, M.[10] But under inert conditions ($N_2$, Ar, vacuum), the decomposition route is dependent primarily on the electronegativity of the element, M.[10] For more electronegative metal cations, x approaches unit and metallic products predominate. Thus, notably, the approach developed here cannot be used for insertion of electropositive metals (e.g., Na, K); the oxalate salts of these cations are instead rapidly decomposed to their respective carbonates and reactions proceed according to a different mechanism or not at all.[10,11] For reactions where M=Ni, Co (in $MC_2O_4$), materials were prepared in a similar fashion to that described in the methods section of the main manuscript (as described for the synthesis of $\beta$-$Sn_xV_2O_5$), except a 1:3 ratio of $\zeta$-$V_2O_5$:$MC_2O_4$ was used given the higher observed occupancies achieved for these cations within the tunnels. In these instances, reaction temperatures were also varied between 300-400° C. to ensure temperatures exceeded the corresponding oxalate decomposition temperature.[10]

Synthesis of $\beta$-$Sn_xV_2O_5$/CdX (X=Se, Te) QD heterostructures. $\beta$-$Sn_xV_2O_5$ nanowires were interfaced with CdX QDs using the SILAR method in a glovebag under an argon atmosphere.[12-14] In a typical SILAR process, as-prepared $\beta$-$Sn_xV_2O_5$ nanowires were first dispersed in an ethanol solution of the cadmium precursor ($Cd(NO_3)_2 \cdot H_2O$, Alfa Aesar, 98.5%) for 45 seconds under manual stirring, washed with ethanol, and recovered by centrifugation at 6000 rpm for 2 minutes. In a second step, the material was then immersed in an ethanol solution of the sodium chalcogenide precursor ($Na_2X$, Alfa Aesar, 99.8% in ethanol, X=Se, Te) for 45 seconds under manual stirring, washed with ethanol, and finally recovered by centrifugation at 6000 rpm for 2 minutes. One SILAR cycle thus comprises immersion in the cadmium precursor solution and an ethanol washing step, followed immediately by immersion in the chalcogenide precursor and an ethanol washing step. Three complete SILAR cycles were performed to prepare the $\beta$-$Sn_xV_2O_5$/CdX heterostructures examined in this study. After three SILAR cycles, the heterostructures were washed with a large excess of ethanol to remove excess QDs not adhered to the nanowire surfaces and were finally allowed to dry at room temperature under ambient conditions.

Hydrothermal synthesis of $\beta$-$Pb_{0.31}V_2O_5$ nanowires. Nanowires of $\beta$-$Pb_{0.31}V_2O_5$ were also synthesized according to a previously reported method.[15] In a typical reaction, 0.1230 g of $Pb(COOCH_3)_2 \cdot 3H_2O$ (Alfa Aesar, 99%) were dissolved in 16 mL of deionized water (18 M$\Omega$·cm$^{-1}$). 0.1770 g of $V_2O_5$ (Beantown Chemical, 99.99%) was suspended in this solution (1:3 Pb:$V_2O_5$ molar ratio) and the reaction mixture was added to a 23 mL polytetrafluoroethylene-lined stainless-steel autoclave (Parr). The autoclave was heated at 250° C. for 72 h and subsequently allowed to cool to room temperature. The resulting green powder was separated from the supernatant and washed with copious amounts of deionized water and 2-propanol.

Structural characterization of $\beta$-$Sn_{0.23}V_2O_5$ nanowires and $\beta$-$Sn_xV_2O_5$/CdX heterostructures. X-ray diffraction (XRD) patterns were collected in Bragg-Brentano geometry on a D8-focus diffractometer (Cu K$\alpha$ radiation; $\lambda$=1.5418 Å; 40 kV voltage; 25 mA current). All Rietveld refinements and Pawley fitting of lattice parameters were performed using the EXPGUI user interface of GSAS I.[16] Atomic positions, profile terms, lattice parameters, and inserted metal occupancies (M=Sn, Ni, Co, Pb) were refined from laboratory XRD data using isotropic thermal parameters. All crystal structure renditions were prepared using the Vesta III software suite (JP-Minerals).[17]

Low-magnification transmission electron microscopy (TEM) images were collected using a JEOL JEM-2010 electron microscope at an operating voltage of 200 kV. High-resolution transmission electron microscopy (HR-TEM) images and selected area electron diffraction (SAED) patterns were acquired using a FEI Tecnai G2 F20 FE-TEM operated at 200 kV. Prior to imaging, powder samples were dispersed in ethanol and drop-cast onto formvar-coated 400 mesh grids. Scanning electron microscopy (SEM) images, energy dispersive X-ray (EDX) spectra, and elemental maps were collected using a FEI Quanta 600 FE-SEM operated at 10 kV equipped with an Oxford EDX elemental characterization system as well as on a JEOL JSM-7500F FE-instrument equipped with a high-brightness conical field-emission gun, a low aberration conical objective lens, and an Oxford EDS spectrometer (Oxford). Prior to imaging, powdered heterostructure materials were affixed to conductive carbon tape or drop-cast from a dispersion of nanowires in 2-propanol onto $SiO_2$/Si wafer substrates.

Scanning transmission X-ray microscopy (STXM) measurements. STXM measurements were performed at the SM beamline (10ID-1) of the Canadian Light Source. A 25-nm outermost-zone zone plate was used to obtain spatial resolution better than 20 nm. V L- and O K-edge energy stacks were acquired using a 500-lines/mm plane grating monochromator. The incident photon flux ($I_0$) was adjusted to 18 MHz during focusing, as read by the STXM detector through a hole within the substrate. Right circularly polarized X-rays, generated by an elliptically polarized undulator (EPU gap optimized to −0.9), were used for the measurements. All STXM data were analyzed and processed using aXis2000 software (unicorn.mcmaster.ca/aXis2000.html).

Fitting of transient absorption (TA) decay traces with multiexponential functions. The TA decay traces were fitted with multiexponential functions of the form:

$$\Delta A = \Delta A_0 + \sum_i A_i e^{\left(-\frac{t}{\tau_i}\right)} \tag{S2}$$

where $\Delta A$ is the differential absorbance, $\Delta A_0$ is the differential absorbance that the data approaches at long timescales, $A_i$ is a pre-exponential weighting factor for the ith exponential term, t is the delay time, and $\tau_i$ is the lifetime of each term. The best fits was achieved using the smallest number of individual decay lifetimes (xi) while minimizing $\chi^2$.[14] The average carrier lifetime was obtained using Equation S3, which normalizes the amplitude-weighted lifetime using a pre-exponential weight factor, $A_i$:

$$\langle \tau \rangle = \frac{\sum_i A_i \tau_i}{\sum_i A_i} \tag{S3}$$

Quantitative analysis of $H_2$ generation. For gas quantification, a sample of gas (3 mL) was obtained with a 10 mL gastight syringe from the headspace above the electrolyte (in the cell depicted in FIG. 18) and was analysed with a Perkin Elmer Clarus 580 GC (thermal conductivity detector, Ar carrier gas). The Faradaic efficiency was calculated using the following equation:

$$\text{Faradaic efficiency}(\%) = \frac{[\text{H2 produced (mol)} \times 2 \times 96485 \text{ (C/mol)}]}{\text{Charge passed during electrolysis (C)}} \times 100\%$$

TABLE 1

Figure 1:
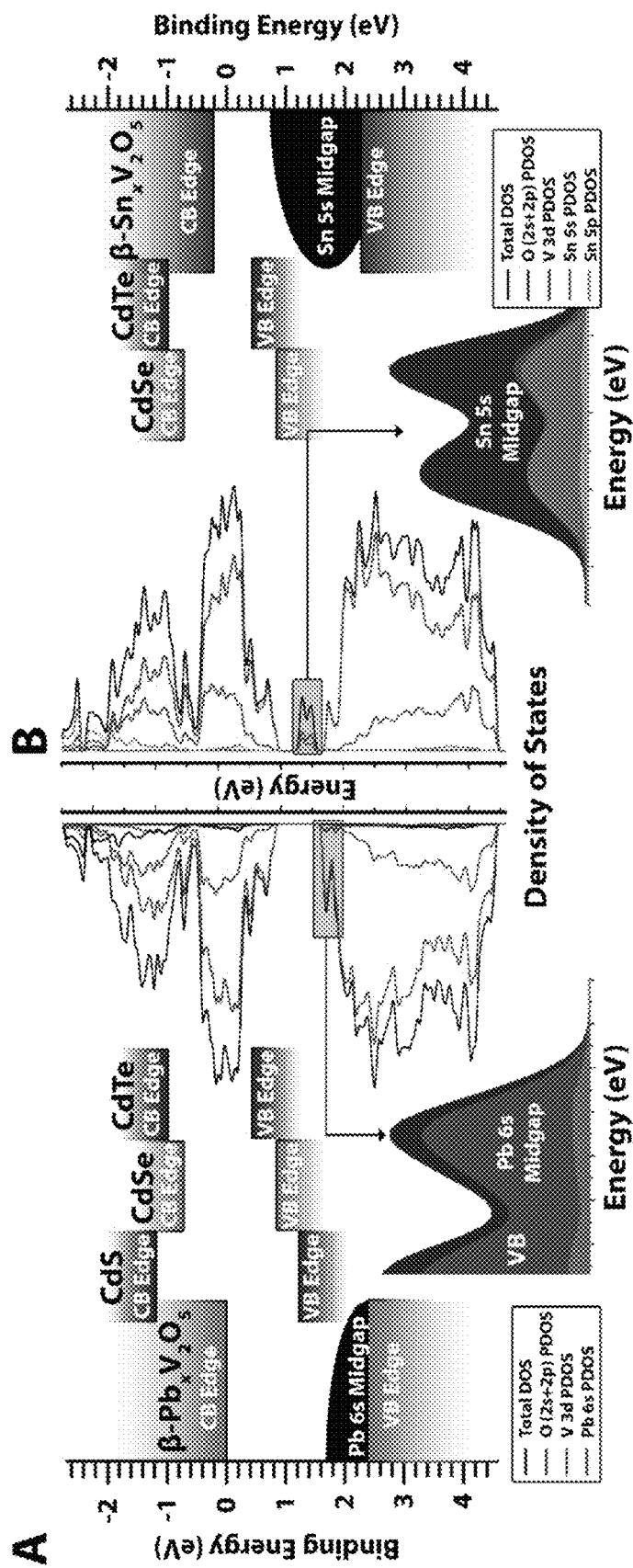
FIG. 1. Schematic depiction of energetic offsets of $M_xV_2O_5$/QD heterostructures. The schematic illustrates the importance of modulating the electronic structure of both semiconducting components to achieve the desired outcome of extraction of photogenerated holes from QDs to the mid-gap states of the $M_xV_2O_5$ nanowires. (A) Energy positioning of mid-gap states of $\beta$-$Pb_xV_2O_5$ with respect to the valence band (VB) and conduction band edges (CB) of chalcogenide QDs, CdX (X=S, Se, Te), as determined from HAXPES and optical spectroscopy measurements, and calculated total and projected density of states.[10-12] The mid-gap states are derived from anti-bonding Pb $6s^2$-O 2p interactions. (B) Total and projected density of states calculated for $\beta$-$Sn_{0.23}V_2O_5$ and energy positioning with respect to the VB and CB edges of CdSe QDs. The relatively greater thermodynamic driving force for hole transfer from the top of the CdSe valence band to the mid-gap states of $\beta$-$Sn_{0.23}V_2O_5$ (as compared to $\beta$-$Pb_xV_2O_5$) is clearly discernible. Relative band alignments used to construct the figure are delineated in Table 1 and are depicted in more detail in FIG. 14. DFT calculations are depicted in greater detail in FIG. 3 and FIG. 7.

Energetic positioning of the valence band edges (VBE, determined from XPS measurements), band gaps (determined from diffuse reflectance spectroscopy (DRS) measurements), and maxima of midgap states (determined from HAXPES) used to construct the relative band alignment diagram sketched in FIGS. 1 and 14.

| Sample | VBE (eV) | Band gap (eV) | Midgap state max. (eV) |
|---|---|---|---|
| $\beta\text{Sn}_{0.23}\text{V}_2\text{O}_5$ | 2.3 (XPS,)[13] | 2.4 (DRS) | 0.85 (XPS) |
| $\beta\text{-Pb}_{0.31}\text{V}_2\text{O}_5$ | 2.4 (XPS)[13] | 2.4 (DRS) | 1.6 (HAXPES)[13] |
| CdS | 1.25 (XPS)[13] | 2.42[20] | N/A |
| CdSe | 0.85 (XPS)[13] | 2.73[20] | N/A |
| CdTe | 0.3 (XPS) | 1.45[20] | N/A |

TABLE 2

Refinement statistics, lattice parameters, and atom positions as obtained from Rietveld refinement of pattern for $\beta\text{-Sn}_{0.225}\text{V}_2\text{O}_5$ plotted in FIG. 2B.
a = 15.339(2) Å; b = 3.6217(3) Å; c = 10.0781(8) Å;
$\beta$ = 109.829(7)°; V = 526.67(6) Å³;
$\chi^2$ = 6.147; Rw = 6.52%; wRp = 8.96%

| Atom | x | y | z | Occupancy | Uiso |
|---|---|---|---|---|---|
| Sn(1) | 1.0095(12) | 0.00 | 0.412(2) | 0.225(6) | 0.006 |
| V(1) | 0.1189(8) | 0.00 | 0.1209(11) | 1.0 | 0.008 |
| V(2) | 0.3511(9) | 0.00 | 0.1032(14) | 1.0 | 0.008 |
| V(3) | 0.2965(8) | 0.00 | 0.4175(13) | 1.0 | 0.008 |
| O(1) | 0.00(0) | 0.00(0) | 0.00(0) | 1.0 | 0.015 |
| O(2) | 0.0958(25) | 0.00 | 0.285(4) | 1.0 | 0.015 |
| O(3) | 0.1529(24) | 0.50 | 0.095(4) | 1.0 | 0.015 |
| O(4) | 0.2533(24) | 0.00 | 0.214(4) | 1.0 | 0.015 |
| O(5) | 0.4482(23) | 0.00 | 0.254(4) | 1.0 | 0.015 |
| O(6) | 0.3258(23) | 0.50 | 0.0228(33) | 1.0 | 0.015 |
| O(7) | 0.4129(27) | 0.00 | 0.518(4) | 1.0 | 0.015 |
| O(8) | 0.2748 | 0.50 | 0.3861 | 1.0 | 0.015 |

TABLE 3

Bond angles and lengths for $\text{MO}_x$ polyhedra as obtained from Rietveld refinement of the XRD pattern acquired for $\beta\text{-Sn}_{0.225}\text{V}_2\text{O}_5$ plotted in FIG. 2B.

| V—O Polyhedra | V—O | Distance (Å) | O—V—O | Angle (°) |
|---|---|---|---|---|
| V(1)O$_6$ Octahedra | V(1)—O(1) | 1.818(10) | O(1)—V(1)—O(3) | 99.5(11) |
| | | | O(1)—V(1)—O(4) | 167.9(14) |
| | V(1)—O(2) | 1.81(4) | O(1)—V(1)—O(6) | 95.4(10) |
| | | | O(2)—V(1)—O(3) | 105.8(11) |
| | V(1)—O(3) | 1.927(13) | O(2)—V(1)—O(3) | 105.8(11) |
| | | | O(2)—V(1)—O(4) | 93.5(15) |
| | V(1)—O(3) | 1.927(13) | O(2)—V(1)—O(6) | 166.0(16) |
| | | | O(3)—V(1)—O(3) | 140.0(22) |
| | V(1)—O(4) | 1.954(35) | O(3)—V(1)—O(4) | 77.1(12) |
| | | | O(3)—V(1)—O(6) | 71.7(12) |
| | V(1)—O(6) | 1.91(4) | O(3)—V(1)—O(4) | 77.1(11) |
| | | | O(3)—V(1)—O(3) | 71.7(11) |
| | | | O(4)—V(1)—O(6) | 72.5(15) |
| V(2)O$_6$ Octahedra | V(2)—O(3) | 1.98(4) | O(3)—V(2)—O(4) | 137.4(13) |
| | | | O(3)—V(2)—O(5) | 127.5(21) |
| | V(2)—O(4) | 2.15(4) | O(3)—V(2)—O(6) | 69.5(10) |
| | | | O(3)—V(2)—O(6) | 69.5(10) |
| | V(2)—O(5) | 1.730(28) | O(4)—V(2)—O(5) | 95.0(18) |
| | | | O(4)—V(2)—O(6) | 98.0(14) |
| | V(2)—O(6) | 1.968(13) | O(4)—V(2)—O(6) | 98.0(14) |
| | | | O(5)—V(2)—O(6) | 110.6(10) |
| | V(2)—O(6) | 1.968(13) | O(5)—V(2)—O(6) | 110.6(10) |
| | V(2)—O(6) | 2.576(26) | O(5)—V(2)—O(6) | 133.9(17) |
| V(3)O$_5$ Square Pyramid | V(3)—O(4) | 1.926(35) | O(4)—V(3)—O(7) | 122.5(16) |
| | V(3)—O(7) | 1.728(30) | O(4)—V(3)—O(7) | 80.8(4) |
| | V(3)—O(8) | 1.8490(24) | O(4)—V(3)—O(8) | 80.8(4) |
| | V(3)—O(8) | 1.8490(24) | O(7)—V(3)—O(8) | 100.98(34) |
| | V(3)—O(8) | 2.565(12) | O(7)—V(3)—O(8) | 100.98(34) |
| | | | O(8)—V(3)—O(8) | 156.7(7) |
| Sn(1)O$_7$ Distorted pentagonal bipyramid | Sn(1)—O(2) | 2.13(5) | O(2)—Sn(1)—O(5) | 77.4(12) |
| | | | O(2)—Sn(1)—O(5) | 77.4(12) |
| | Sn(1)—O(5) | 2.385(24) | O(2)—Sn(1)—O(7) | 79.0(12) |
| | | | O(2)—Sn(1)—O(7) | 79.0(12) |
| | Sn(1)—O(5) | 2.385(24) | O(5)—Sn(1)—O(5) | 98.8(13) |
| | Sn(1)—O(7) | 2.771(31) | O(5)—Sn(1)—O(7) | 68.2(9) |
| | Sn(1)—O(7) | 2.771(31) | O(5)—Sn(1)—O(7) | 155.1(17) |
| | Sn(1)—O(7) | 2.150(19) | O(5)—Sn(1)—O(7) | 68.2(9) |
| | Sn(1)—O(7) | 2.150(19) | O(7)—Sn(1)—O(7) | 114.7(16) |

TABLE 4

Refinement statistics, lattice parameters, and atom positions as obtained from Rietveld refinement of the XRD pattern for β-Ni$_{0.333}$V$_2$O$_5$ plotted in FIG. 9.
a = 15.3711(7) Å, b = 3.6100(1) Å, c = 10.0726(5) Å,
β = 109.968(4) Å, V = 525.34(3) Å$^3$
$\chi^2$ = 6.379, Rw = 4.85%, wRp = 6.81%

| Atom | x | y | z | Occupancy | Uiso |
|---|---|---|---|---|---|
| Ni(1) | 1.0042 | 0.000(0) | 0.3926(11) | 0.507(5) | 0.008 |
| V(1) | 0.1240(5) | 0.000(0) | 0.1138(7) | 1.0 | 0.008 |
| V(2) | 0.3392(4) | 0.000(0) | 0.1067(6) | 1.0 | 0.008 |
| V(3) | 0.2881(5) | 0.000(0) | 0.4234(6) | 1.0 | 0.008 |
| O(1) | 0.0000(0) | 0.000(0) | 0.0000(0) | 1.0 | 0.0126 |
| O(2) | 0.1083(15) | 0.000(0) | 0.2653(19) | 1.0 | 0.0126 |
| O(3) | 0.1321(16) | 0.500(0) | 0.0555(19) | 1.0 | 0.0126 |
| O(4) | 0.2860(15) | 0.000(0) | 0.2501(21) | 1.0 | 0.0126 |
| O(5) | 0.4400(13) | 0.000(0) | 0.2324(21) | 1.0 | 0.0126 |
| O(6) | 0.3129(14) | 0.500(0) | 0.1005(21) | 1.0 | 0.0126 |
| O(7) | 0.4083(14) | 0.000(0) | 0.4670(18) | 1.0 | 0.0126 |
| O(8) | 0.2496(19) | 0.500(0) | 0.4100(0) | 1.0 | 0.0126 |

TABLE 5

Bond angles and lengths for MO$_x$ (M = V, Ni) polyhedra as obtained from Rietveld refinement of the XRD pattern for β-Ni$_{0.331}$V$_2$O$_5$ plotted in FIG. 9.

| V—O Polyhedra | V—O | Distance (Å) | O—V—O | Angle (°) |
|---|---|---|---|---|
| V(1)O$_6$ Octahedra | V(1)—O(1) | 1.859(7) | O(1)—V(1)—O(2) | 97.4(9) |
| | V(1)—O(2) | 1.624(18) | O(1)—V(1)—O(3) | 88.3(7) |
| | V(1)—O(3) | 1.915(7) | | 88.3(7) |
| | V(1)—O(3) | 1.915(7) | O(2)—V(1)—O(3) | 109.5(6) |
| | V(1)—O(4) | 2.267(18) | | 109.5(6) |
| | V(1)—O(6) | 2.65127(12) | O(3)—V(1)—O(3) | 140.9(12) |
| V(2)O$_6$ Octahedra | V(2)—O(3) | 1.832(20) | O(3)—V(2)—O(4) | 169.0(11) |
| | | | O(3)—V(2)—O(5) | 103.7(11) |
| | V(2)—O(4) | 1.888(20) | O(3)—V(2)—O(6) | 95.0(8) |
| | | | | 95.0(8) |
| | V(2)—O(5) | 1.632(18) | O(4)—V(2)—O(5) | 87.2(9) |
| | | | O(4)—V(2)—O(6) | 83.0(7) |
| | V(2)—O(6) | 1.846(5) | | 83.0(7) |
| | | | O(5)—V(2)—O(6) | 99.5(7) |
| | V(2)—O(6) | 1.846(5) | | 99.5(7) |
| | V(2)—O(6) | 2.548(17) | | 155.8(14) |
| V(3)O$_5$ Square pyramid | V(3)—O(4) | 2.872(11) | O(4)—V(3)—O(7) | 84.7(9) |
| | V(3)—O(7) | 2.872(11) | O(4)—V(3)—O(8) | 91.75(27) |
| | | | | 91.75(27) |
| | V(3)—O(8) | 1.8903(20) | | 162.8(8) |
| | V(3)—O(8) | 1.8903(20) | O(7)—V(3)—O(8) | 107.27(20) |
| | | | | 107.27(20) |
| | V(3)—O(8) | 1.953(7) | | 112.5(7) |
| | | | O(8)—V(3)—O(8) | 145.4(4) |
| | | | | 83.31(21) |
| | | | | 83.31(21) |
| Ni(1)O$_7$ Pentagonal bipyramid | Ni(1)—O(2) | 2.368(24) | O(2)—Ni(1)—O(7) | 135.33(34) |
| | Ni(1)—O(5) | 2.397(14) | | 88.5(6) |
| | Ni(1)—O(5) | 2.397(14) | O(5)—Ni(1)—O5) | 97.7(8) |
| | Ni(1)—O(7) | 2.402(13) | O(5)—Ni(1)—O(7) | 61.8(5) |
| | | | | 125.0(6) |
| | | | | 168.9(9) |
| | Ni(1)—O(7) | 2.402(13) | | 81.3(4) |
| | Ni(1)—O(7) | 2.597(15) | O(2)—Ni(1)—O(5) | 80.4(7) |
| | | | O(7)—Ni(1)—O(7) | 97.5(7) |
| | Ni(1)—O(7) | 2.597(15) | | 127.7(6) |
| | | | | 64.3(8) |

TABLE 6

Tabulated lattice parameters for β-M$_x$V$_2$O$_5$ materials (M = Ni, Co, Sn, and Pb) as depicted in FIG. 9.

| Sample | x | a (Å) | b (Å) | c (Å) | β (Å) | V (Å) | Radius (Å)[18] |
|---|---|---|---|---|---|---|---|
| ζ-V$_2$O$_5$ | NA | 15.25253(3) | 3.602132(4) | 10.104167(13) | 110.088(0) | 521.369(1) | N/A |
| Ni$_x$V$_2$O$_5$ | 0.331 | 15.3711(7) | 3.6101(1) | 10.0726(5) | 109.968(4) | 525.335(27) | 0.63 |
| Co$_x$V$_2$O$_5$ | 0.270 | 15.384 | 3.6185 | 10.0893 | 110.130 | 527.36 | 0.67 |
| Sn$_x$V$_2$O$_5$ | 0.225 | 15.339(2) | 3.6217(3) | 10.0781(8) | 109.829(7) | 526.67(6) | 1.22 |
| Pb$_x$V$_2$O$_5$ | 0.220 | 15.470(2) | 3.6153(4) | 10.083(1) | 109.396(10) | 531.947 | 1.23 |

TABLE 7

Kinetic fitting parameters and calculated average lifetimes for picosecond TA decay traces of β-Sn$_{0.225}$V$_2$O$_5$/CdSe and β-Sn$_{0.225}$V$_2$O$_5$/CdTe heterostructures.

| Sample | $\lambda_{pump}$ (nm) | $\lambda_{probe}$ (nm) | $\Delta A_0$ | $A_1$ | $\tau_1$ (ps) | $A_2$ | $\tau_2$ (ps) | $<\tau>$ (ps) | $\chi^2$ |
|---|---|---|---|---|---|---|---|---|---|
| β-Sn$_x$V$_2$O$_5$/CdSe | 360 | 485 | −0.124 (±0.007) | −3.228 (±0.242) | 0.248 (±0.012) | −0.156 (±0.016) | 3.671 (±0.770) | 0.406 (±0.053) | 0.132 |
| β-Sn$_x$V$_2$O$_5$/CdSe | 360 | 525 | 0.968 (±0.009) | −5.110 (±0.433) | 0.221 (±0.017) | −0.252 (±0.074) | 1.925 (±0.655) | 0.301 (±0.052) | 1.082 |
| β-Sn$_x$V$_2$O$_5$/CdTe | 360 | 485 | −0.023 (±0.004) | −0.734 (±0.013) | 1.113 (±0.043) | −0.318 (±0.013) | 11.77 (±0.835) | 4.33 (±0.301) | 0.123 |
| β-Sn$_x$V$_2$O$_5$/CdTe | 360 | 675 | 0.786 (±0.011) | −0.878 (±0.196) | 2.222 (±0.443) | −0.248 (±0.203) | 8.389 (±5.29) | 3.578 (±0.811) | 1.379 |

Example 3

All references found in this Example are listed in References List 3.

We synthesized a new class of heterostructures by depositing CdS, CdSe, or CdTe quantum dots (QDs) onto α-V$_2$O$_5$ nanowires (NWs) via either successive ionic layer adsorption and reaction (SILAR) or linker-assisted attachment (LAA). SILAR yielded the highest loadings of QDs per NW, whereas LAA enabled better control over the size and properties of QDs. Soft and hard x-ray photoelectron spectroscopy in conjunction with density functional theory calculations revealed that all α-V$_2$O$_5$/QD heterostructures exhibited Type-II band offset energetics, with a staggered gap where the conduction- and valence-band edges of α-V$_2$O$_5$ NWs lie at lower energies (relative to the vacuum level) than their QD counterparts. Transient absorption spectroscopy measurements revealed that the Type-II energetic offsets promoted the ultrafast ($10^{-12}$ to $10^{-11}$ s) separation of photogenerated electrons and holes across the NW/QD interface to yield long-lived ($10^{-6}$ s) charge-separated states. Charge-transfer dynamics and charge-recombination timescales varied subtly with the composition of heterostructures and the nature of the NW/QD interface, with both charge separation and recombination occurring more rapidly within SILAR-derived heterostructures. LAA-derived α-V$_2$O$_5$/CdSe heterostructures promoted the photocatalytic reduction of aqueous protons to H$_2$ with a 20-fold or greater enhancement relative to isolated colloidal CdSe QDs or dispersed α-V$_2$O$_5$ NWs. The separation of photoexcited electrons and holes across the NW/QD interface could thus be exploited in redox photocatalysis. In light of their programmable compositions and properties and their Type-II energetics that drive ultrafast charge separation, the α-V$_2$O$_5$/QD heterostructures are a promising new class of photocatalyst architectures.

Nanoscale semiconductor heterostructures are intriguing materials architectures for light harvesting, excited-state charge transfer, and solar energy conversion.[1-6] Interfacial energetics within heterostructures dictate the thermodynamic favorability of excited-state charge-transfer processes that can ultimately lead to the generation of electrical power or the storage of energy in chemical bonds. Type-II energetic offsets, in which the conduction- and valence-band edges of one semiconducting component lie at higher energies than the corresponding band edges of the other component, are desirable.[2, 7, 8] This staggered bandgap alignment renders the separation of photogenerated electrons and holes thermodynamically favorable following the photoexcitation of either constituent semiconductor.

Colloidal quantum dots (QDs) are prime candidates for incorporation into heterostructures. Their high oscillator strengths and broad excitonic absorption bands enable the efficient harvesting of light while their size-dependent bandgaps engender tunability of interfacial energetic offsets and charge-transfer driving forces.[9-12] The rich surface chemistry of QDs provides a route to tether them to other materials components and enables control over the interfacial distance and electronic coupling within resulting heterostructures.[2,13-17] QDs have been interfaced with metal oxide semiconductors and with other quantum dots to yield various type-II heterostructures that undergo efficient excited-state charge separation.[2,18-25]

We report here on a new class of type-II heterostructures consisting of cadmium chalcogenide QDs (CdE where E=S, Se, or Te) and α-V$_2$O$_5$ nanowires (NWs). We previously reported the synthesis and characterization of α-V$_2$O$_5$ NWs via hydrothermal reduction of bulk V$_2$O$_5$ to V$_3$O$_7$·H$_2$O followed by oxidation in air.[26,27] On the basis of angle-resolved X-ray absorption near-edge structure spectroscopy measurements,[28] the conduction band edge of V$_2$O$_5$ primarily comprises V $3_{xy}$ states that are "split off" from the remainder of the V 3d (which are further separated into t$_{2g}$ and e$_g$ manifolds as a result of hybridization with O 2p states); these states are lower in energy than the conduction band edge of CdE QDs, and are thus expected to be amenable to accept electrons from photoexcited QDs.[26,29] Analogously, hard X-ray photoemission and resonant inelastic X-ray scattering measurements in conjunction with density functional theory calculations corroborate that consistent with differences in electronegativity, the primarily O 2p states that constitute the valence band edge of V$_2$O$_5$ are at lower energies as compared to chalcogenide 3p, 4p, and 5p-derived valence band edges of CdE QDs.[26,29] We thus hypothesized that heterostructures consisting of CdE QDs and V$_2$O$_5$ NWs should exhibit type-II energetics resulting in interfacial charge separation following the photoexcitation of electron-hole pairs within either component. Notably, the approximately 2.4-eV band gap of V$_2$O$_5$[30] is lower than those of metal oxides such as TiO$_2$ (3.2 eV) and SnO$_2$ (3.5 eV), which have been incorporated into heterostructures with QDs; therefore, V$_2$O$_5$ not only should serve as an electron-accepting substrate but also absorbs light within a significant region of the visible spectrum (as also demonstrated by its bright orange coloration). Moreover, the quasi-one-dimensional morphology of the V$_2$O$_5$ NWs allows for polaronic transport of conduction-band electrons following interfacial charge separation, enabling the dark oxidation and reduction processes that underpin redox photocatalysis to compete with deleterious electron-hole recombination.

Here we report on the synthesis and characterization of $V_2O_5$/CdE NW/QD heterostructures, prepared via successive ionic layer adsorption and reaction (SILAR) and linker-assisted assembly (LAA), the characterization of their photoinduced charge-transfer reactivity using transient absorption spectroscopy, and their performance in the photocatalytic reduction of protons to hydrogen. For heterostructures prepared by either SILAR or LAA, photogenerated electrons and holes were separated on subpicosecond-to-picosecond timescales to yield charge-separated states that persisted for microseconds. The heterostructures outperformed the corresponding isolated QDs and NWs in the reduction of aqueous protons to hydrogen, indicating that ultrafast charge separation could indeed be exploited in redox photocatalysis. The $V_2O_5$/CdE heterostructures are thus versatile new materials constructs for light harvesting, charge separation, and the photocatalytic production of solar fuels; polymorphism of $V_2O_5$ and compositional alloying of both components provides for a substantial design space for tuning of interfacial energy offsets.

Experimental Methods

Density functional theory (DFT). DFT calculations were performed for bulk phases of $\alpha$-$V_2O_5$, CdS and CdSe by using the WIEN2k software package, which solve the Kohn-Sham equations using a full potential and linearized-augmented planewaves with local orbitals (LAPW+lo).[31,32] The generalized gradient approximation of Perdew, Burke, and Ernzerhof (GGA-PBE) was used for the correlation and exchange potentials for the layered structure $\alpha$-$V_2O_5$, whereas the electron-electron correlation GGA+U was used for both CdSe and CdS unit cells. The cutoff between core and valence states was set as −6.0 Ry for three materials. The plane-wave cutoff parameter RKMAX was chosen to be 6.5 and 7 for $\alpha$-$V_2O_5$ and CdE, respectively.

Materials. Reagents and solvents were obtained from the following sources and used as received: (1) Alfa Aesar [cadmium sulfate octahydrate ($3CdSO_4 \cdot 8H_2O$), cadmium chloride hemipentahydrate ($CdCl_2 \cdot 5/2H_2O$), cadmium nitrate tetrahydrate ($Cd(NO_3)_2 \cdot 4H_2O$), selenium dioxide ($SeO_2$), sodium sulfide nonahydrate ($Na_2S \cdot 9H_2O$), sodium telluride ($Na_2Te$), sodium borohydride ($NaBH_4$), nickel(II) nitrate hexahydrate ($[Ni(NO_3)_2] \cdot 6H_2O$), and 3 mercaptopropionic acid (3-MPA)]; (2) Sigma Aldrich [selenium powder, tellurium powder, bulk vanadium pentoxide ($V_2O_5$), 1-cysteine, and lactic acid]; (3) Fisher Scientific [anhydrous sodium sulfite ($Na_2SO_3$), sodium thiosulfate ($Na_2S_2O_3$), sodium hydroxide, methanol, and hydrochloric acid]; (4) Decon [ethanol]; and (5) J. T. Baker [oxalic acid].

Synthesis of cysteinate-capped CdSe QDs. Cysteinate-capped CdSe QDs, hereafter referred to as cys-CdSe QDs, were synthesized following the procedure reported by Nevins et al.[33] A selenide precursor solution was prepared by dissolving selenium powder (0.17 g, 2.2 mmol) and $Na_2SO_3$ (0.80 g, 6.4 mmol) in deionized (DI) $H_2O$ (42 mL) in a round-bottom flask. The reaction mixture was heated to reflux and stirred until selenium dissolved. The cadmium precursor was prepared by dissolving $3CdSO_4 \cdot 8H_2O$ (0.57 g, 0.74 mmol) and 1 cysteine (1.03 g, 8.48 mmol) in DI $H_2O$ (53 mL). The pH of the solution containing the cadmium precursor was adjusted to approximately 12 with NaOH pellets. The cadmium precursor solution was heated to 80° C., and then 23 mL of the selenide precursor solution was added via hot injection. The resulting mixture was stirred at 80° C. for approximately 2 h and then cooled to room temperature and stored until further use.

Synthesis of cysteinate-capped CdS QDs. Cysteinate-capped CdS QDs, hereafter referred to as cys-CdS QDs, were synthesized by modification of the synthesis of cys-CdSe QDs.[33,34] A sulfide precursor solution was prepared by dissolving $Na_2S_2O_3$ (1.17 g, 7.41 mmol) in DI $H_2O$ (25 mL). The mixture was heated to reflux and stirred to dissolve the solid. The cadmium precursor solution was prepared by dissolving $3CdSO_4 \cdot 8H_2O$ (0.87 g, 3.4 mmol) and 1-cysteine (2.05 g, 16.9 mmol) in DI $H_2O$ (42 mL). The pH of the solution containing the cadmium precursor was adjusted to approximately 12 with NaOH pellets. The cadmium precursor was heated to 80° C., and then 9 mL of sulfide precursor solution was added via hot injection. The resulting mixture was stirred and kept at 80° C. for approximately 3 h and then cooled to room temperature and stored until further use.

Synthesis of $\alpha$-$V_2O_5$ NWs. $\alpha$-$V_2O_5$ NWs were synthesized via hydrothermal reduction of bulk $V_2O_5$ as reported previously.[27] Hydrothermal reaction of $V_2O_5$ and oxalic acid yielded $V_3O_7$ NWs, which were then oxidized in air at 300° C. in a muffle furnace to yield $\alpha$-$V_2O_5$ NWs.

Assembly of NW/QD heterostructures via SILAR. SILAR-derived $\alpha$-$V_2O_5$/CdE heterostructures were assembled following the procedure reported by Pelcher et al.[35] A 100-mM cadmium precursor solution was prepared by dissolving $Cd(NO_3)_2 \cdot 4H_2O$ in ethanol (15 mL). A 50-mM selenide precursor solution was prepared by dissolving solid-phase powders of $SeO_2$ and $NaBH_4$, with a 1:1 molar ratio of Na:Se of in ethanol (30 mL), followed by degassing and purging with Ar. The mixed solution was stirred at room temperature for 2 h. A 50-mM sulfide precursor solution was prepared in a similar way by dissolving $Na_2S \cdot 9H_2O$ in ethanol (30 mL). A 50-mM telluride precursor was prepared by dissolving $Na_2Te$ in ethanol (30 mL). In the first step of SILAR deposition, dispersions of $\alpha$-$V_2O_5$ NWs (50 mg) in ethanol (15 mL) were combined with the 100-mM cadmium precursor solution (15 mL) in a 1:1 ratio by volume, decreasing the concentration of $Cd^{2+}$ to 50 mM. The resulting mixture was stirred for 30 s. NWs were then removed via centrifugation and washed with ethanol. NWs were then dispersed into a given chalcogenide precursor solution. The resulting mixture was stirred, centrifuged, and washed with ethanol. This series of steps represents one SILAR cycle. NW/QD heterostructures were prepared via variable numbers of SILAR deposition cycles. SILAR-derived heterostructures were prepared via 3 deposition cycles unless otherwise mentioned.

Assembly of NW/QD heterostructures via LAA. LAA-derived $\alpha$-$V_2O_5$/CdSe and $\alpha V_2O_5$/CdS heterostructures were assembled following the procedure reported by Pelcher et al.[35] Stock aqueous dispersions of CdE QDs were washed 1-3 times to remove unreacted precursors. In a given washing step, QDs were flocculated by adding MeOH to the aqueous dispersion in a 3:1 ratio by volume, collecting the QDs by centrifugation, discarding the supernatant, and redispersing the QDs into DI $H_2O$ to the original volume. Stock dispersions of $\alpha$-$V_2O_5$ NWs were prepared by adding 10 mg of NWs to 1 mL of DI $H_2O$ while sonicating. Aqueous dispersions of CdE QDs (0.8 mL for CdS and 0.4 mL for CdSe) were added to dispersions of NWs (2 mL) with constant stirring. The pH of the final mixture was adjusted to approximately 5 by addition of dilute HCl. Mixed dispersions were stirred for 1 h. Heterostructures were collected via centrifugation and washed once with DI $H_2O$ to remove unattached QDs. The resulting $V_2O_5$/CdE heterostructures were dried and stored as a solid until further use. Films of SILAR- and LAA-derived heterostructures, which were used for transient absorption measurements, were prepared by spray-coating dispersions of heterostructures in ethanol onto glass substrates.

Electron microscopy. Scanning electron microscopy (SEM) images and energy dispersive X-ray spectroscopy (EDS) spectra were acquired with a Hitachi SU-70 instrument equipped with an X-ray detector. Transmission electron microscopy (TEM) images and selected area electron diffraction (SAED) patterns were obtained using a JEOL-2010 instrument operated at 200 kV.

Steady-state spectroscopy. UV/vis absorbance spectra were obtained with an Agilent 8453 diode array spectrophotometer, and reflectance spectra were acquired with a Labsphere RSA-HP-53 accessory. Raman spectra were acquired using a Jobin-Yvon Horiba Labram HR instrument coupled to an Olympus BX41 microscope. Samples were excited at 514.5 nm with an Ar-ion laser. The hole and slit widths were 500 and 150 µm, respectively; spectra were acquired with resolution of 3 cm$^{-1}$ using a grating with 1800 lines per mm. Samples were prepared by placing solid powders onto glass microscope slides.

Soft and hard x-ray photoelectron spectroscopy (XPS, HAXPES) were employed to determine the valence band alignment of $\alpha$-$V_2O_5$ and the QDs. XPS measurements were processed via a Phi VersaProbe 5000 system with a monochromated Al K$\alpha$ source (1.5 KeV). The mounting and handling process of the samples was performed in a glovebox, then the samples were transported to the UHV chamber in inert atmosphere. HAXPES measurements were performed at the Surface and Interface Structural Analysis beamline (beamline I09) of the Diamond Light Source, Ltd (DLS), UK, using a photon energy of ~6.0 keV. The HAXPES spectra are energy aligned to the Fermi level of a gold foil reference in electrical contact with samples. The gold reference scans were measured before and after each spectrum to reduce further energy alignment shift from beam drift. The measured valence band offsets were employed to align the DFT band structures of the $\alpha$-$V_2O_5$ and QDs on a common energy scale.

Time-resolved spectroscopy. Transient absorption experiments were performed using a Ti:sapphire amplified laser system (SpectraPhysics Spitfire Pro, 1 kHz repetition rate) in a standard pump-probe geometry, as described previously.[36] Briefly, the wavelength-tunable pump pulse (100 fs, 1 kHz) was generated with an optical parametric amplifier (Topas-C, LightConversion). The femtosecond white-light probe pulse was obtained via supercontinuum generation in a sapphire disk and was delayed mechanically. The nanosecond probe pulse was created by a second supercontinuum laser and was delayed electronically. The probe light was split into signal and reference beams, which were detected with fiber-coupled silicon (visible) diode arrays on a shot-by-shot basis.

Photocatalysis. LAA-derived $\alpha$-$V_2O_5$/CdSe heterostructures (50 mg) were dispersed into aqueous solutions of lactic acid (20%), Ni(NO$_3$)$_2$ (0.1 M), and 3-MPA (0.2 M). A complex of nickel(II) and 3-MPA, hereafter referred to as Ni-{3-MPA}, served as the reduction co-catalyst.[37] In control experiments, dispersions containing the co-catalyst and either bare $V_2O_5$ NWs (50 mg) or cys-CdSe QDs (4 mL) were used. Dispersions were transferred to a sealed 100-mL Pyrex flask, at ambient temperature and atmospheric pressure, and then deaerated with Ar for 30 min. Stirred samples were illuminated with a 100 W Xe arc lamp (Oriel 133 Photomax) output through a filter transmitting 400-720 nm light; the focused irradiance on the flask was 2 W·cm$^{-2}$. After 1 h of illumination, a 3-mL aliquot of gas was removed from the headspace above the dispersion and analyzed using a gas chromatograph (Perkin Elmer Clarus 580) with a thermal conductivity detector and Ar carrier gas.

Results and Discussion

Assembly of heterostructures via LAA and SILAR. In LAA, colloidal cys-CdSe or cys-CdS QDs were interfaced with $\alpha$-$V_2O_5$ NWs by reacting in mixed aqueous dispersions.[35] (We attempted to prepare $\alpha$-$V_2O_5$/CdTe heterostructures via LAA; however, the achievable loading of CdTe QDs on NWs remained low for this tethering strategy, and this approach was no longer pursued.) Synthesizing QDs before incorporating them into heterostructures enables control over their size and properties. Cysteinate adheres to CdE QDs through the thiolate,[38] whereas protonated amines adsorb to the negatively-charged, hydroxylated surface of $V_2O_5$.[35,39,40] We thus infer that the attachment of QDs to NWs was driven by interactions of protonated amines of QD-adsorbed cysteinates with the surface of $V_2O_5$.[35] In SILAR, ethanol dispersions of $V_2O_5$ NWs were dispersed sequentially into solutions containing cadmium(II) ions and the appropriate chalcogenide, resulting in the deposition of CdS, CdSe, or CdTe onto the NWs.[35]

Figure 20:
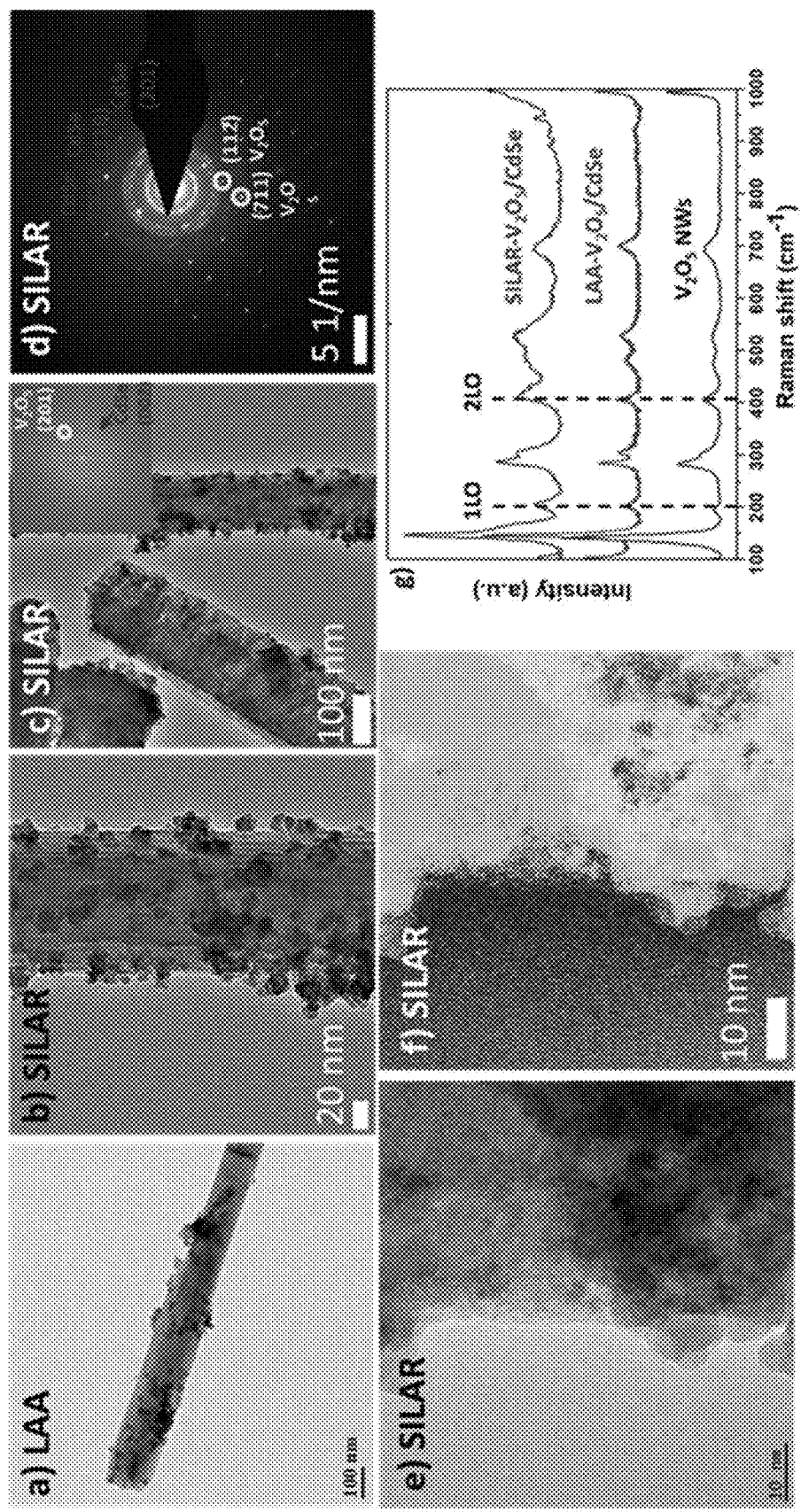
FIG. 20. TEM images (a-c, e), FFT patterns (inset to c), SAED patterns (d), and false-color TEM image (f, corresponding to TEM image (e)) of α-$V_2O_5$/CdSe heterostructures prepared via LAA (a) and SILAR (b-f). SAED patterns are indexed to JCPDS card nos. 77-2307 (CdSe) and 41-1426 ($V_2O_5$). Raman spectra (g) of α-$V_2O_5$ NWs, LAA-derived α-$V_2O_5$/CdSe heterostructures, and SILAR-derived α-V$_2$O$_5$/CdSe heterostructures; dashed black lines correspond to characteristic LO and 2LO phonon modes of bulk wurtzite CdSe.
Figure 27:
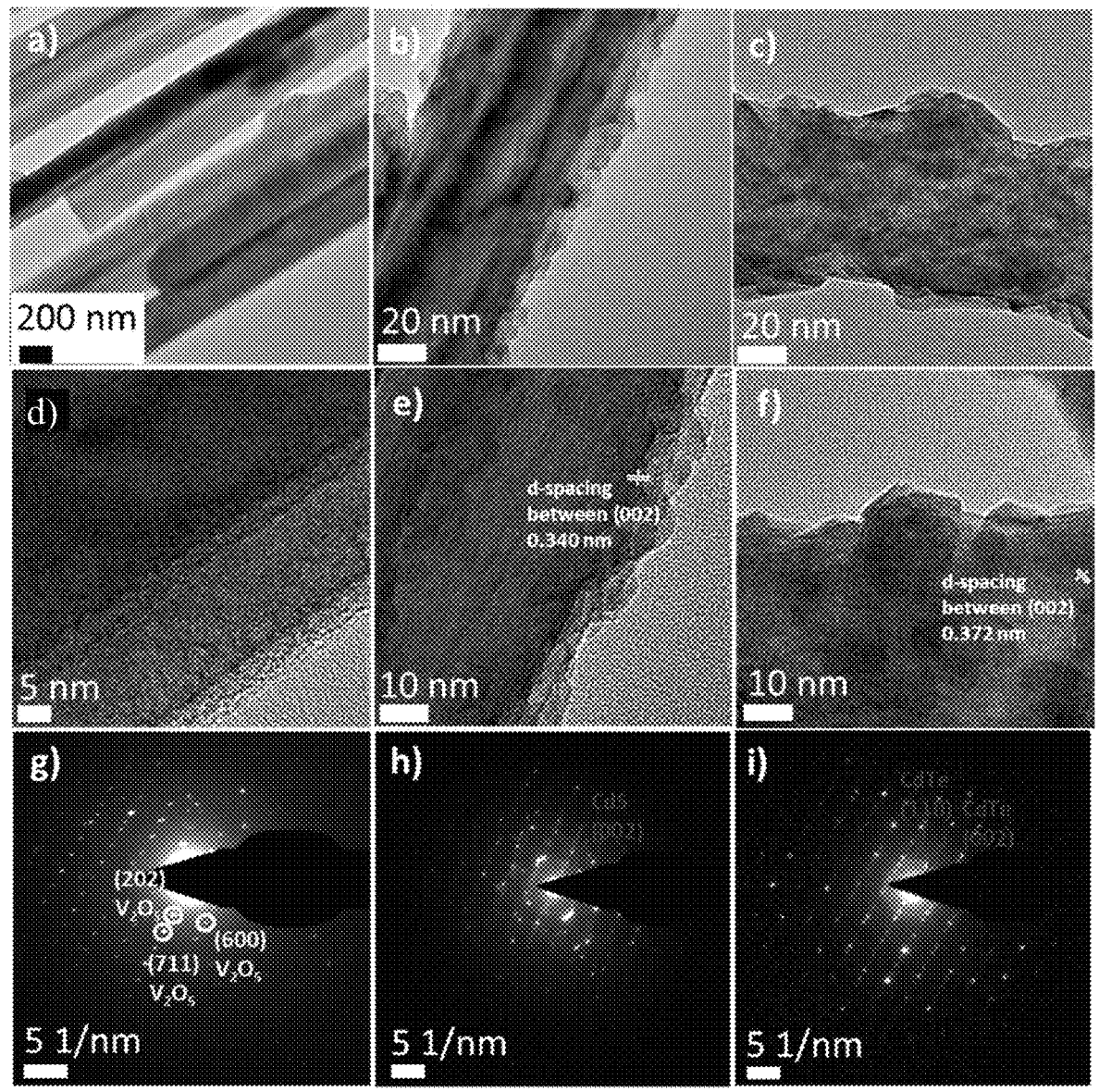
FIG. 27. TEM images and SAED patterns of α-V$_2$O$_5$ NWs (a, d, g), SILAR-derived α-V$_2$O$_5$/CdS heterostructures (b, e, h), and SILAR-derived α-V$_2$O$_5$/CdTe heterostructures (c, f, i). SAED patterns are indexed to JCPDS card nos. 41-1426 (V$_2$O$_5$), 41-1049 (CdS) and 19-013 (CdTe).

The products of LAA and SILAR were characterized by TEM, EDS, SAED, and Raman spectroscopy. TEM images revealed that the surface morphology of bare single-crystalline $V_2O_5$ NWs was altered significantly following LAA and SILAR (FIG. 20 and FIG. 27). In TEM images of $\alpha$-$V_2O_5$/CdSe heterostructures, discrete and agglomerated CdSe QDs are clearly discernible as higher electron density regions on the otherwise smooth surfaces of NWs (FIG. 20). SILAR-derived $\alpha$-$V_2O_5$/CdS and $\alpha$-$V_2O_5$/CdTe heterostructures exhibited high loadings of QDs and significantly roughened surfaces relative to bare NWs (FIG. 27). SILAR-derived heterostructures typically exhibited rougher surfaces and higher loadings of QDs on $V_2O_5$ NWs than LAA-derived heterostructures.

Figure 28:
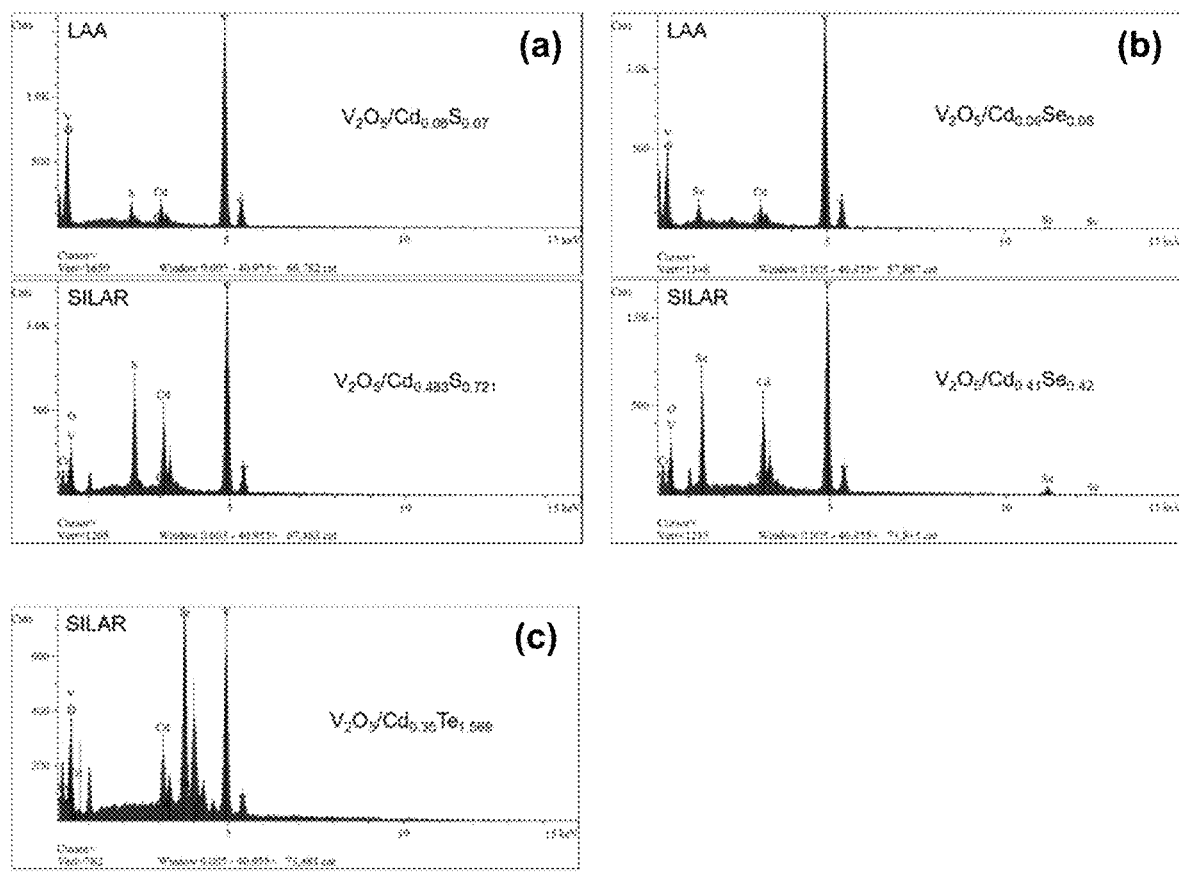
FIG. 28. Energy-dispersive X-ray spectra of (a) α-V$_2$O$_5$/CdS, (b) α-V$_2$O$_5$/CdSe, and (c) α-V$_2$O$_5$/CdTe heterostructures.

EDS confirmed the presence of Cd and S, Se, or Te on $V_2O_5$ NWs (FIG. 28). Average amounts of Cd and E, relative to the $V_2O_5$ formula unit, were calculated from five measurements on each sample, yielding apparent molecular formulas of $V_2O_5$/Cd$_{(0.09\pm0.04)}$Se$_{(0.08\pm0.06)}$ and $V_2O_5$/Cd$_{(0.06\pm0.07)}$S$_{(0.07\pm0.08)}$ for LAA-derived heterostructures and $V_2O_5$/Cd$_{(0.41\pm0.25)}$Se$_{(0.42\pm0.25)}$, $V_2O_5$/Cd$_{(0.48\pm0.10)}$S$_{(0.72\pm0.14)}$ and $V_2O_5$/Cd$_{(0.35\pm0.14)}$Te$_{(1.57\pm0.83)}$ for SILAR-derived heterostructures. The higher loading of QDs on $V_2O_5$ NWs in SILAR-derived heterostructures relative to LAA-derived heterostructures is consistent with TEM analysis. SAED analysis (FIG. 27) established that the SILAR process deposited wurtzite-phase CdE QDs onto the surfaces of the $V_2O_5$ NWs.

Figure 29:
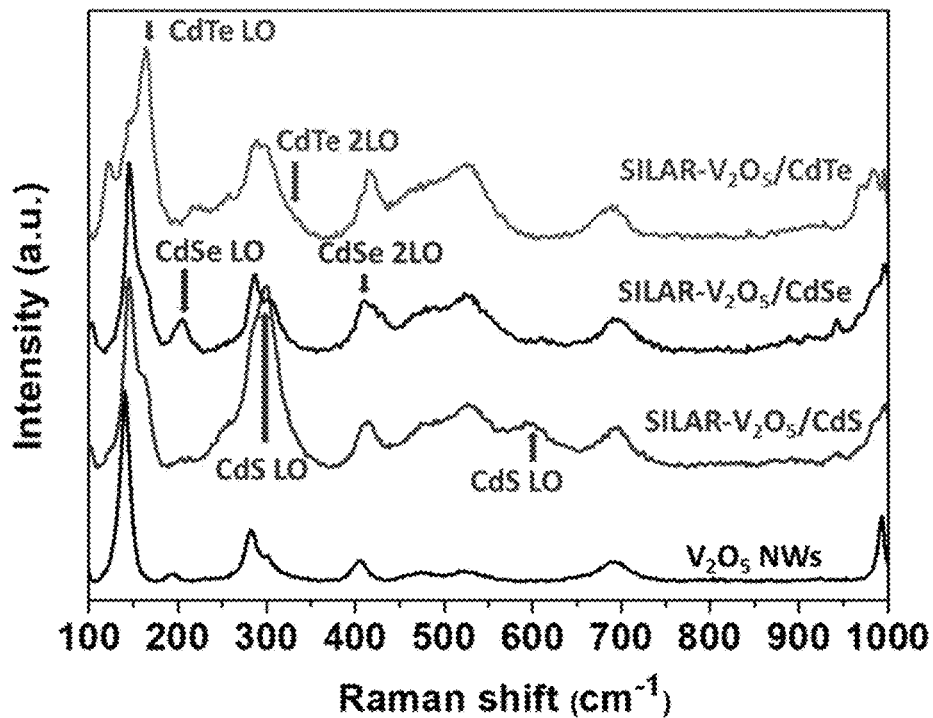
FIG. 29. Raman spectra of α-V$_2$O$_5$ NWs and SILAR-derived heterostructures: α-V$_2$O$_5$/CdS, α-V$_2$O$_5$/CdSe, and α-V$_2$O$_5$/CdTe.

The Raman spectrum of bare NWs (FIG. 20g) exhibited phonon modes of $\alpha$-$V_2O_5$ including the external displacement of [VO$_5$] units below 200 cm$^{-1}$, rocking and bending modes in the range from 200-500 cm$^{-1}$, and V—O bond-stretching modes above 500 cm$^{-1}$ (including the prominent vanadyl stretch near 1000 cm$^{-1}$), consistent with previous measurements.[27] Heterostructures exhibited these characteristic Raman bands of $V_2O_5$ as well as features attributable to CdE QDs. Spectra of LAA- and SILAR-derived $V_2O_5$/CdSe heterostructures contain prominent bands at 205 cm$^{-1}$ and 409 cm$^{-1}$, corresponding to the longitudinal optical (LO) mode and second-order LO (2LO) mode of bulk wurtzite CdSe, respectively (FIG. 20c).[41,42] The 2LO mode of CdSe overlaps substantially with a Raman band of $\alpha$-$V_2O_5$ at 404 cm$^{-1}$. $\alpha$-$V_2O_5$/CdS heterostructures exhibited intense, sharp Raman bands at 300 and 600 cm$^{-1}$, corresponding to the LO and 2LO modes, respectively, of bulk wurtzite CdS (FIG. 29).[43,44] Similarly, Raman spectra of $\alpha$-$V_2O_5$/CdTe heterostructures contained bands at 163 cm$^{-1}$ and 327 cm$^{-1}$, corresponding to the LO and 2LO modes, respectively, of bulk wurtzite CdTe (FIG. 29).[45,46] Taken together, the TEM images, EDS data, SAED patterns, and Raman spectra reveal that LAA and SILAR yielded a range of α-V$_2$O$_5$/CdE heterostructures.

Figure 30:
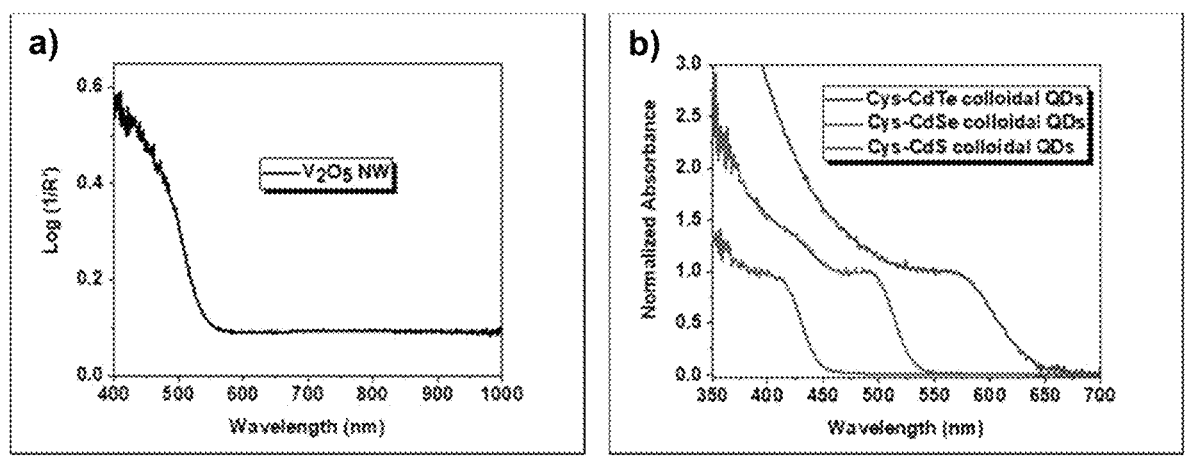
FIG. 30. Diffuse reflectance spectra of α-V$_2$O$_5$ NWs (a) and normalized transmission-mode absorbance spectra of aqueous dispersions of cys-CdS QDs, cys-CdSe QDs, and cys-CdTe QDs (b).
Figure 31:
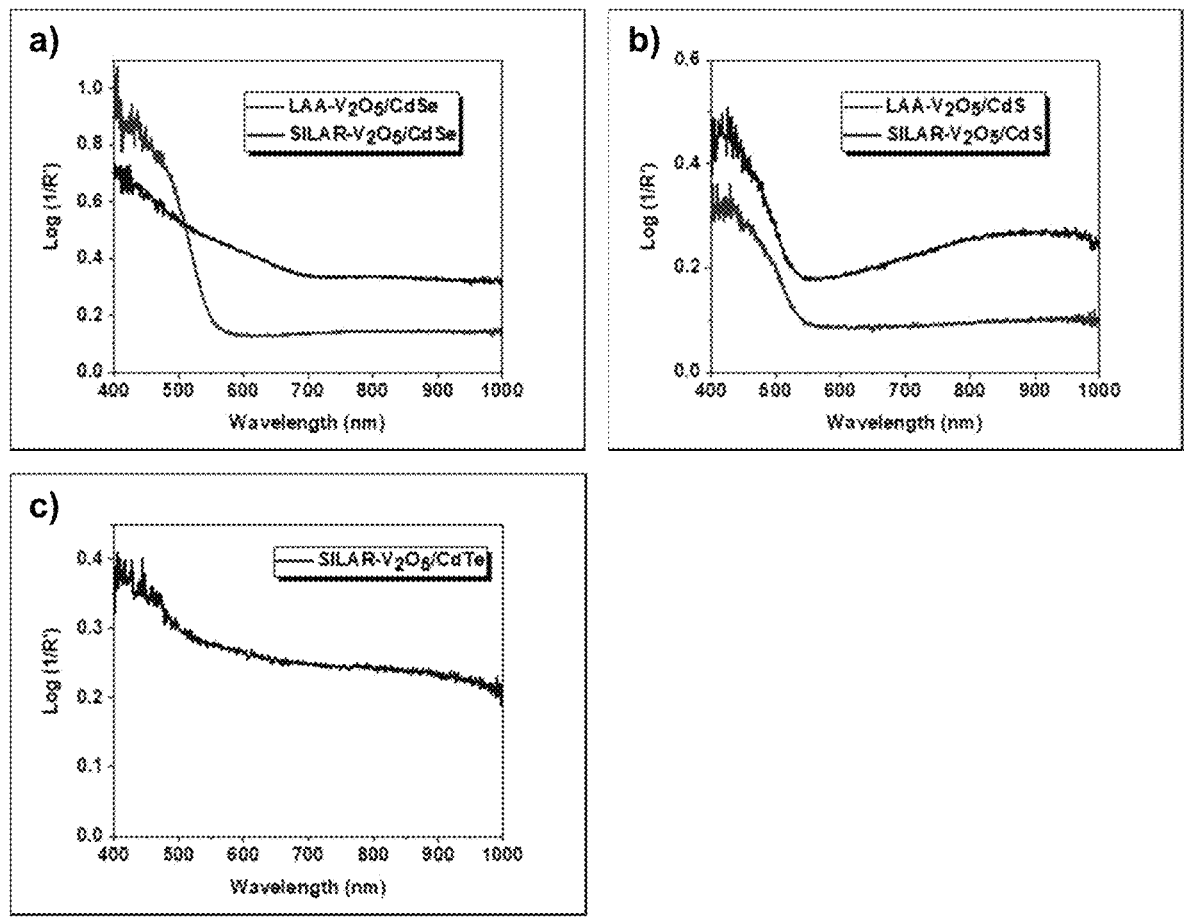
FIG. 31. Diffuse reflectance spectra of α-V$_2$O$_5$/CdSe heterostructures (a), α-V$_2$O$_5$/CdS heterostructures (b), and α-V$_2$O$_5$/CdTe heterostructures (c).

Electronic absorption spectra. Diffuse reflectance UV/vis spectra of α-V$_2$O$_5$ NWs and LAA- and SILAR-derived heterostructures are presented in FIGS. 30a and 31. α-V$_2$O$_5$ NWs exhibit a bandgap absorption onset of approximately 580 nm (optical band gap=2.13 eV) with a steep rise at shorter wavelengths, consistent with previously-reported measurements.[36] Absorption spectra of LAA-derived α-V$_2$O$_5$/CdSe heterostructures and LAA- and SILAR-derived α-V$_2$O$_5$/CdS heterostructures are perturbed only minimally relative to the spectrum of α-V$_2$O$_5$ because the absorption onsets of cys-CdSe QDs, cys-CdS QDs, and SILAR-deposited CdS are at shorter wavelengths than that of α-V$_2$O$_5$ NWs. In contrast, the SILAR-derived α-V$_2$O$_5$/CdSe and α-V$_2$O$_5$/CdTe heterostructures exhibit broad absorption bands extending to longer wavelengths than the absorption onset of bare α-V$_2$O$_5$; thus, SILAR deposition yields QDs on V$_2$O$_5$ with larger sizes and broader size distributions than the corresponding colloidal QDs deposited via LAA.

Interfacial energetics of heterostructures. Valence band offsets at NW/QD interfaces were determined from XPS and HAXPES measurements supported by DFT calculations. We first consider α-V$_2$O$_5$/CdSe heterostructures. DFT calculations and the HAXPES spectra are presented in FIG. 21a. The valence band of α-V$_2$O$_5$ is derived mainly from O 2p states, whereas the conduction band is derived predominantly from V 3d states and has a split-off band derived from V 34).[28,47] The GGA+U calculation with U=8 eV on Cd was used for calculating the density of states of CdSe to account for the localized nature of the Cd 4d semi-core level.[48] The top of the valence band of CdSe is derived mainly from Se 4p, whereas the conduction band edge originates from mixed Cd and Se s orbitals.[49] The valence band edge energy (E$_r$) of α-V$_2$O$_5$ is lower than that of CdSe consistent with the more ionic nature of this compound derived from the greater electronegativity of oxygen. The energetic offset between valence band edges at the α-V$_2$O$_5$/CdSe interface was determined to be 2.07 eV by comparison of the HAXPES spectra of bare α-V$_2$O$_5$ NWs and SILAR-derived α-V$_2$O$_5$/CdSe heterostructures. For illustrative purposes we plot, in FIG. 21a, the DFT calculated valence band and conduction band states using the measured valence band offset against the hydrogen- and oxygen-evolving redox potentials. To do so we used the ionization potentials of α-V$_2$O$_5$ and CdSe,[29] and the fact that the normal hydrogen electrode (NHE) is 4.5 eV below the vacuum level.[50] We note that the DFT aligned density of states agrees well with the measured occupied states from HAXPES, especially the Cd 4d semi-core level and valence band edge (i.e. shaded regions in different spectra). DFT underestimates the band gap energies, and the V 3d split-off band is expected to lie closer to the H$^+$/H$_2$ reduction potential than presented in FIG. 21a.

Figure 32:
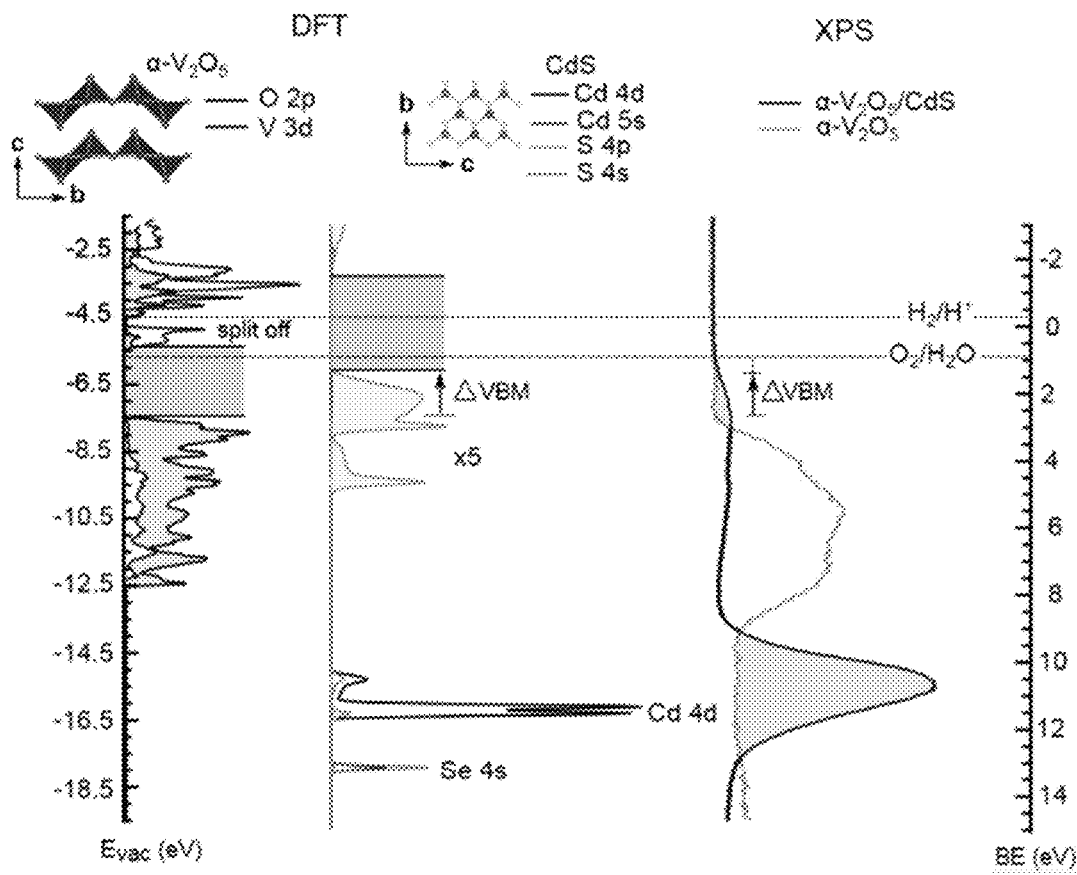
FIG. 32. Density of states diagrams of α-V$_2$O$_5$ and CdS, and measured XPS spectra of α-V$_2$O$_5$ NWs before and after SILAR deposition of CdS QDs.

DFT calculations and XPS spectra relevant to α-V$_2$O$_5$/CdS heterostructures are presented in FIG. 32. The band edge character of CdS is similar to CdSe except for a larger gap due to the substitution of Se 4s, p states for S 3s and p;[51] in addition, it shares the semi-core Cd 4d which is useful for energy-alignment purposes. The value of E$_r$ of α-V$_2$O$_5$ is lower than that of CdS QDs. The lower valance band maximum of CdS as compared to CdSe can be rationalized on the basis of Fajan's formalisms given the greater ionicity of this compound stemming from the higher electronegativity of sulfur. The energetic offset between valence band edges at the V$_2$O$_5$/CdS interface was determined to be 1.3 eV by comparison of the XPS spectra of bare α-V$_2$O$_5$ NWs and SILAR-derived α-V$_2$O$_5$/CdS heterostructures. The XPS spectra of the valence band region were energy-aligned to the semi-core Cd 4d peak at 11 eV, as previously reported for Pb$_{0.33}$V$_2$O$_5$/CdS heterostructures.[52]

Conduction band-edge energies (E$_r$) were estimated by adding optical bandgaps, determined from absorption onsets in the diffuse reflectance spectrum of α-V$_2$O$_5$ NWs (FIG. 30a) and the transmission-based absorption spectra of aqueous dispersions of cys-CdE QDs (FIG. 30b), to the values of E$_v$ determined from XPS and HAXPES. We used the absorption spectra of dispersed QDs in this analysis given their well-defined first-excitonic absorption bands. Excitonic absorption onsets of SILAR-deposited QDs were red-shifted relative to those of colloidal QDs (FIGS. 30 and 31); thus, interfacial conduction band-edge offsets varied slightly with preparation method. (For CdTe, we estimated E$_v$ from the measured E$_v$ of CdSe QDs and the reported difference in E$_v$ values of bulk CdSe and bulk CdTe).[53] On the basis of these considerations, we predict type-II energetic offsets for heterostructures of α-V$_2$O$_5$ NWs and CdS, CdSe, and CdTe QDs, in which both the conduction and valence band edges of CdE QDs are higher in energy than the corresponding band edge of α-V$_2$O$_5$. Estimated energetic offsets are summarized in FIG. 21b. Valence band-edge offsets of 1.3 to 2.3 eV render the transfer of photogenerated holes from NWs to QDs thermodynamically favorable, whereas conduction band-edge offsets of approximately 2 eV provide a driving force for the transfer of excited electrons from QDs to NWs. Thus, charge separation is predicted to be thermodynamically favorable following the excitation of either component of any of our heterostructures.

Excited-state deactivation of isolated NWs and QDs. We characterized excited-state deactivation and charge transfer using transient absorption spectroscopy. In the following discussion, we focus first on α-V$_2$O$_5$/CdSe heterostructures and their isolated components. The transient absorbance (TA) spectrum of dispersed cys-CdSe QDs in aqueous solution, acquired on the nanosecond timescale (FIG. 22a and FIG. 33a), exhibited a first-excitonic bleach centered at 510 nm, consistent with filling of the 1S(e) state of CdSe QDs, and a broad induced absorption feature from 550-900 nm, arising from the intraband excitation of photogenerated holes.[54,55] Decay traces were extracted from TA data matrices by averaging ΔA values at probe wavelengths within the bleach and induced absorption. Decay traces on nanosecond-to-microsecond timescales were fit to multiexponential decay kinetics, $$\Delta A = \sum_i A_i \exp\left(\frac{-t}{\tau_i}\right) \times IRF \quad (1)$$

where t is time after pulsed excitation, $\tau_i$ is the $i^{th}$ lifetime, $A_i$ is the amplitude of population decaying with $\tau_i$, and IRF is the instrument response function estimated as a Gaussian. Goodness of fit was evaluated by plots of residual (data minus fit) as a function of wavelength and by values of $\chi^2$; an additional exponential component was added to a given fit when it lowered $\chi^2$ and discernibly flattened the plot of residual vs. wavelength. Amplitude-weighted average lifetimes ($\langle\tau\rangle$) were calculated as follows:[56]

$$\langle\tau\rangle = \frac{\Sigma_i A_i \tau_i}{\Sigma_i A_i} \quad (2)$$

Figure 33:
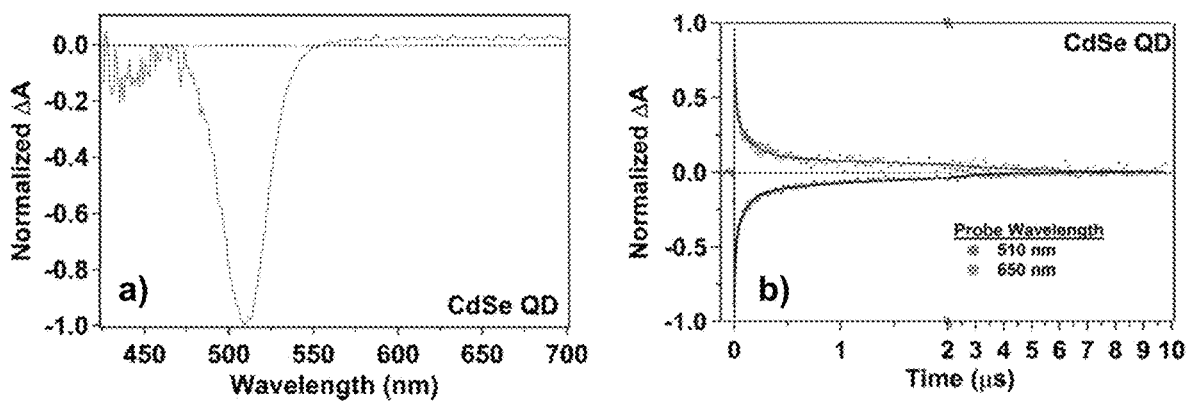
FIG. 33. (a) TA spectrum of colloidal cys-CdSe QDs (averaged at 1.5-10 ns delay times). (b) TA decay traces within the bleach (λ=510 nm) and absorption (λ=650 nm) features. Superimposed on the decay traces are triexponential fits. The excitation wavelength was 360 nm.

For dispersed cys-CdSe QDs, the bleach at 510 nm recovered and the induced absorption at 650 nm decayed with triexponential kinetics with values of $\langle\tau\rangle$ of (260±10) ns and (440±40) ns, respectively (FIG. 33b).

The TA spectrum of $\alpha$-$V_2O_5$ NWs, obtained as the average of spectra acquired at delay times of 1-10 ns (FIG. 22b,d and FIG. 34a), exhibits an excitonic bleach centered at 430 nm, a weaker bleach centered at 500 nm, and a broad induced absorption from 510 to 900 nm with maximum at approximately 550 nm. The 500-nm bleach has been ascribed to the filling of the lower-energy split-off conduction band of $\alpha$-$V_2O_5$ NWs.[28,47] The broad induced absorption feature is similar to the steady-state absorption of oxidized $\alpha$-$V_2O_5$ NWs, which we assigned previously to the intraband excitation of holes to states deeper within the VB.[36] Decays of the 430-nm bleach (FIG. 22e) and the 550-nm absorption (FIG. 35a) were modeled accurately by triexponential kinetics, yielding values of $\langle\tau\rangle$ of (0.5±0.3) μs and (1.4±0.2) μs, respectively. The multiexponential decay kinetics of TA features of $\alpha$-$V_2O_5$ NWs have been attributed to the presence of distributions of electron- and hole-trap states in the NWs.[36,57]

Figure 34:
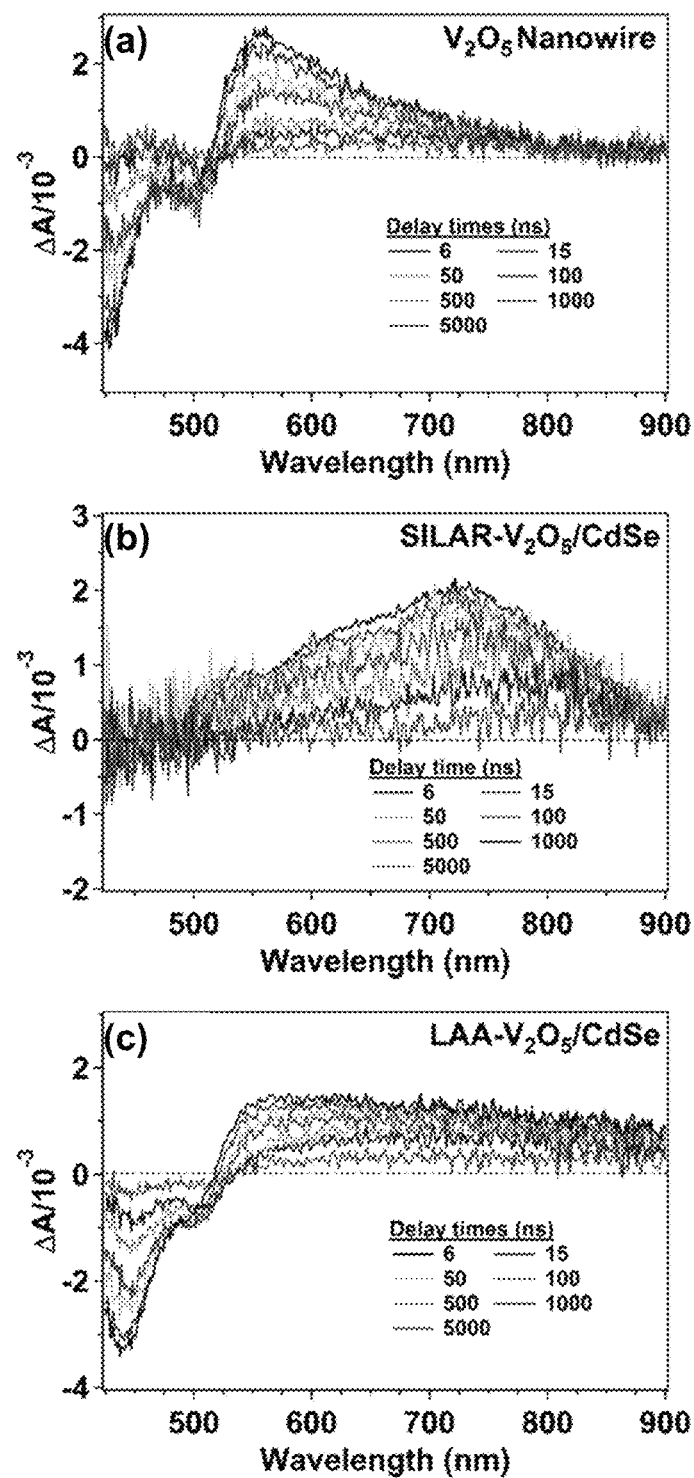
FIG. 34. TA spectra of α-V$_2$O$_5$ NWs (a), SILAR-derived α-V$_2$O$_5$/CdSe heterostructures (b), and LAA-derived α-V$_2$O$_5$/CdSe heterostructures (c). The excitation wavelength was 360 nm.
Figure 36:
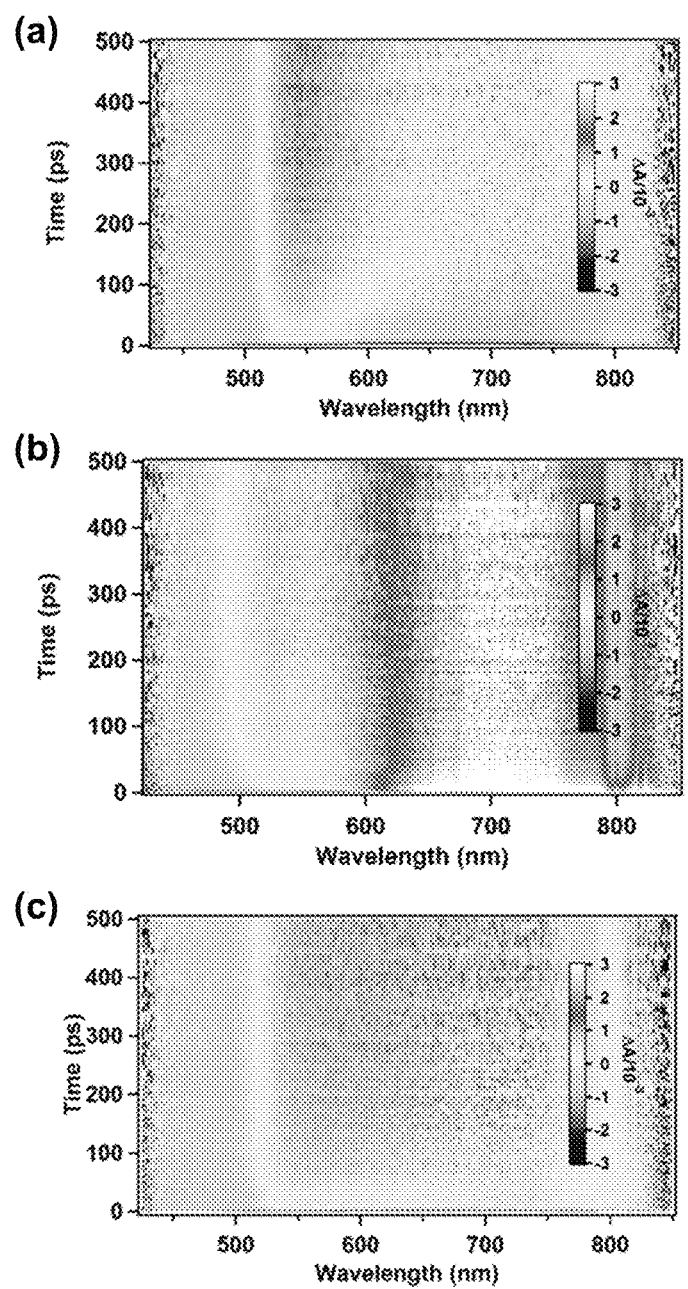
FIG. 36. Picosecond-timescale TA data matrices (color maps) of α-V$_2$O$_5$ NWs (a), SILAR-derived α-V$_2$O$_5$/CdSe heterostructures (b), and LAA-derived α-V$_2$O$_5$/CdSe heterostructures (c). The excitation wavelength was 360 nm.
Figure 37:
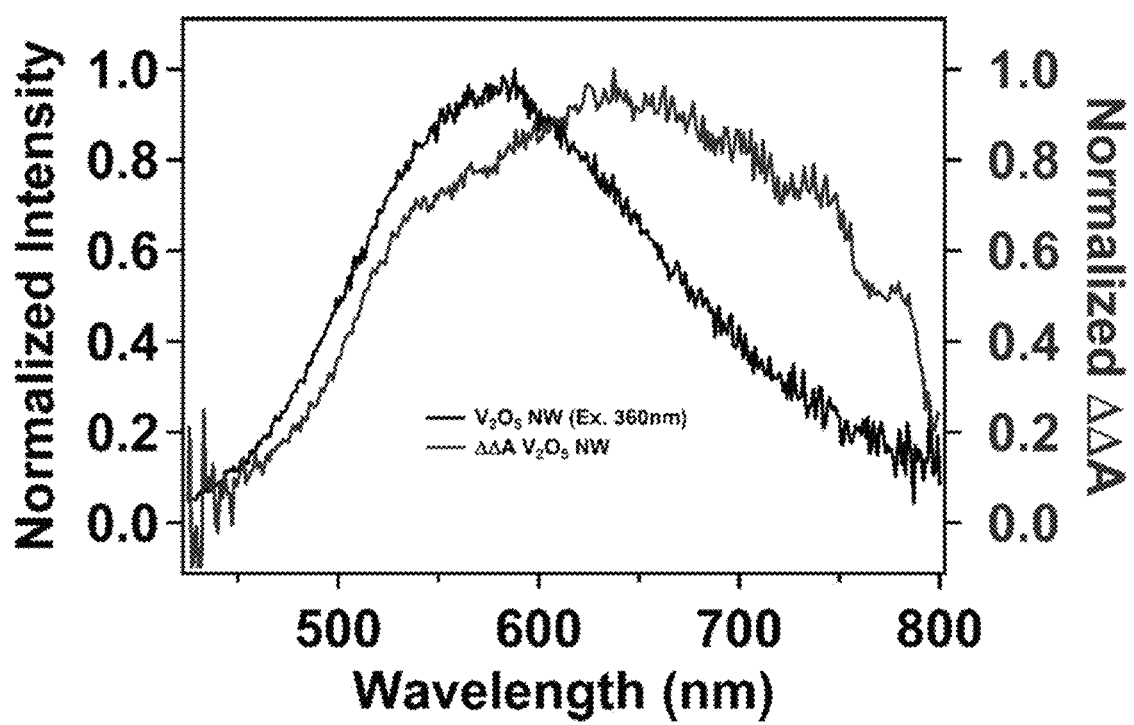
FIG. 37. Normalized steady-state emission spectrum and normalized MA spectrum of α-V$_2$O$_5$ NWs.
Figure 38:
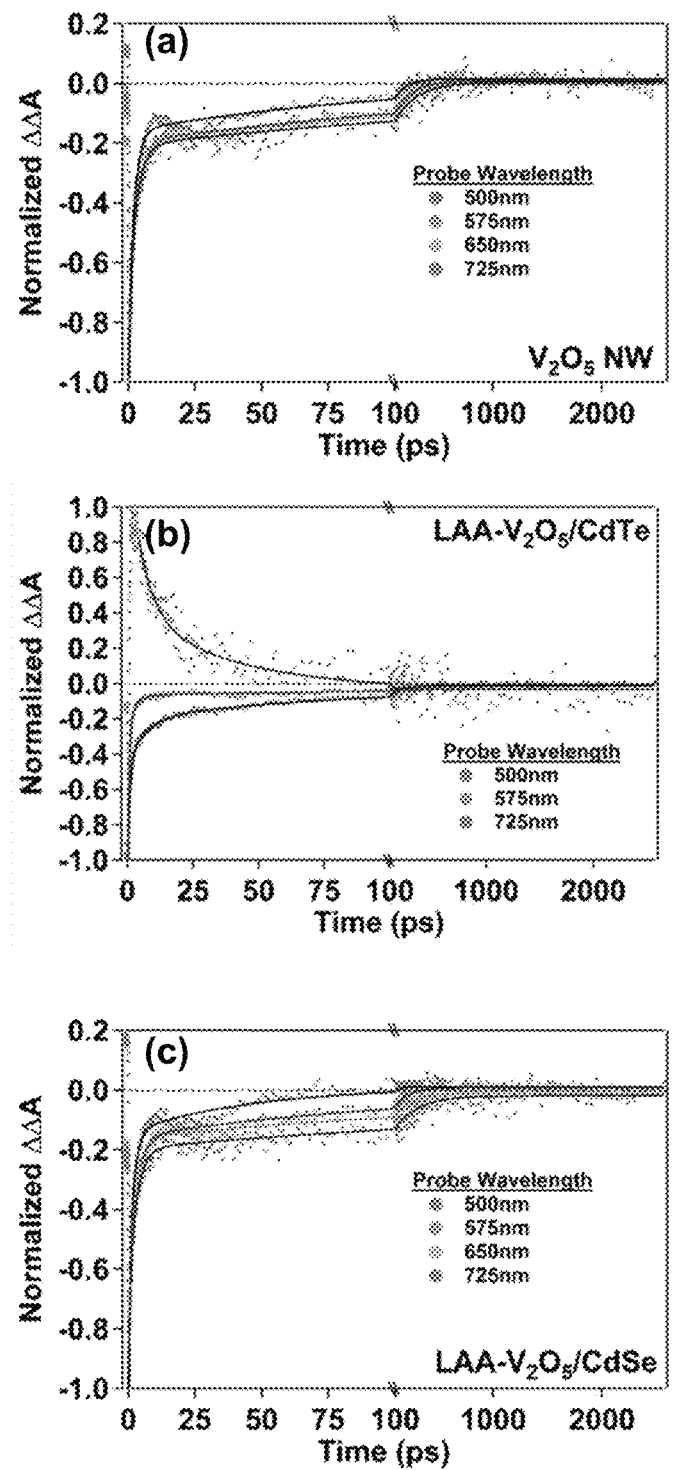
FIG. 38. ΔΔA decay traces for α-V$_2$O$_5$ NWs (a), SILAR-derived α-V$_2$O$_5$/CdSe heterostructures (b), and LAA-derived α-V$_2$O$_{5/CdSe}$ heterostructures (c). The excitation wavelength was 360 nm. Superimposed on the decay traces are fits to multiexponential kinetics.

TA spectra of $\alpha$-$V_2O_5$ NWs acquired at delay times of 1-100 ps (FIG. 23a and FIG. 36) differ greatly from nanosecond-timescale spectra. First, the 430-nm excitonic bleach of $\alpha$-$V_2O_5$ NWs is poorly resolved in picosecond-timescale spectra. Second, spectra acquired at delay times of several picoseconds contain a broad and intense bleach, which decays within several nanoseconds to the long-lived TA spectrum of photoexcited $\alpha$-$V_2O_5$ NWs. After approximately 500 ps, the 510-nm bleach and the long-wavelength absorption do not evolve further, as expected given that the excited state of $\alpha$-$V_2O_5$ NWs decays on the microsecond timescale (FIG. 34). To isolate the short-lived bleach feature, the 2.5-ns TA spectrum of $\alpha$-$V_2O_5$ NWs was subtracted from TA spectra acquired at shorter delay times; thus-calculated spectra are hereafter referred to as ΔΔA spectra. The profile of the ΔΔA spectrum of $\alpha$-$V_2O_5$ NWs (FIG. 23b) corresponds closely to the steady-state emission spectrum of the NWs (FIG. 37), suggesting that the initial short-lived apparent bleach arose from stimulated emission. Thus, at early timescales, the TA spectrum of $\alpha$-$V_2O_5$ NWs can be regarded as a linear combination of the TA spectrum of excited NWs and a contribution from stimulated emission. The broad bleach in the ΔΔA spectrum of $\alpha$-$V_2O_5$ NWs decayed with $\langle\tau\rangle$ of 10-50 ps (FIG. 38a). Notably, the valence band edge, split-off V 34, band, and the conduction band yield a three-level system that is able to mediate population inversion, potentially amplifying stimulated emission.

Figure 21:
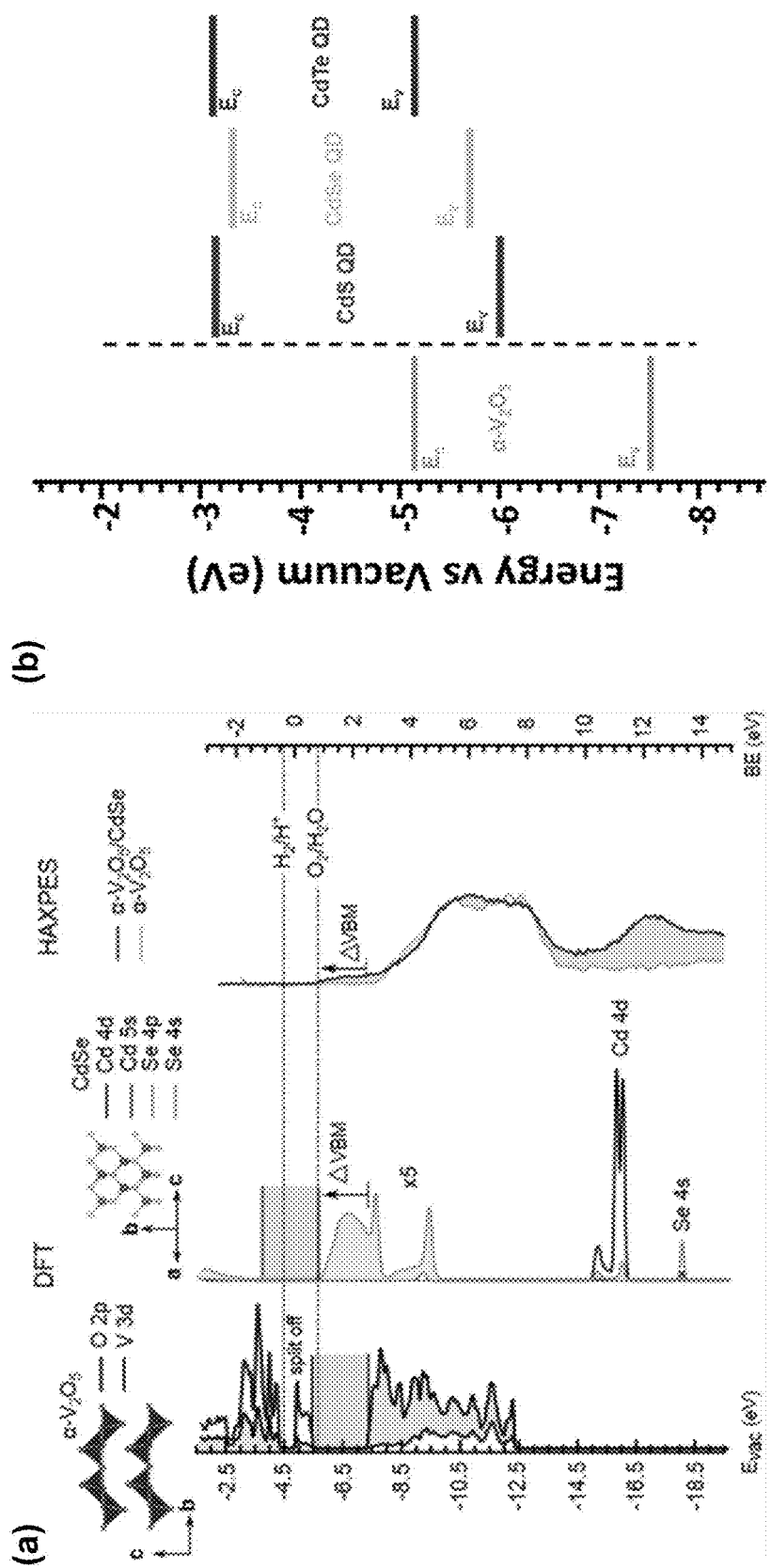
FIG. 21. (a) Density of states diagrams of α-V$_2$O$_5$ and CdSe, and measured HAXPES spectra of α-V$_2$O$_5$ NWs before and after SILAR deposition of CdSe QDs. (b) Estimated band-edge energies of α-V$_2$O$_5$/CdE heterostructures; type-II band-edge offsets are predicted for heterostructures comprising CdS, CdS, and CdTe QDs.
Figure 35:
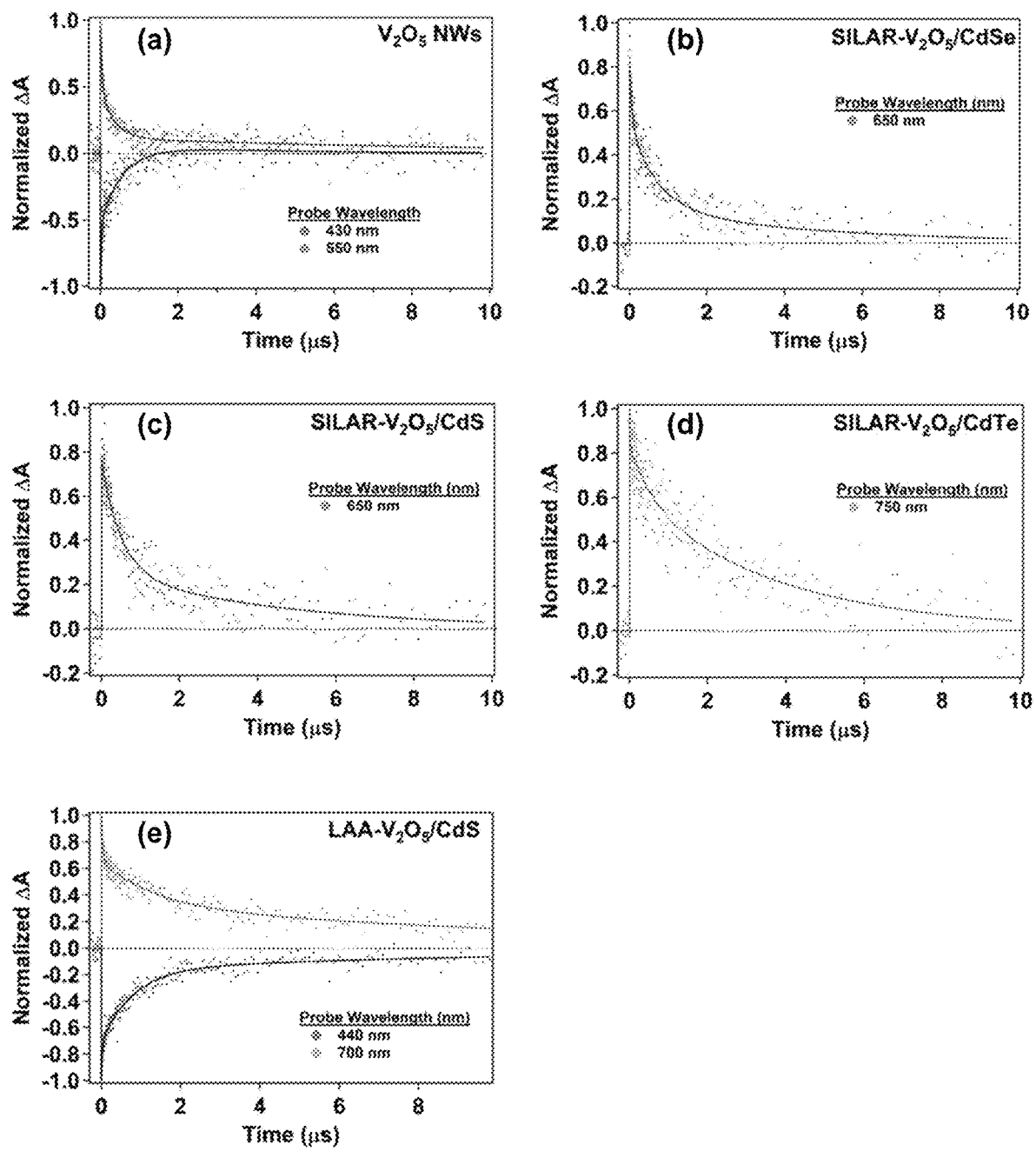
FIG. 35. TA decay traces of α-V$_2$O$_5$ NWs (a), SILAR-derived α-V$_2$O$_5$/CdSe heterostructures (b), SILAR-derived α-V$_2$O$_5$/CdS heterostructures (c), SILAR-derived α-V$_2$O$_5$/CdTe heterostructures (d), and LAA-derived α-V$_2$O$_5$/CdS heterostructures (e). The excitation wavelength was 360 nm.

Photoinduced charge transfer in $\alpha$-$V_2O_5$/CdSe heterostructures. Nanosecond-timescale TA spectra of $\alpha$-$V_2O_5$/CdSe heterostructures (FIG. 22c,d and FIG. 34b,c) differ greatly from those of the isolated NWs and QDs. The spectrum of SILAR-derived heterostructures consists of a broad induced absorption from 470-900 nm and a weak bleach at wavelengths below 470 nm. Notably absent from the TA spectrum are features attributable to photoexcited CdSe QDs or $\alpha$-$V_2O_5$ NWs. (It is not possible to prepare isolated SILAR-derived QDs in the absence of a substrate, precluding the independent acquisition of their TA spectrum; nonetheless, because the excitonic absorption onset of SILAR-deposited CdSe QDs is red-shifted relative to that of dispersed cys-CdSe QDs, we would expect a red-shifted excitonic bleach.) The TA spectrum of a charge-separated state formed via interfacial charge transfer, with an electron in $\alpha$-$V_2O_5$ NWs and a hole in CdSe QDs (FIG. 21b), should exhibit the spectral features of reduced NWs and oxidized QDs. We previously reported the ΔA spectrum of electrochemically-reduced $\alpha$-$V_2O_5$ NWs, which exhibits a well-resolved bleach centered at approximately 420 nm.[36] The ΔA spectrum of oxidized CdSe QDs has been reported to exhibit a broad induced absorption feature extending from the visible into the near-IR, which has been assigned to the excitation of holes.[55,58-61] Therefore, the measured TA spectrum of SILAR-derived $\alpha$-$V_2O_5$/CdSe heterostructures (FIG. 22c,d) indeed exhibits features associated with electrons localized in $V_2O_5$ and holes localized in CdSe. That the spectrum exhibits these features, but none attributable to excited states of $\alpha$-$V_2O_5$ NWs or CdSe QDs, provides compelling evidence for rapid and efficient interfacial charge separation. The TA spectrum in FIG. 22a was acquired after exciting heterostructures at 360 nm, where both $V_2O_5$ and CdSe absorb strongly (FIGS. 30 and 31); thus, photoexcitation of either component was likely followed by interfacial charge separation, as expected and desired for these type-II interfaces (FIG. 21). TA decay traces were extracted from the induced absorption feature of SILAR-derived heterostructures (FIG. 35b). Decay traces at 650 nm followed triexponential kinetics with $\langle\tau\rangle$ of (1.3±0.6) μs.

Figure 39:
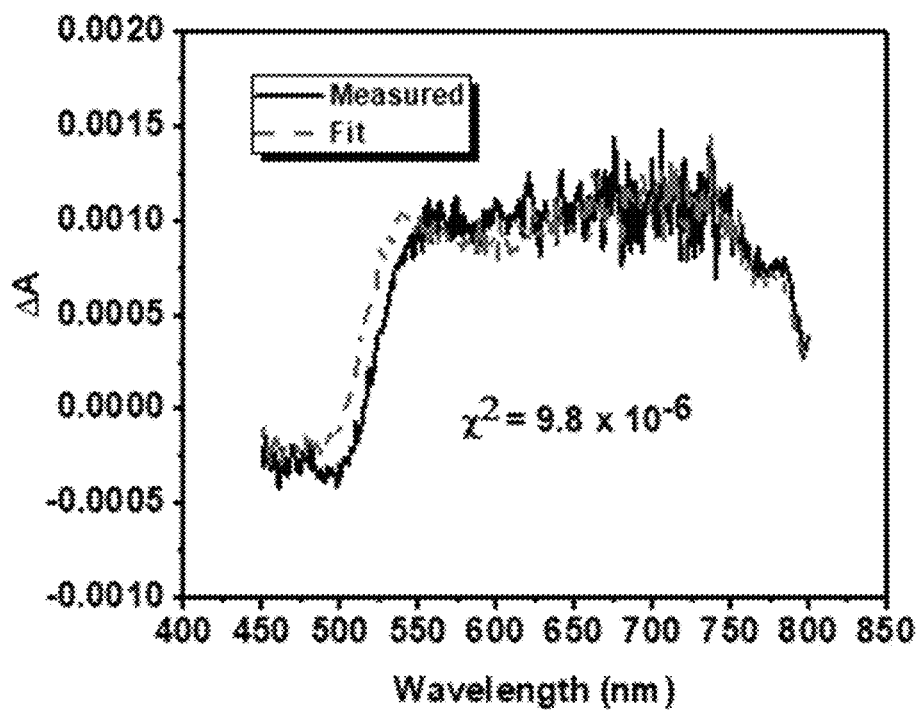
FIG. 39. Measured TA spectrum of LAA-derived α-V$_2$O$_{5/CdSe}$ heterostructures at 2.5 ns and fit to a linear combination of spectra corresponding to the excited state of α-V$_2$O$_5$ NWs and the charge-separated state.

The TA spectrum of LAA-derived $\alpha$-$V_2O_5$/CdSe heterostructures (FIG. 22d) exhibits features similar to the spectra of both the isolated NWs and the SILAR-derived heterostructures. A bleach at wavelengths less than 520 nm is nearly superimposable with that of isolated $\alpha$-$V_2O_5$ NWs. A broad absorption from 520-900 nm is similar to that of SILAR-derived $\alpha$-$V_2O_5$/CdSe heterostructures and provides evidence for photogenerated holes localized in QDs. The TA spectrum of LAA-derived heterostructures thus has contributions from the charge-separated state, with electrons in $V_2O_5$ and holes in CdSe, and the excited state of $\alpha$-$V_2O_5$ NWs that did not participate in charge transfer (consistent with the lower loading of QDs in these heterostructures). Indeed, the 2.5-ns TA spectrum of LAA-derived heterostructures was modeled accurately as a linear combination of the 2.5-ns TA spectra of SILAR-derived heterostructures (as a signature of the charge-separated state) and isolated $\alpha$-$V_2O_5$ NWs (FIG. 39). The close alignment between the measured TA spectrum and the fit supports our interpretation of the TA spectrum of LAA-derived heterostructures as arising from charge-separated state and residual photoexcited $\alpha$-$V_2O_5$ NWs. Whereas LAA-derived heterostructures have fewer QDs per NW, relative to SILAR-derived heterostructures (FIG. 20), it is not surprising that their TA spectrum contains features attributable to photoexcited $V_2O_5$.

Figure 22:
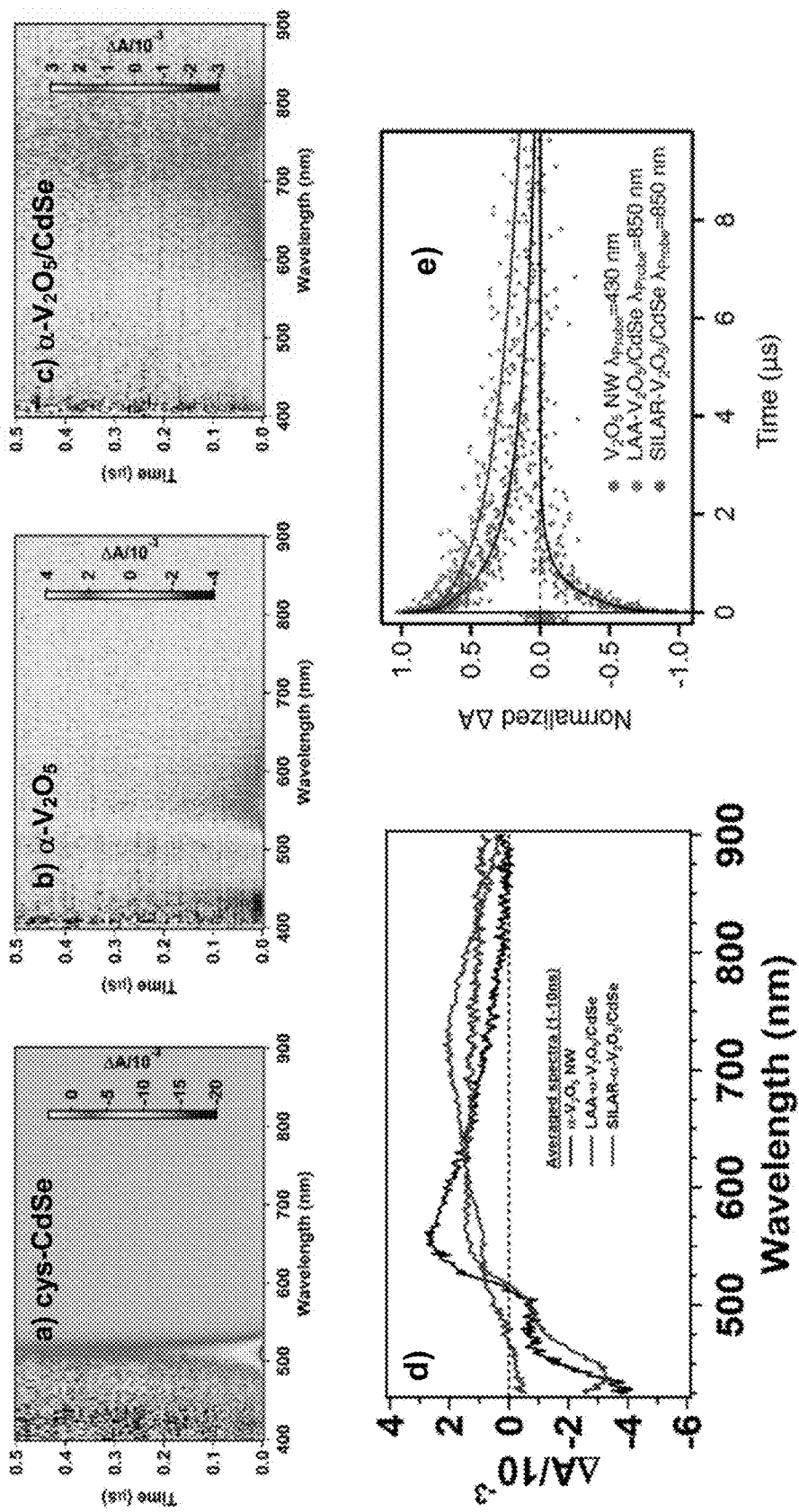
FIG. 22. TA data matrices (color maps) of cys-CdSe QDs (a), α-V$_2$O$_5$ NWs (b), and SILAR-derived α-V$_2$O$_5$/CdSe heterostructures (c); TA spectra (d) averaged over delay times of 1-10 ns for α-V$_2$O$_5$ NWs and LAA- and SILAR-derived α-V$_2$O$_5$/CdSe heterostructures, and corresponding decay traces and multiexponential fits (e) within the bleach of α-V$_2$O$_5$ NWs (λ=430 nm) and the absorption corresponding to the charge-separated state of α-V$_2$O$_5$/CdSe heterostructures (λ=850 nm). The excitation wavelength was 360 nm.

To assess the longevity of the charge-separated state in LAA-derived heterostructures, we generated a TA decay trace at 850 nm (FIG. 22e), within the broad induced absorption feature of the heterostructures but beyond that of the isolated $\alpha$-$V_2O_5$ NWs (FIG. 22d). The 850-nm absorption decayed triexponentially with $\rangle\tau\langle$ of (5.0±1.1) μs. The charge-separated state for LAA-derived heterostructures was thus several-fold longer-lived than that of SILAR-derived heterostructures. The presence of cysteinate at the NW/QD interface may have slowed charge recombination.

Figure 23:
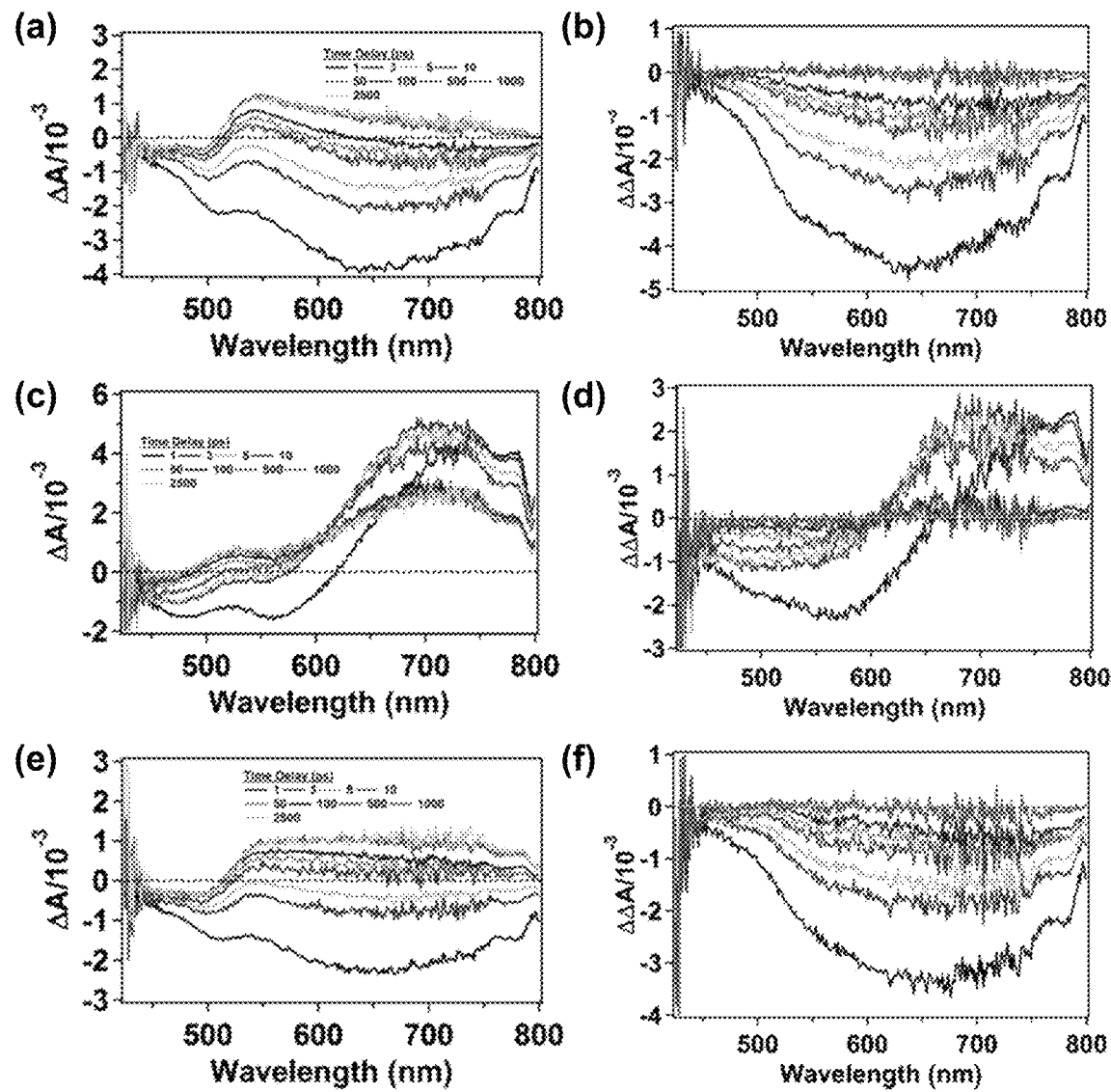
FIG. 23. Picosecond-timescale TA spectra and corresponding ΔΔA plots of α-V$_2$O$_5$ NWs (a, b), SILAR-derived α-V$_2$O$_5$/CdSe heterostructures (c, d), and LAA-derived α-V$_2$O$_5$/CdSe heterostructures (e, f). ΔΔA plots were obtained by subtracting the TA spectrum of a given heterostructure, acquired at a delay time of 2.5 ns, from TA spectra acquired at delay times less than 2.5 ns. The excitation wavelength was 360 nm.

Dynamics of charge transfer at $\alpha$-$V_2O_5$/CdSe interfaces. We acquired picosecond-timescale transient absorption data to learn how fast electrons and holes were separated across NW/QD interfaces. Full TA data matrices are presented as color maps in FIG. 36, and spectra are presented in FIG. 23. TA spectra of SILAR-derived $\alpha$-$V_2O_5$/CdSe heterostructures (FIG. 23c) differed significantly from those of isolated $\alpha$-$V_2O_5$ NWs (FIG. 23a). Spectra acquired at delay times of 1-5 ps exhibit a bleach from 450-550 nm and an absorption from 550-800 nm. These features decay within a nanosecond to the long-lived TA spectrum of SILAR-derived α-V$_2$O$_5$/CdSe heterostructures, assigned previously to the charge-separated state. TA spectra acquired at delay times from 3 ps to 2.5 ns contain a well-resolved isosbestic point at 605 nm with ΔA of approximately 1 mOD. TA spectra of photoexcited colloidal QDs or other chromophores necessarily contain isosbestic points, with ΔA equal to zero, at wavelengths at which the excited and ground states have identical molar absorption coefficients. However, the non-zero value of ΔA at the 605-nm isosbestic point in the TA spectra of SILAR-derived α-V$_2$O$_5$/CdSe heterostructures indicates that a third component, other than the ground and excited states, is present. This third component was formed within 3 ps and did not decay to any measurable extent within 2.5 ns.

Corresponding ΔΔA spectra (FIG. 23d), calculated by subtracting the TA spectrum acquired at 2.5 ns from earlier-timescale spectra, consist of a well-resolved bleach from 450-605 nm, an absorption from 605-800 nm, and an isosbestic point at 605 nm with ΔΔA of 0. (The ΔΔA spectrum extracted at 1 ps was red-shifted relative to the spectra at longer delay times). The ΔΔA spectra of SILAR-derived α-V$_2$O$_5$/CdSe heterostructures are similar to the TA spectrum of dispersed cys-CdSe QDs (FIG. 33a). We thus assign the ΔΔA spectra of SILAR-derived α-V$_2$O$_5$/CdSe heterostructures to the excited state of SILAR-deposited CdSe QDs. (Equivalently, TA spectra of SILAR-derived α-V$_2$O$_5$/CdSe heterostructures have contributions from the charge-separated state and from residual excited CdSe QDs.) Notably, the value of ΔA at the 605-nm isosbestic point is unchanged in the TA spectra (or, equivalently, the isosbestic point in ΔΔA spectra remains at 0 on the y-axis), as the bleach and absorption arising from excited CdSe QDs decay. Therefore, a population of CdSe QDs within the heterostructures decays to the ground state rather than through electron transfer to V$_2$O$_5$.

Picosecond-timescale TA decay traces were fit to multi-exponential kinetics, $$\Delta A = \Sigma_i A_i \exp\left(\frac{-t}{\tau_i}\right) \quad (3)$$

We fit ΔΔA decay traces at 500 and 725 nm and extracted ⟨τ⟩ of (16.1±0.9) ps and (17±5) ps, respectively (FIG. 38b). These values of ⟨τ⟩ are much shorter than those of dispersed cys-CdSe QDs (FIG. 33b), perhaps owing to the high local concentration of QDs on the NWs. Importantly, the persistence of the 605-nm isosbestic point, without any change of ΔA, from 3 ps onward, reveals that charge separation within SILAR-derived α-V$_2$O$_5$/CdSe heterostructures was complete within several picoseconds after pulsed excitation of the heterostructures.

Figure 40:
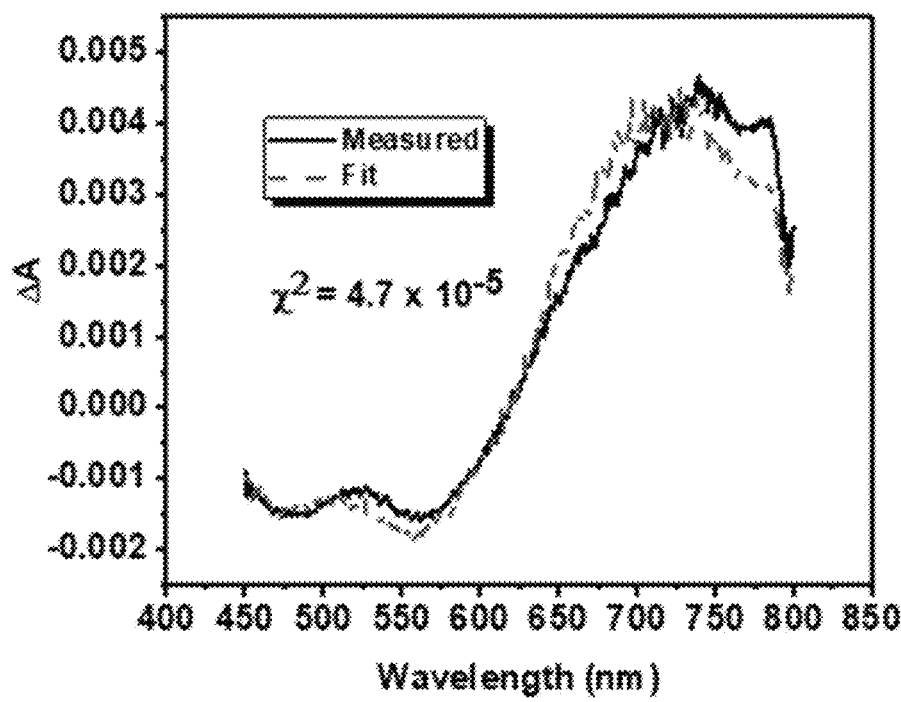
FIG. 40. Measured TA spectrum of SILAR-derived α-V$_2$O$_5$/CdSe heterostructures at 1 ps, and a fit of the spectrum to a linear combination of spectra corresponding to stimulated emission from α-V$_2$O$_5$ NWs (the ΔΔA spectrum of α-V$_2$O$_5$ NWs), the excited state of SILAR-deposited CdSe (the ΔΔA spectrum of SILAR-derived α-V$_2$O$_5$/CdSe heterostructures at delay times greater than 3 ps), and the charge-separated state (the TA spectrum of heterostructures at 2.5 ns).

TA spectra of SILAR-derived α-V$_2$O$_5$/CdSe heterostructures, acquired at delay times of 3 ps and longer, do not contain any spectral signature of stimulated emission from V$_2$O$_5$. In contrast, the red-shifted bleach in the 1-picosecond TA spectrum (FIG. 23c) may have arisen from stimulated emission. Indeed, the 1-picosecond spectrum is modeled accurately as a linear combination of spectra corresponding to emissive V$_2$O$_5$ (the ΔΔA spectrum of α-V$_2$O$_5$ NWs), excited CdSe (the ΔΔA spectrum of SILAR-derived α-V$_2$O$_5$/CdSe heterostructures at delay times greater than 3 ps), and charge-separated state (the TA spectrum of heterostructures at 2.5 ns) (FIG. 40). The close correspondence between the measured and fitted spectra suggests that α-V$_2$O$_5$ NWs were initially emissive but that emission was quenched by rapid charge transfer. In summary, in SILAR-derived α-V$_2$O$_5$/CdSe heterostructures, charge separation occurred within approximately 3 ps to yield a charge-separated state that persisted for microseconds.

TA spectra of LAA-derived α-V$_2$O$_5$/CdSe heterostructures acquired at delay times of 1-10 ps (FIG. 23e) consist of a broad bleach throughout the visible and thus resemble the spectrum of isolated V$_2$O$_5$ NWs (FIG. 23a). Spectra of LAA-derived heterostructures evolve with time to yield a spectrum similar to that measured on nanosecond timescales, except that the 430-nm bleach is less well-resolved. Picosecond-timescale ΔΔA spectra of LAA-derived α-V$_2$O$_5$/CdSe heterostructures, generated by subtracting the 2.5-ns TA spectrum from a given picosecond-timescale TA spectrum (FIG. 23f), exhibit the spectral signature of stimulated emission from V$_2$O$_5$ NWs (FIG. 23b). This feature for LAA-derived heterostructures persists for approximately 500 ps (FIGS. 23b and 38c), indicating that holes are transferred much more slowly in LAA-derived heterostructures than in SILAR-derived heterostructures. This difference may have arisen from the increased distance and poorer electronic coupling between CdSe QDs and V$_2$O$_5$ NWs in LAA-derived heterostructures, due to the presence of cysteinate as molecular linker. The ΔΔA spectra of LAA-derived heterostructures did not exhibit a bleach attributable to photoexcited CdSe QDs (FIG. 23f). The bleach in TA spectra of cadmium chalcogenide QDs is proportional to the population of excited electrons.[59,62] Thus, the absence of the bleach in ΔΔA spectra of LAA-derived heterostructures suggests that electrons were transferred from CdSe QDs to V$_2$O$_5$ NWs within the instrument response.

In summary, the α-V$_2$O$_5$/CdSe heterostructures prepared by both SILAR and LAA undergo sub-picosecond electron transfer following excitation of CdSe QDs to yield long-lived charge-separated states. Photoexcitation of α-V$_2$O$_5$ NWs within SILAR-derived heterostructures is followed by the transfer of holes to CdSe QDs within several picoseconds. Interfacial hole transfer is slower in LAA-derived heterostructures, occurring over several hundred picoseconds. Likewise, interfacial charge recombination occurs more rapidly within SILAR-derived heterostructures than LAA-derived heterostructures. These differences in the rates of interfacial charge transfer probably arose from the properties of V$_2$O$_5$/CdSe interfaces. The presence of cysteinate as molecular linker within LAA-derived heterostructures should increase the distance and decrease the electronic coupling between NWs and QDs, which apparently gave rise to measurable differences in the timescales of charge separation and recombination. These differences notwithstanding, the efficient and prolonged separation of photogenerated electrons and holes renders both SILAR- and LAA-derived α-V$_2$O$_5$/CdSe heterostructures intriguing for redox photocatalysis. The viability of this approach is presented below.

Figure 24:
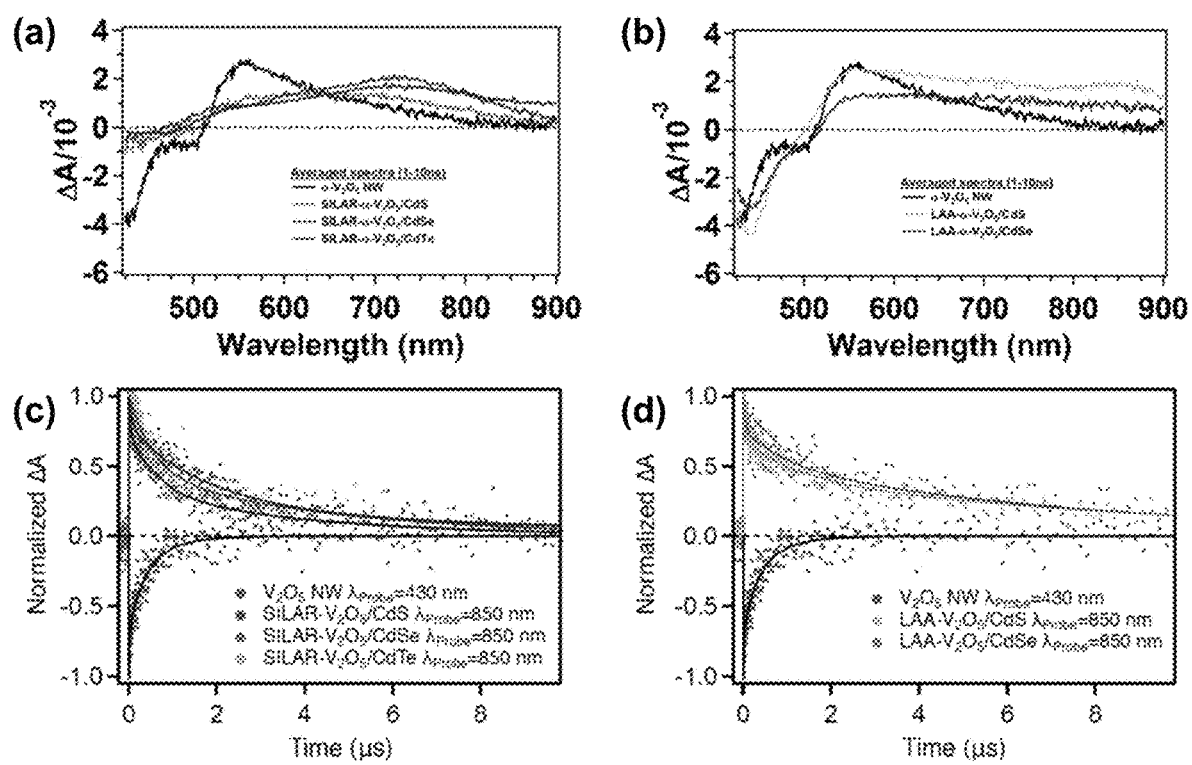
FIG. 24. TA spectra averaged between 1-10 ns for (a) α-V$_2$O$_5$ NWs and SILAR-derived α-V$_2$O$_5$/CdS, α-V$_2$O$_5$/CdS, and α-V$_2$O$_5$/CdTe heterostructures and (b) α-V$_2$O$_5$ NWs and LAA-derived α-V$_2$O$_5$/CdS and α-V$_2$O$_5$/CdSe heterostructures. Corresponding decay traces and multiexponential fits within (c) the excitonic bleach of α-V$_2$O$_5$ NWs (λ=430 nm) and the charge-separated state of SILAR-derived α-V$_2$O$_5$/CdS, α-V$_2$O$_5$/CdSe and α-V$_2$O$_5$/CdTe heterostructures (λ=850 nm), and (d) the excitonic bleach of α-V$_2$O$_5$ NWs (λ=430 nm) and the charge-separated state of LAA-derived α-V$_2$O$_5$/CdS and α-V$_2$O$_5$/CdSe heterostructures (λ=850 nm). The excitation wavelength was 360 nm.

Spectroscopic characterization of α-V$_2$O$_5$/CdS and α-V$_2$O$_5$/CdTe heterostructures. Nanosecond-timescale TA spectra of SILAR-derived α-V$_2$O$_5$/CdS and αV$_2$O$_5$/CdTe heterostructures are similar to those of α-V$_2$O$_5$/CdSe heterostructures and vary only minimally with identity of the QDs (FIG. 24a). TA spectra of all SILAR-derived heterostructures exhibit a weak bleach below approximately 500 nm and a broad absorption extending from 500-900 nm. The absorption feature red-shifted slightly from CdS to CdSe to CdTe, but spectra were otherwise nearly identical. We therefore assign the nanosecond-timescale TA spectra of SILAR-derived α-V$_2$O$_5$/CdS and α-V$_2$O$_5$/CdTe heterostructures to charge-separated state. Charge-separated states for all SILAR-derived heterostructures persisted for microseconds and were substantially longer-lived than the bleach of photoexcited V$_2$O$_5$ NWs (FIG. 24c). Decay traces within the absorptive signals were fit to bi- or triexponential kinetics (FIG. 35c,d), and values of ⟨τ⟨ were on the order of 10$^{-6}$ s (Table 8).

Nanosecond TA spectra of LAA-derived α-V$_2$O$_5$/CdS heterostructures contain features of both excited V$_2$O$_5$ NWs and the charge-separated state (FIG. 24b). Decay traces were extracted at various wavelengths (FIG. 35e); values of ⟩τ⟩ are tabulated in Table 9. Charges recombined 2-to-3-times more slowly in LAA-derived α-V$_2$O$_5$/CdS heterostructures than in the corresponding SILAR-derived heterostructures, which we attribute to the presence of cysteinate between QDs and NWs.

Figure 25:
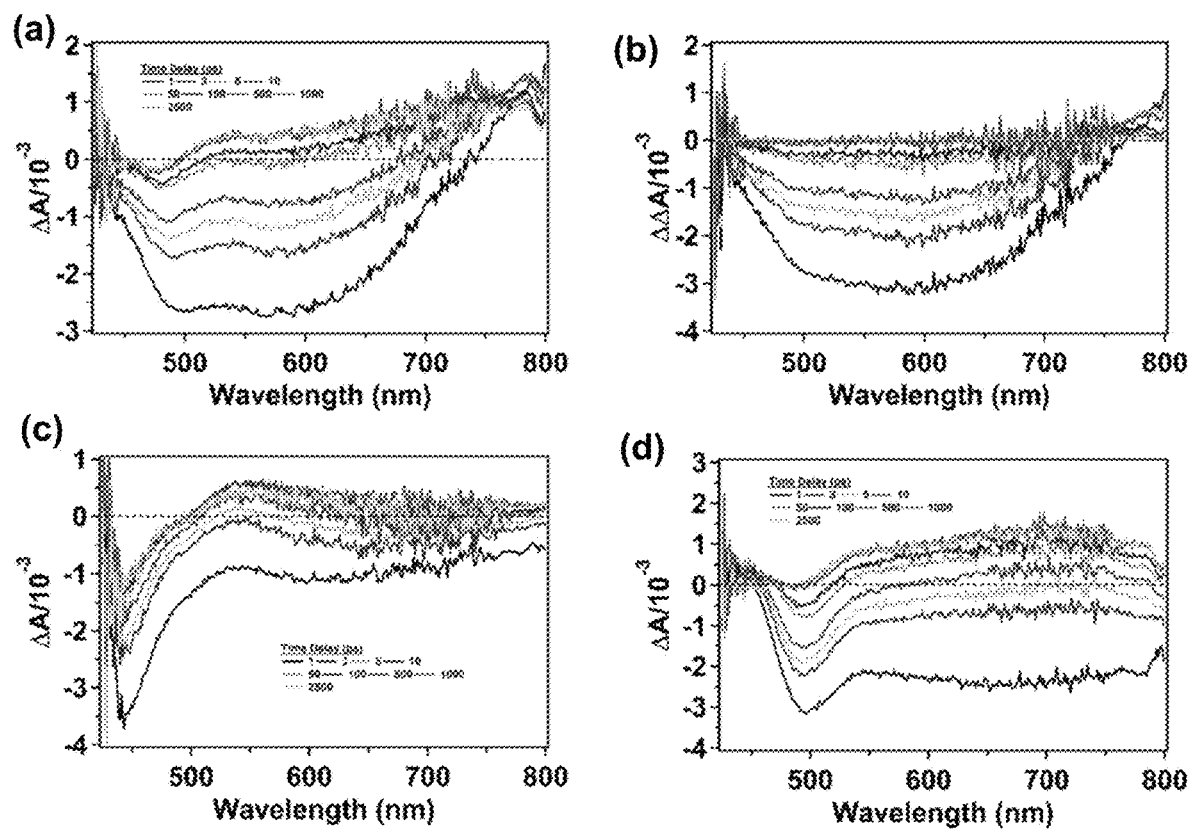
FIG. 25. Picosecond-timescale TA spectra of SILAR-derived α-V$_2$O$_5$/CdTe heterostructures (a) and corresponding ΔΔA spectra (b) (obtained by subtracting the TA spectrum acquired at 2.5 ns from all other TA spectra); TA spectra of SILAR-derived (c) and LAA-derived α-V$_2$O$_5$/CdS (d) heterostructures. The excitation wavelength was 360 nm.
Figure 41:
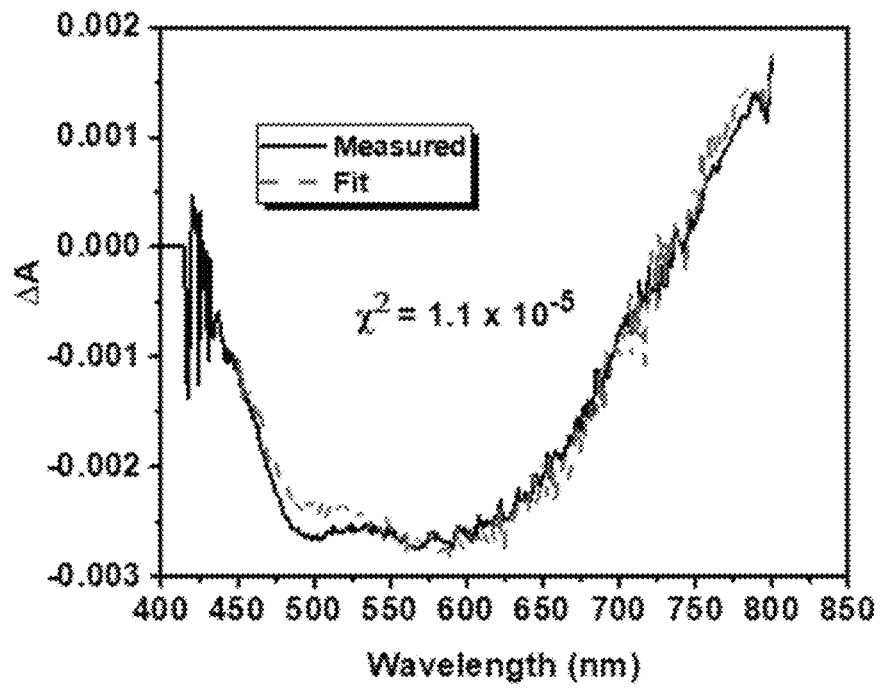
FIG. 41. Measured TA spectrum of SILAR-derived α-V$_2$O$_5$/CdTe heterostructures at 1 ps, and a fit of the spectrum to a linear combination of spectra corresponding to stimulated emission from α-V$_2$O$_5$ NWs (the ΔΔA spectrum of α-V$_2$O$_5$ NWs), the excited state of SILAR-deposited CdTe (the ΔΔA spectrum of SILAR-derived α-V$_2$O$_5$/CdTe heterostructures at 3 ps), and the charge-separated state (the TA spectrum of SILAR-derived α-V$_2$O$_5$/CdTe heterostructures at 2.5 ns).

Picosecond-timescale TA spectra of SILAR- and LAA-derived α-V$_2$O$_5$/CdS and α-V$_2$O$_5$/CdTe heterostructures were acquired to evaluate charge-transfer dynamics (FIG. 25). TA spectra of SILAR-derived α-V$_2$O$_5$/CdTe heterostructures at the shortest delay times consist of a broad bleach; the spectrum evolves with time to that of charge-separated state with a weak bleach centered at 470 nm and a broad absorption. At delay times of 3 ps and longer, spectra exhibit an isosbestic point at 760 nm with ΔA of approximately 0.8 mOD; the rapid formation of this isosbestic point with non-zero ΔA suggests that charge separation was complete within several picoseconds (FIG. 25a). Corresponding ΔΔA spectra (FIG. 25b) at delay times of 3 ps and longer exhibit a broad excitonic bleach centered at 600 nm. By analogy with our interpretation of the TA spectra of α-V$_2$O$_5$/CdSe heterostructures, we attribute the bleach to excited states of CdTe QDs that decayed independently and did not participate in charge separation. The TA spectrum of SILAR-derived α-V$_2$O$_5$/CdTe heterostructures, acquired at 1 ps, was modeled accurately as a linear combination of the stimulated-emission spectrum of α-V$_2$O$_5$ NWs (ΔΔA spectrum of α-V$_2$O$_5$ NWs), the TA spectrum of charge-separated state (2.5-ns TA spectrum of SILAR-derived α-V$_2$O$_5$/CdTe heterostructures), and the TA spectrum of residual CdTe QDs (3-ps ΔΔA spectrum of SILAR-derived α-V$_2$O$_5$/CdTe heterostructures) (FIG. 41). The quality of this fit suggests that stimulated emission contributed to the TA spectrum at the earliest measurable timescales and that charge separation indeed occurred within 3 ps.

Picosecond-timescale TA spectra of SILAR- and LAA-derived α-V$_2$O$_5$/CdS heterostructures are interesting (FIG. 25c,d). At the earliest delay times, spectra for both samples exhibit a narrow short-wavelength bleach (centered at 430 nm for LAA- and 500 nm for SILAR-derived heterostructures) attributable to the excitonic bleach of QDs, and a broad, longer-wavelength bleach corresponding to stimulated emission from α-V$_2$O$_5$ NWs. The excitonic CdS bleach for LAA-derived heterostructures is narrower and blue-shifted relative to SILAR-derived heterostructures, consistent with the smaller and narrower size distributions of the pre-synthesized QDs used in LAA.

Figure 42:
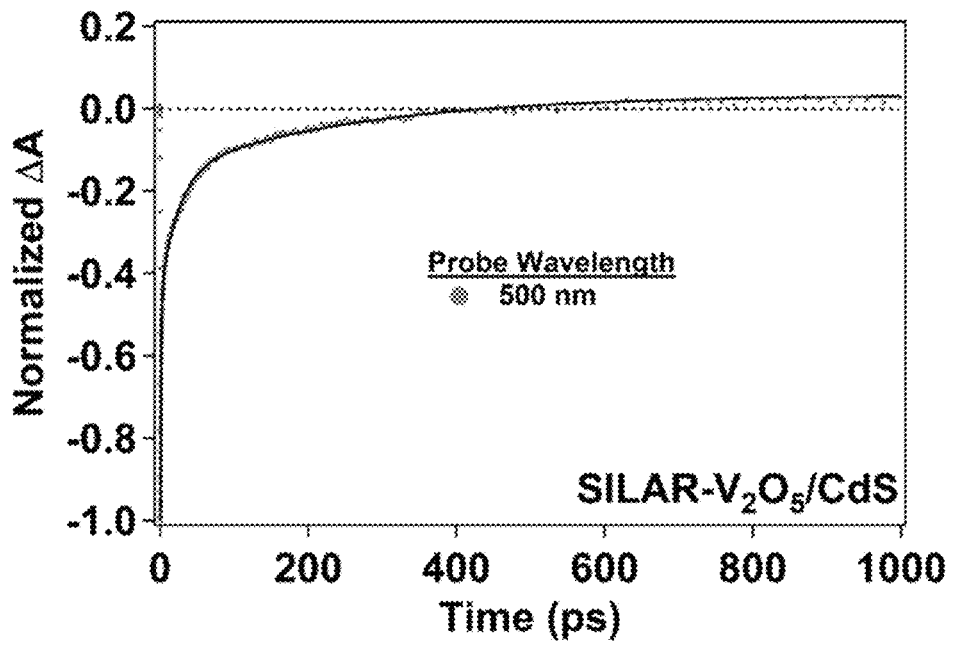
FIG. 42. TA decay trace at a probe wavelength of 500 nm and fit to triexponential kinetics, for SILAR-derived α-V$_2$O$_5$/CdS heterostructures. The excitation wavelength was 360 nm.

The TA spectrum of SILAR-derived α-V$_2$O$_5$/CdS heterostructures evolved within 500 ps to that of the charge-separated state, but, at shorter delay times, differed markedly from the spectra of SILAR-derived α-V$_2$O$_5$/CdSe and α-V$_2$O$_5$/CdTe heterostructures. First, for α-V$_2$O$_5$/CdS heterostructures, stimulated emission from α-V$_2$O$_5$ NWs persisted for several hundred picoseconds. Second, the spectra contain no isosbestic point. These differences indicate that interfacial charge separation occurred more slowly in SILAR-derived α-V$_2$O$_5$/CdS heterostructures than in α-V$_2$O$_5$/CdSe and α-V$_2$O$_5$/CdTe heterostructures, which may be attributable to the lower driving force for the transfer of holes from V$_2$O$_5$ to CdS (FIG. 21). We fit TA decay traces within the bleach of CdS QDs and extracted ⟨τ⟩ of (48±3) ps (FIG. 42), which is vastly shorter than the approximately 160-ns excited-state lifetime of dispersed cys-CdS QDs. The accelerated bleach decay provides evidence that electrons were transferred from photoexcited CdS to V$_2$O$_5$. Both stimulated emission from α-V$_2$O$_5$ NWs and the charge-separated state give rise to broad spectral features; therefore, deconvolution of electron-transfer and hole-transfer kinetics is not trivial. Nonetheless, the persistence of the excitonic bleach of CdS QDs and stimulated emission from α-V$_2$O$_5$ NWs reveal that charge separation occurred more slowly for SILAR-derived α-V$_2$O$_5$/CdS heterostructures than for the corresponding CdSe- and CdTe-containing heterostructures.

We would expect charge separation to occur even more slowly for LAA-derived α-V$_2$O$_5$/CdS heterostructures, due to the presence of cysteinate at the QD/NW interface. However, due to the overlap of the excitonic bleach of CdS QDs, stimulated emission from α-V$_2$O$_5$ NWs, and the signal from charge-separated state, we were unable to quantify charge-transfer dynamics.

Figure 26:
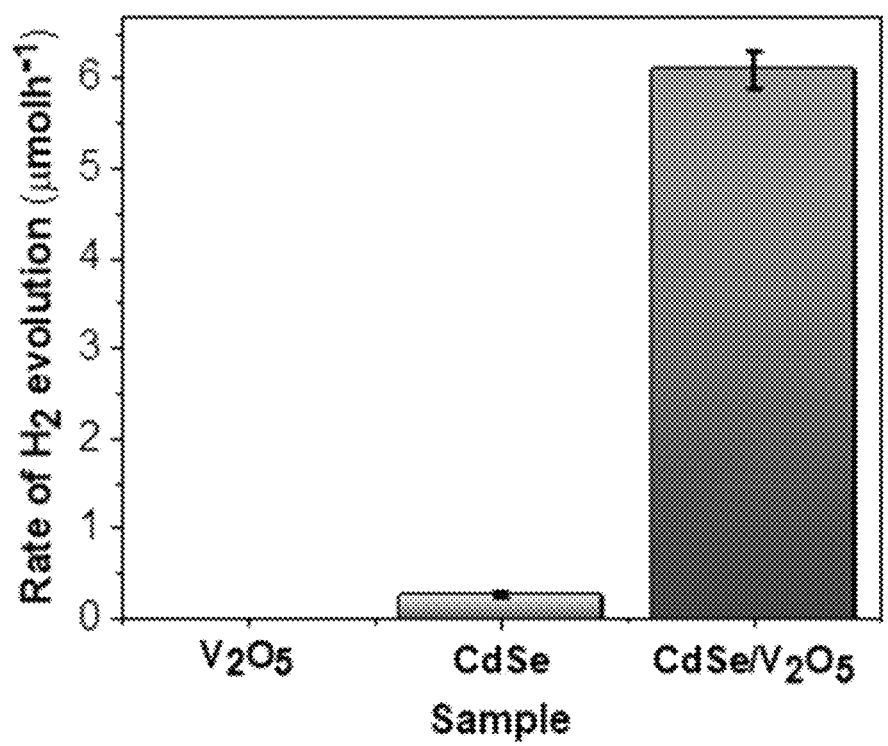
FIG. 26. Rates of photocatalytic H$_2$ evolution at α-V$_2$O$_5$ NWs, cys-CdSe QDs, and LAA-derived α-V$_2$O$_5$/CdSe heterostructures. Samples were dispersed in aqueous solutions of lactic acid (20%) and Ni-{3-MPA} co-catalyst and illuminated with white light.

Photocatalytic reduction of protons to hydrogen at α-V$_2$O$_5$/CdSe heterostructures. We endeavored to exploit the photoinduced charge-transfer reactivity of the NW/QD heterostructures in redox photocatalysis. We focus here on LAA-derived α-V$_2$O$_5$/CdSe heterostructures, which underwent rapid charge separation to yield electrons in V$_2$O$_5$ and holes in CdSe. We envisioned a mechanism in which electrons in NWs would reduce solvated protons rather than recombining with photogenerated holes. Reaction mixtures consisting of LAA-derived α-V$_2$O$_5$/CdSe heterostructures, lactic acid (as a source of protons and a sacrificial electron donor), and Ni-{3-MPA} (as a reduction co-catalyst[37]) were illuminated with white light, and H$_2$ was quantified by gas chromatography. The rate of hydrogen evolution from dispersions containing LAA-derived α-V$_2$O$_5$/CdSe heterostructures (6.1±0.2 µmol h$^{-1}$) was 20-fold greater than from dispersions containing only cys-CdSe QDs, lactic acid, and Ni-{3-MPA} (0.26±0.03 µmol h$^{-1}$) (FIG. 26). Dispersions containing α-V$_2$O$_5$ NWs, lactic acid, and Ni-{3-MPA} exhibited no measurable hydrogen evolution. These results are consistent with a mechanism in which photogenerated electrons in α-V$_2$O$_5$ NWs are transferred to Ni-{3-MPA}, which subsequently reduces protons to hydrogen, and in which photogenerated holes in cys-CdSe QDs oxidize lactic acid. The vastly increased rate at which hydrogen was produced by the heterostructures, relative to isolated NWs or QDs, suggests that the separation of photogenerated electrons and holes across the NW/QD interface, which increases their lifetimes 10-to-20-fold, can indeed enable reduction and oxidation reactions to compete with electron-hole recombination. Our α-V$_2$O$_5$/CdE heterostructures are thus intriguing candidates for an array of applications in redox photocatalysis.

Conclusions

We interfaced α-V$_2$O$_5$ NWs with CdE QDs to yield a range of new heterostructures. SILAR yielded the highest loadings of QDs on NWs but with limited control over their size and energetics. In contrast, LAA yielded lower loadings of QDs but afforded more precise control over the size and properties of pre-synthesized CdE QDs. The two synthetic methods are thus complementary in terms of their ability to structure interfaces between the two semiconducting components. HAXPES and XPS, together with electronic absorption spectroscopy, revealed that α-V$_2$O$_5$/CdS, α-V$_2$O$_5$/CdSe, and α-V$_2$O$_5$/CdTe heterostructures all exhibited Type-II interfacial energetics. The offsets between valence band edges, which determined the driving force for the transfer of photogenerated holes from α-V$_2$O$_5$ NWs to CdE QDs, ranged from 1.3 eV (for CdS) to 2.3 eV (for CdTe). Offsets between conduction band edges, which drove QD-to-NW electron transfer, were approximately 2 eV for all CdE QDs.

Transient absorption spectroscopy revealed that all heterostructures underwent photoinduced charge separation following pulsed excitation at wavelengths absorbed by both α-V$_2$O$_5$ NWs and CdE QDs. For SILAR-derived α-V$_2$O$_5$/CdSe and α-V$_2$O$_5$/CdTe heterostructures, charge separation was complete within 3 ps. Charges were separated more slowly within SILAR-derived α-V$_2$O$_5$/CdS heterostructures, probably owing to the decreased driving force for hole transfer from V$_2$O$_5$ to CdS. Similarly, excited-state hole transfer occurred more slowly in LAA-derived α-V$_2$O$_5$/CdSe heterostructures than in corresponding SILAR-derived heterostructures, probably due to the presence of cysteinate as a molecular linker. Lifetimes of charge-separated states ranged from approximately 1 to 5 μs and were longer for LAA-derived heterostructures than SILAR-derived heterostructures. The subtle dependence of the dynamics of charge separation and recombination on the composition and interconnectivity of heterostructures suggests an intriguing potential to control both light-harvesting properties and charge-transfer reactivity.

Whereas all of the heterostructures underwent ultrafast charge transfer to yield long-lived charge-separated states, we were eager to evaluate their performance as photocatalysts. Proof-of-concept experiments revealed that LAA-derived α-V$_2$O$_5$/CdSe heterostructures vastly outperformed isolated NWs and QDs in the reduction of aqueous protons to H$_2$.

In summary, α-V$_2$O$_5$/CdE heterostructures can be prepared with programmable compositions, interconnectivity between components, photophysical properties, and interfacial energetics. The heterostructures reported herein undergo ultrafast charge separation to yield long-lived charge-separated states. Photoinduced charge transfer can be exploited in reductive hydrogen evolution. It is expected that the heterostructures are suitable in a range of applications such as light-harvesting, excited-state charge transfer, and photocatalysis.

Additional TEM images, spectra (EDS, Raman, electronic absorption and emission, XPS, TA) and fits, TA decay traces and fits, and spectral fitting parameters for QDs, NWs, and heterostructures.

TABLE 8

Amplitude-weighted average lifetimes (⟨τ⟩) from nanosecond-timescale TA decay traces for SILAR-derived α-V$_2$O$_5$/CdS, α-V$_2$O$_5$/CdSe, and α-V$_2$O$_5$/CdTe heterostructures. These values of ⟨τ⟩ are indicative of charge-recombination timescales.

| Probe wavelength (nm) | SILAR α-V$_2$O$_5$/CdS ⟨τ⟩ (μs) | SILAR α-V$_2$O$_5$/CdSe ⟨τ⟩ (μs) | SILAR α-V$_2$O$_5$/CdTe ⟨τ⟩ (μs) |
|---|---|---|---|
| 650 | 1.9 + 0.5 | 1.3 ± 0.6 | |
| 750 | | | 2.4 ± 0.6 |

TABLE 9

Amplitude-weighted average lifetimes (⟨τ⟩) from nanosecond-timescale TA decay traces for α-V$_2$O$_5$ NWs and LAA-derived α-V$_2$O$_5$/CdS and α-V$_2$O$_5$/CdSe heterostructures. These values of ⟨τ⟩ for heterostructures are indicative of charge-recombination timescales.

| Probe wavelength (nm) | α-V$_2$O$_5$ NWs ⟨τ⟩ (μs) | LAA α-V$_2$O$_5$/CdS ⟨τ⟩ (μs) | LAA α-V$_2$O$_5$/CdSe ⟨τ⟩ (μs) |
|---|---|---|---|
| 430 (bleach) | 0.5 ± 0.3 | | |
| 550 | 1.4 ± 0.2 | | |
| 700 | | 4.6 ± 0.4 | |
| 850 | | | 5.0 ± 1.1 |

Although the present disclosure has been described with respect to one or more particular examples, it will be understood that other examples of the present disclosure may be made without departing from the scope of the present disclosure.

The following are sample embodiments describing examples of the present disclosure and are not intended to be in any way limiting:

1. A quantum-confined material (e.g., quantum dot and/or quantum-confined thin film)/vanadium oxide heterostructure (e.g., a Type II quantum dot/vanadium oxide heterostructure) comprising:
   a vanadium oxide thin film (e.g., a thin film, which may be a continuous thin film, having thickness of (e.g., a film normal dimension) of 2 nm-10 microns (e.g., 10 nm to 100 nm), including all 0.1 nm values and ranges therebetween, and/or one or more lateral dimension(s) of 10 nm to 10 mm, including all 0.1 nm values and ranges therebetween) or a vanadium oxide material, which may be a vanadium oxide nanomaterial (e.g., a nanowire).
   a plurality of quantum dots or a quantum-confined thin film disposed on at least a portion of a surface (e.g., an exterior surface) of the vanadium oxide thin film or vanadium oxide material.

The vanadium oxide material, which may be a vanadium oxide nanomaterial, or vanadium oxide thin film may be a charge transport/acceptor material.

The vanadium oxide may be V$_2$O$_5$ or M$_x$V$_2$O$_5$, wherein M is chosen from s-block cation(s), transition metal cation(s), p-block cation(s), and combinations thereof.

The vanadium oxide material or vanadium oxide thin film may comprise (or is) one or more the thermodynamically-stable, metastable, or topochemically-stabilized polymorph(s) of V$_2$O$_5$ (e.g., α-V$_2$O$_5$, β-V$_2$O$_5$, ζ-V$_2$O$_5$, γ'-V$_2$O$_5$, ε'-V$_2$O$_5$, ε'-V$_2$O$_5$·nH$_2$O, or the like, or a combination thereof) and polymorphs with altered arrangements of vanadium and/or oxygen atoms.

The vanadium oxide material may comprise (or is) V$_2$O$_5$ chemically substituted and/or doped at one or more cation site(s) (e.g., V$_{2-x}$M$_x$O$_5$, where vanadium oxide is doped at the vanadium site, M is W, Mo, Ni, Co, Mn, Nb, or the like, or a combination thereof, and 0<x<0.2 or 0<x<0.3) and/or chemically substituted and/or doped at one or more anion site(s) (e.g., V$_2$O$_{5-y}$X$_y$, where the vanadium oxide is doped at the oxygen anion site, where X is S, Se, Te, P, F, or the like, or a combination thereof).

The vanadium oxide material may comprise (or is) V$_2$O$_{5-δ}$ where δ=0-0.4, including all 0.01 values and ranges therebetween.

The vanadium oxide material or vanadium oxide thin film may comprise (or be) a composition of any one of embodiments 22-25.

The vanadium oxide materials may be crystalline (e.g., have one or more crystalline domain(s), be polycrystalline, single crystalline, or a combination thereof).

The quantum dots and/or quantum-confined thin film may be a donor of excited charges carriers (e.g., electrons, holes, and the like). The quantum dots and or quantum-confined thin film may be referred to as "light harvesters."

The quantum dots and/or quantum-confined thin film may be crystalline (e.g., have one or more crystalline domain(s), polycrystalline, single crystalline, or a combination thereof). E.g., the quantum dots and/or quantum-confined thin film have a Wurtzite crystal structure.

The quantum dots and/or quantum-confined thin film may be surface functionalized with a ligand (e.g., cysteinate-capped quantum dots, mercaptoalkanoic acid-capped quantum dots, and the like). The ligand may make the quantum dots soluble in a convenient solvent (preferably water). It may be desirable, depending on the composition and/or structure of the quantum dots, to use ligands having one or more sulfur atoms. Surface functionalized quantum dots may be used to make a quantum dot/vanadium oxide heterostructure.

In various examples, the quantum dots and/or quantum-confined thin film may have one or more absorption peak in the visible spectrum (e.g., absorb one or more wavelengths of visible light, such as, for example, one or more wavelengths from 380 to 740 nm, including all integer nm values and ranges therebetween).

In various examples, on exposure to light having visible wavelengths, the heterostructure forms charge carriers (electrons and holes) and charge separation occurs across one or more interfaces of the heterostructure (e.g., electrons in the vanadium oxide material(s) and holes in the quantum dots and/or quantum-confined thin film) such that the heterostructure can act as a photocatalyst. The electrons or holes may be used with or without the application of an external potential to bring about reduction or oxidation reactions of substrates, respectively.

2. The heterostructure of embodiment 1, wherein the vanadium oxide nanomaterial is chosen from nanoparticles, nanowires, nanorods, nanospheres, nanocubes, nanostars, nanosheets, and combinations thereof.

3. The heterostructure of embodiment 1 or embodiment 2, wherein the vanadium oxide material, in the case of non-thin film materials (e.g., nanomaterials), has a longest dimension or at least one dimension of 10 nm to 100 microns (e.g., 150 nm to 50 μm), including all 0.1 values and ranges therebetween.

4. The heterostructure of any one of the preceding embodiments, wherein metal cations are intercalated into the vanadium oxide (e.g., the material has the formula $M_xV_2O_5$, where M is a metal cation and x is 0.0001 to 3 or 0.0000001 to 3 (e.g., 0.0001 to 0.67 or 0.0000001 to 0.67), including all 0.0001 values or 0.00000001, respectively, and ranges therebetween.

The metal-intercalated $M_xV_2O_5$ may be a metastable structure.

5. The heterostructure of embodiment 4, wherein one or more metal cation(s) (e.g., chosen from transition metal cations, such as, for example, copper cations, nickel cations, cobalt cations, zinc cations, or p-block cations, such as for example, tin cations, mercury cations, thallium cations, gallium cations, indium cations, bismuth(III), and the like, and combinations thereof) are intercalated into the vanadium oxide.

The intercalated metal cations may be located in various coordination environments (which may depend on the size of the ion). In various examples, at least a portion of or all of the intercalated metal cations are located within the tunnels of the $V_2O_5$ structure.

The intercalated metal cations may be located within crystallographic sites forming ordered arrays through the structure. In various examples, the metal cations are not randomly alloyed in place of vanadium, rather the intercalated metal cations are positioned at fixed sites within the lattice and the unit cell description of these intercalated compounds include these cations.

The metal cations(s) may bear a stereoactive lone pair of electrons.

The cations may be one or more oxidation state (e.g., stable oxidation state) of the metal from which the metal cation is formed.

In an example, the intercalated cation(s) are not lead cation(s) or copper cation(s).

In various examples, the vanadium oxide with one or more intercalated metal cations are not alloys.

6. The heterostructure of any one of the preceding embodiments, wherein the quantum dots are chosen from cadmium chalcogenide quantum dots (e.g., CdE, wherein E is S, Se, Te, or a combination thereof, such as, for example, CdS, CdSe, CdTe, $CdS_xSe_{1-x}$, $CdS_xTe_{1-x}$, $CdSe_xTe_{1-x}$, $CdS_xSe_yTe_{1-x-y}$ where 0<x<1 and x+y<1), zinc chalcogenide quantum dots (e.g., ZnE, wherein E is S, Se, Te, or a combination thereof, such as, for example, ZnS, ZnSe, ZnTe, $ZnS_xSe_{1-x}$, $ZnS_xTe_{1-x}$, $ZnSe_xTe_{1-x}$, $ZnS_xSe_yTe_{1-x-y}$ where 0<x<1 and x+y<1), cadmium/zinc chalcogenide quantum dots (e.g., $Cd_xZn_{1-x}E$, wherein E is S, Se, Te and where 0<x<1, or a combination thereof, such as, for example, $Cd_xZn_{1-x}S$, $Cd_xZn_{1-x}Se$, $Cd_xZn_{1-x}Te$, $Cd_xZn_{1-x}S_ySe_{1-y}$, $Cd_xZn_{1-x}S_yTe_{1-y}$, $Cd_xZn_{1-x}Se_yTe_{1-y}$, $Cd_xZn_{1-x}S_ySe_zTe_{1-y-z}$ where 0<x<1, 0<y<1, and y+z<1), and combinations thereof.

7. The heterostructure of any one of the preceding embodiments, wherein the quantum-confined thin film comprises a composition chosen from cadmium chalcogenides (e.g., CdE, wherein E is S, Se, Te, or a combination thereof, such as, for example, CdS, CdSe, CdTe, $CdS_xSe_{1-x}$, $CdS_xTe_{1-x}$, $CdSe_xTe_{1-x}$, $CdS_xSe_yTe_{1-x-y}$ where 0<x<1 and x+y<1), zinc chalcogenides (e.g., ZnE, wherein E is S, Se, Te, or a combination thereof, such as, for example, ZnS, ZnSe, ZnTe, $ZnS_xSe_{1-x}$, $ZnS_xTe_{1-x}$, $ZnSe_xTe_{1-x}$, $ZnS_xSe_yTe_{1-x-y}$ where 0<x<1 and x+y<1), cadmium/zinc chalcogenides (e.g., $Cd_xZn_{1-x}E$, wherein E is S, Se, Te and where 0<x<1, or a combination thereof, such as, for example, $Cd_xZn_{1-x}S$, $Cd_xZn_{1-x}Se$, $Cd_xZn_{1-x}Te$, $Cd_xZn_{1-x}S_ySe_{1-y}$, $Cd_xZn_{1-x}S_yTe_{1-y}$, $Cd_xZn_{1-x}Se_yTe_{1-y}$, $Cd_xZn_{1-x}S_ySe_zTe_{1-y-z}$ where 0<x<1, 0<y<1, and y+z<1), and combinations thereof.

8. The heterostructure of any one of the preceding embodiments, wherein the quantum dots have a size (e.g., a longest dimension, which may be, in the case of a spherical quantum dot, a diameter) of 1 to 10 nm, including all 0.1 nm values and ranges therebetween.

9. The heterostructure of any one of the preceding embodiments, wherein the quantum dots are spherical, substantially spherical (e.g., wherein the diameter along any axis of the substantially spherical quantum dot (e.g., sphere approximating the substantially spherical quantum dot) has a length that is within 5%, 4%, 3%, 2%, 1%, or 0.1% of any other diameter of any other axis of the quantum dot), or a combination thereof or nanorods (e.g., nanorods with, independently, an aspect ratio of 1:2 to 10:1 in terms of a longest dimension and/or shortest dimension.

10. The heterostructure of any one of the preceding embodiments, wherein the quantum-confined material is present at a 0.01-10 cadmium:vanadium molar ratio (e.g., a 0.1-2 cadmium:vanadium molar ratio).

11. The heterostructure of any one of the preceding embodiments, wherein the quantum dots are disposed on at least a portion of the surface of the vanadium oxide thin film or vanadium oxide material by:

electrostatic interactions; and/or one or more covalent or coordinate covalent bond(s) (e.g., via one or more linker(s) such as, for example, cysteine, cysteinate(−), cysteinate(2−), mercaptoalkanoic acids, mercaptoalkanoates, mercaptobenzoic acids, mercaptobenzoates, and the like).

The quantum dots may be disposed on the at least a portion of the surface of the vanadium oxide thin film or vanadium oxide material by:

precipitation, linker-assisted assembly (e.g., LAA), or successive ionic layer adsorption and reaction (e.g., SILAR), epitaxial growth, sputtering, or pulsed lased deposition.

In the case of quantum dots formed using SILAR, the quantum dots chemically interfaced with the vanadium oxide surface (e.g., chemically bonded to the surface via one or more covalent bonds) with the surface (bonding to the surface). For example, the quantum dots chemically interfaced with the vanadium oxide surface by one or more V—O—Cd—X linkages.

Suitable examples of SILAR and LAA methods are known in the art.

The quantum dots may be pre-synthesized or grown on the vanadium oxide vanadium oxide thin film or vanadium oxide material (e.g., nanowire) in situ.

12. The heterostructure of any one of the preceding embodiments, wherein the quantum dots are present as a multilayer structure grown or deposited directly on the surfaces of the vanadium oxide thin film or vanadium oxide material (e.g., nanowire). At least a portion of or all the quantum dots may have an epitaxial relationship (e.g., with the vanadium oxide), a strained lattice match (e.g., with the vanadium oxide), or be separated by an amorphous layer.

13. A composition comprising a plurality of quantum-confined material (e.g., quantum dot and/or quantum-confined thin film)/vanadium oxide heterostructures of the present disclosure (e.g., of embodiments 1-12).

All of the quantum-confined material (e.g., quantum dot and/or quantum-confined thin film)/vanadium oxide heterostructures may have the same nominal composition and structural feature(s). A composition may comprise one or more quantum-confined material (e.g., quantum dot and/or quantum-confined thin film)/vanadium oxide heterostructure(s) where at least one of nominal composition and/or one or more structural feature of the one or more quantum-confined material (e.g., quantum dot and/or quantum-confined thin film)/vanadium oxide heterostructure(s) is different than that of the other quantum-confined material (e.g., quantum dot and/or quantum-confined thin film)/vanadium oxide heterostructure(s) present in the composition.

14. The composition of embodiment 13, wherein the composition is in the form of a film.

A film may be a continuous or discontinuous film.

A film may have a thickness (e.g., a film normal dimension) of 10 nm-100 micron (e.g., 10 nm to 10 microns), including all 0.1 nm values and ranges therebetween.

A film may be formed by various methods known in the art. Non-limiting examples of film forming methods include spray-coating, spin-coating, wire-bar coating, sequential epitaxial growth, pulsed laser deposition, atomic layer deposition or the like. A film may be formed using a dispersion.

15. The composition of embodiment 13, wherein the composition is in the form of an aqueous dispersion.

16. The composition of embodiment 15, wherein the aqueous dispersion further comprises a sacrificial electron donor (e.g., lactic acid, ascorbic acid, and the like, and combinations thereof) and/or a cocatalyst, which may be a reduction co-catalyst.

17. A device comprising one or more quantum-confined material (e.g., quantum dot and/or quantum-confined thin film)/vanadium oxide heterostructure(s) of the present disclosure (e.g., of embodiments 1-12, a vanadium oxide material of any one of embodiments 22-25 or a composition made by a method of anyone of embodiments 26-30) and/or one or more composition(s) of the present disclosure (e.g., of embodiments 13-16).

18. The device of embodiment 17, wherein the device is an electrochemical cell, fuel cell, photoelectrochemical cell, photoelectrosynthesis cell, photovoltaic cell, electrolyzer, electrochemical reactor, catalytic converter, and the like.

19. The device of embodiment 17, wherein the device, which may be an electrochemical cell, comprises an electrode having an exterior surface on which the one or more quantum-confined material (e.g., quantum dot and/or quantum-confined thin film)/vanadium oxide heterostructures and/or the one or more compositions are disposed (e.g., on which the quantum-confined material (e.g., quantum dot and/or quantum-confined thin film)/vanadium oxide heterostructure(s) is/are at least partially coated).

20. A method of using one or more quantum-confined material (e.g., quantum dot and/or quantum-confined thin film)/vanadium oxide heterostructure(s) of the present disclosure (e.g., of embodiments 1-12, a vanadium oxide material of any one of embodiments 22-25 or a composition made by a method of anyone of embodiments 26-30) and/or one or more composition(s) of the present disclosure (e.g., of embodiment 13-16), wherein the method is:

a photocatalysis method (e.g., a method comprising reducing protons, a method of water oxidation, a method of water electrolysis, a method of reducing organic compounds, a method of oxidizing organic compounds, a method for water purification, a method for water desalination, and the like); and a photoelectrochemical method (e.g., a method comprising generating electrical power); and the like.

21. A method of producing hydrogen (and, optionally oxygen) comprising:

contacting one or more quantum-confined material (e.g., quantum dot and/or quantum-confined thin film)/vanadium oxide heterostructure(s) of the present disclosure (e.g., quantum-confined material (e.g., quantum dot and/or quantum-confined thin film)/vanadium oxide heterostructure(s) of any one of embodiments 1-12) and a catalyst in the presence of a source of electrons (e.g., a sacrificial electron donor), either one or both of which may be in an aqueous solution); and exposing the mixture from to electromagnetic radiation, such that hydrogen is produced.

Hydrogen may be produced continuously.

22. A composition (e.g., a $M_xV_2O_5$ material) comprising (or consisting of):
$V_2O_5$; and
a plurality of intercalated metal cations chosen from nickel cations, cobalt cations, zinc cations, tin cations, gallium cations, indium cations, lead cations, or a combination thereof (e.g., a combination of two or more or three or more of the metal cations).

The intercalated ions may be located in various coordination environments (which may depend on the size of the ion) in the $V_2O_5$ structure. In various examples, at least a portion of or all of the intercalated ions are located within the tunnels of the $V_2O_5$ structure.

The intercalated cations may be located within crystallographic sites forming ordered arrays through the structure. In various examples, the metal cations are not randomly alloyed in place of vanadium, rather the intercalated metal cations are positioned at fixed sites within the lattice and the unit cell description of these intercalated compounds include these ions.

The composition may be quaternary composition.

In various examples, the composition comprises intercalated Sn cation and Ni cations.

In various examples, the composition is a mixed quaternary bronze with two different intercalated cations.

The cations may be that of one or more oxidation state(s) (e.g., one or more stable oxidation state(s)) of the metal from which the metal cation is formed.

The $V_2O_5$ may be $\alpha$-$V_2O_5$, $\beta$-$V_2O_5$, $\zeta$-$V_2O_5$, $\gamma'$-$V_2O_5$, $\varepsilon'$-$V_2O_5$, $\varepsilon'$-$V_2O_5$·$nH_2O$, or the like, or a combination thereof. The $V_2O_5$ may have altered arrangements of vanadium and/or oxygen atoms.

The vanadium oxide may be chemically substituted and/or doped at one or more cation site(s) (e.g., $V_{2-x}M_xO_5$, where vanadium oxide is doped at the vanadium site, M is W, Mo, Ni, Co, Mn, Nb, or the like, or a combination thereof, and $0<x<0.2$) and/or chemically substituted and/or doped at one or more anion site(s) (e.g., $V_2O_{5-y}X_y$, where the vanadium oxide is doped at the oxygen anion site, where X is S, Se, Te, P, F, or the like, or a combination thereof).

The composition may be metastable.

The composition may be crystalline (e.g., have one or more crystalline domain(s), be polycrystalline, single crystalline, or a combination thereof).

The composition may be a nanomaterial. The nanomaterial may have various morphologies (e.g., nanoparticles, nanowires, nanorods, nanospheres, nanocubes, nanostars, nanosheets, or the like).

The composition may be material (e.g., a nanomaterial (e.g., a nanowire)) having a size (e.g., a longest dimension or one or more or all dimension(s), which may be a diameter depending on the morphology of the material, of 10 nm to 100 microns, including all 0.1 nm values and ranges therebetween.

The composition may a thin film, which may be a continuous or discontinuous film.

The composition may be in bulk form (e.g., a monolith or plurality of monoliths). In an example, the composition is in the form of crystals (e.g., millimeter-sized crystals).

23. The composition of embodiment 22, wherein the composition has the following nominal composition:
$Ni_xV_2O_5$, $Pb_xV_2O_5$, $Co_xV_2O_5$, $Zn_xV_2O_5$, $Sn_xV_2O_5$, $Hg_xV_2O_5$, $Tl_xV_2O_5$, $Ga_xV_2O_5$ or $In_xV_2O_5$, where x is 0.0000001 to 0.67, including all 0.00000001 values and ranges therebetween.

In the case of $Pb_xV_2O_5$, x may not be 0.27-0.33.

24. The composition of embodiment 22 or embodiment 23, wherein the composition has the following nominal composition:
$Ni_{0.331}V_2O_5$ or $Sn_{0.23}V_2O_5$.

25. The composition of any one of embodiments 22-24, wherein the composition has the following structure.
i) lattice parameters, and atom positions (e.g., for $Sn_{0.225}V_2O_5$).

a = 15.339(2) Å; b = 3.6217(3) Å; c = 10.0781(8) Å;
β = 109.829(7)°; V = 526.67(6) Å³;
$\chi^2$ = 6.147; Rw = 6.52%; wRp = 8.96%

| Atom | x | y | z | Occupancy | Uiso |
|---|---|---|---|---|---|
| Sn(1) | 1.0095(12) | 0.00 | 0.412(2) | 0.225(6) | 0.006 |
| V(1) | 0.1189(8) | 0.00 | 0.1209(11) | 1.0 | 0.008 |
| V(2) | 0.3511(9) | 0.00 | 0.1032(14) | 1.0 | 0.008 |
| V(3) | 0.2965(8) | 0.00 | 0.4175(13) | 1.0 | 0.008 |
| O(1) | 0.00(0) | 0.00(0) | 0.00(0) | 1.0 | 0.015 |
| O(2) | 0.0958(25) | 0.00 | 0.285(4) | 1.0 | 0.015 |
| O(3) | 0.1529(24) | 0.50 | 0.095(4) | 1.0 | 0.015 |
| O(4) | 0.2533(24) | 0.00 | 0.214(4) | 1.0 | 0.015 |
| O(5) | 0.4482(23) | 0.00 | 0.254(4) | 1.0 | 0.015 |
| O(6) | 0.3258(23) | 0.50 | 0.0228(33) | 1.0 | 0.015 |
| O(7) | 0.4129(27) | 0.00 | 0.518(4) | 1.0 | 0.015 |
| O(8) | 0.2748 | 0.50 | 0.3861 | 1.0 | 0.015 | and/or
bond angles and lengths for $MO_x$ polyhedra (e.g., for $Sn_{0.225}V_2O_5$).

| V—O Polyhedra | V—O | Distance (Å) | O—V—O | Angle (°) |
|---|---|---|---|---|
| V(1)O$_6$ Octahedra | V(1)—O(1) | 1.818(10) | O(1)—V(1)—O(3) | 99.5(11) |
| | | | O(1)—V(1)—O(4) | 167.9(14) |
| | V(1)—O(2) | 1.81(4) | O(1)—V(1)—O(6) | 95.4(10) |
| | | | O(2)—V(1)—O(3) | 105.8(11) |
| | V(1)—O(3) | 1.927(13) | O(2)—V(1)—O(3) | 105.8(11) |
| | | | O(2)—V(1)—O(4) | 93.5(15) |
| | V(1)—O(3) | 1.927(13) | O(2)—V(1)—O(6) | 166.0(16) |
| | | | O(3)—V(1)—O(3) | 140.0(22) |
| | V(1)—O(4) | 1.954(35) | O(3)—V(1)—O(4) | 77.1(12) |
| | | | O(3)—V(1)—O(6) | 71.7(12) |
| | V(1)—O(6) | 1.91(4) | O(3)—V(1)—O(4) | 77.1(11) |
| | | | O(3)—V(1)—O(3) | 71.7(11) |
| | | | O(4)—V(1)—O(6) | 72.5(15) |
| V(2)O$_6$ Octahedra | V(2)—O(3) | 1.98(4) | O(3)—V(2)—O(4) | 137.4(13) |
| | | | O(3)—V(2)—O(5) | 127.5(21) |
| | V(2)—O(4) | 2.15(4) | O(3)—V(2)—O(6) | 69.5(10) |
| | | | O(3)—V(2)—O(6) | 69.5(10) |
| | V(2)—O(5) | 1.730(28) | O(4)—V(2)—O(5) | 95.0(18) |
| | | | O(4)—V(2)—O(6) | 98.0(14) |

-continued

| V—O Polyhedra | V—O | Distance (Å) | O—V—O | Angle (°) |
|---|---|---|---|---|
| | V(2)—O(6) | 1.968(13) | O(4)—V(2)—O(6) | 98.0(14) |
| | | | O(5)—V(2)—O(6) | 110.6(10) |
| | V(2)—O(6) | 1.968(13) | O(5)—V(2)—O(6) | 110.6(10) |
| | V(2)—O(6) | 2.576(26) | O(5)—V(2)—O(6) | 133.9(17) |
| V(3)O$_5$ | V(3)—O(4) | 1.926(35) | O(4)—V(3)—O(7) | 122.5(16) |
| Square | V(3)—O(7) | 1.728(30) | O(4)—V(3)—O(7) | 80.8(4) |
| Pyramid | V(3)—O(8) | 1.8490(24) | O(4)—V(3)—O(8) | 80.8(4) |
| | V(3)—O(8) | 1.8490(24) | O(7)—V(3)—O(8) | 100.98(34) |
| | V(3)—O(8) | 2.565(12) | O(7)—V(3)—O(8) | 100.98(34) |
| | | | O(8)—V(3)—O(8) | 156.7(7) |
| Sn(1)O$_7$ | Sn(1)—O(2) | 2.13(5) | O(2)—Sn(1)—O(5) | 77.4(12) |
| Distorted | | | O(2)—Sn(1)—O(5) | 77.4(12) |
| pentagonal | Sn(1)—O(5) | 2.385(24) | O(2)—Sn(1)—O(7) | 79.0(12) |
| bipyramid | | | O(2)—Sn(1)—O(7) | 79.0(12) |
| | Sn(1)—O(5) | 2.385(24) | O(5)—Sn(1)—O(5) | 98.8(13) |
| | Sn(1)—O(7) | 2.771(31) | O(5)—Sn(1)—O(7) | 68.2(9) |
| | Sn(1)—O(7) | 2.771(31) | O(5)—Sn(1)—O(7) | 155.1(17) |
| | Sn(1)—O(7) | 2.150(19) | O(5)—Sn(1)—O(7) | 68.2(9) |
| | Sn(1)—O(7) | 2.150(19) | O(7)—Sn(1)—O(7) | 114.7(16) | or ii) lattice parameters, and atom positions (e.g., for β-Ni$_{0.333}$V$_2$O$_5$)

| a = 15.3711(7) Å, b = 3.6100(1) Å, c = 10.0726(5) Å, β = 109.968(4)°, V = 525.34(3) Å$^3$ $\chi^2$ = 6.379, Rw = 4.85%, wRp = 6.81% | | | | |
|---|---|---|---|---|
| Atom | x | y | z | Occupancy | Uiso |
| Ni(1) | 1.0042 | 0.000(0) | 0.3926(11) | 0.507(5) | 0.008 |
| V(1) | 0.1240(5) | 0.000(0) | 0.1138(7) | 1.0 | 0.008 |
| V(2) | 0.3392(4) | 0.000(0) | 0.1067(6) | 1.0 | 0.008 |
| V(3) | 0.2881(5) | 0.000(0) | 0.4234(6) | 1.0 | 0.008 |
| O(1) | 0.0000(0) | 0.000(0) | 0.0000(0) | 1.0 | 0.0126 |
| O(2) | 0.1083(15) | 0.000(0) | 0.2653(19) | 1.0 | 0.0126 |
| O(3) | 0.1321(16) | 0.500(0) | 0.0555(19) | 1.0 | 0.0126 |

-continued

| a = 15.3711(7) Å, b = 3.6100(1) Å, c = 10.0726(5) Å, β = 109.968(4)°, V = 525.34(3) Å$^3$ $\chi^2$ = 6.379, Rw = 4.85%, wRp = 6.81% | | | | |
|---|---|---|---|---|
| Atom | x | y | z | Occupancy | Uiso |
| O(4) | 0.2860(15) | 0.000(0) | 0.2501(21) | 1.0 | 0.0126 |
| O(5) | 0.4400(13) | 0.000(0) | 0.2324(21) | 1.0 | 0.0126 |
| O(6) | 0.3129(14) | 0.500(0) | 0.1005(21) | 1.0 | 0.0126 |
| O(7) | 0.4083(14) | 0.000(0) | 0.4670(18) | 1.0 | 0.0126 |
| O(8) | 0.2496(19) | 0.500(0) | 0.4100(0) | 1.0 | 0.0126 | and/or bond angles and lengths for MO$_x$ (M=V, Ni) (e.g., for β-Ni$_{0.331}$V$_2$O$_5$)

| V—O Polyhedra | V—O | Distance (Å) | O—V—O | Angle (°) |
|---|---|---|---|---|
| V(1)O$_6$ Octahedra | V(1)—O(1) | 1.859(7) | O(1)—V(1)—O(2) | 97.4(9) |
| | V(1)—O(2) | 1.624(18) | O(1)—V(1)—O(3) | 88.3(7) |
| | V(1)—O(3) | 1.915(7) | | 88.3(7) |
| | V(1)—O(3) | 1.915(7) | O(2)—V(1)—O(3) | 109.5(6) |
| | V(1)—O(4) | 2.267(18) | | 109.5(6) |
| | V(1)—O(6) | 2.65127(12) | O(3)—V(1)—O(3) | 140.9(12) |
| V(2)O$_6$ Octahedra | V(2)—O(3) | 1.832(20) | O(3)—V(2)—O(4) | 169.0(11) |
| | | | O(3)—V(2)—O(5) | 103.7(11) |
| | V(2)—O(4) | 1.888(20) | O(3)—V(2)—O(6) | 95.0(8) |
| | | | | 95.0(8) |
| | V(2)—O(5) | 1.632(18) | O(4)—V(2)—O(5) | 87.2(9) |
| | | | O(4)—V(2)—O(6) | 83.0(7) |
| | V(2)—O(6) | 1.846(5) | | 83.0(7) |
| | | | O(5)—V(2)—O(6) | 99.5(7) |
| | V(2)—O(6) | 1.846(5) | | 99.5(7) |
| | V(2)—O(6) | 2.548(17) | | 155.8(14) |
| V(3)O$_5$ | V(3)—O(4) | 2.872(11) | O(4)—V(3)—O(7) | 84.7(9) |
| Square pyramid | V(3)—O(7) | 2.872(11) | O(4)—V(3)—O(8) | 91.75(27) |
| | | | | 91.75(27) |
| | V(3)—O(8) | 1.8903(20) | | 162.8(8) |
| | V(3)—O(8) | 1.8903(20) | O(7)—V(3)—O(8) | 107.27(20) |
| | | | | 107.27(20) |
| | V(3)—O(8) | 1.953(7) | | 112.5(7) |
| | | | O(8)—V(3)—O(8) | 145.4(4) |
| | | | | 83.31(21) |
| | | | | 83.31(21) |

-continued

| V—O Polyhedra | V—O | Distance (Å) | O—V—O | Angle (°) |
|---|---|---|---|---|
| Ni(1)O$_7$ | Ni(1)—O(2) | 2.368(24) | O(2)—Ni(1)—O(7) | 135.33(34) |
| Pentagonal | Ni(1)—O(5) | 2.397(14) | | 88.5(6) |
| bipyramid | Ni(1)—O(5) | 2.397(14) | O(5)—Ni(1)—O(5) | 97.7(8) |
| | Ni(1)—O(7) | 2.402(13) | O(5)—Ni(1)—O(7) | 61.8(5) |
| | | | | 125.0(6) |
| | | | | 168.9(9) |
| | Ni(1)—O(7) | 2.402(13) | | 81.3(4) |
| | Ni(1)—O(7) | 2.597(15) | O(2)—Ni(1)—O(5) | 80.4(7) |
| | | | O(7)—Ni(1)—O(7) | 97.5(7) |
| | Ni(1)—O(7) | 2.597(15) | | 127.7(6) |
| | | | | 64.3(8) | or
iii) lattice parameters (e.g., β-M$_x$V$_2$O$_5$ materials, wherein M is Ni, Co, Sn, and Pb).

| Sample | x | a (Å) | b (Å) | c (Å) | β (Å) | V (Å) | Radius (Å)$^{18}$ |
|---|---|---|---|---|---|---|---|
| ζ-V$_2$O$_5$ | NA | 15.25253(3) | 3.602132(4) | 10.104167(13) | 110.088(0) | 521.369(1) | N/A |
| Ni$_x$V$_2$O$_5$ | 0.331 | 15.3711(7) | 3.6101(1) | 10.0726(5) | 109.968(4) | 525.335(27) | 0.63 |
| Co$_x$V$_2$O$_5$ | 0.270 | 15.384 | 3.6185 | 10.0893 | 110.130 | 527.36 | 0.67 |
| Sn$_x$V$_2$O$_5$ | 0.225 | 15.339(2) | 3.6217(3) | 10.0781(8) | 109.829(7) | 526.67(6) | 1.22 |
| Pb$_x$V$_2$O$_5$ | 0.220 | 15.470(2) | 3.6153(4) | 10.083(1) | 109.396(10) | 531.947 | 1.23 |

26. A method of making a composition (e.g., V$_2$O$_5$ comprising a plurality of intercalated metal cations, such as, for example, a composition of any one of embodiments 22-25) comprising:

forming a reaction mixture (e.g., a slurry in a solvent, such as, for example, hexanes and the like, which may be anhydrous (e.g., dry hexanes)) comprising a vanadium oxide material (e.g., a ζ-V$_2$O$_5$ material) and a metal oxalate species (e.g., MC$_2$O$_4$, where M is Sn, Pb, Ni, Co, Tl, Zn, or a combination thereof);

drying the reaction mixture;

heating the reaction mixture for a first heating (e.g., heating the reaction mixture to a temperature of 150-400° C. (e.g., 170-390° C.)) in an inert atmosphere (e.g., under a vacuum and/or an inert gas, such as, for example, Ar or N$_2$ flowing at a rate of 100 mL/min), for a selected period of time (e.g., 4-24 hours, such as, for example, 12 hours);

optionally, heating the reaction mixture for one or more additional heating(s) (e.g., a second heating) (e.g., heating the reaction mixture to a temperature of 150-400° C. (e.g., 170-390° C.)) in an inert atmosphere (e.g., under a vacuum and/or an inert gas, such as, for example, Ar or N$_2$ flowing at a rate of 100 mL/min), for a selected period of time (e.g., 4-24 hours, such as, for example, 12 hours), one or more or all of which may be the same conditions as the first heating;

wherein the composition is formed; and optionally, isolating the composition (e.g., β-metal vanadium oxide).

In an example, the vanadium oxide material does not comprise 0.33 lead.

27. A method of embodiment 26, wherein the β-metal vanadium oxide is β-Sn$_{0.23}$V$_2$O$_5$ or Ni$_{0.331}$V$_2$O$_5$.

28. A method of embodiments 26 or 27, wherein the inert atmosphere is a combination of vacuum and Ar.

29. A method of any one of embodiments 26-28, wherein forming the reaction mixture comprises forming a particulate vanadium oxide material and metal oxalate material, which may be a first particulate vanadium oxide material and metal oxalate material, (e.g., in the slurry) (e.g., by grinding or the like).

The particulate material may be formed by applying a mechanical force (e.g., manual grinding, ball milling, and the like).

30. A method of any one of embodiments 26-29, wherein, after the first heating and, optionally, any one or subsequent heating(s), a particulate vanadium oxide material and metal oxalate material (e.g., which may be a second particulate vanadium oxide material and metal oxalate material) is formed (e.g., by grinding or the like).

The particulate material may be formed by applying a mechanical force (e.g., manual grinding, ball milling, and the like).

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated within the scope of the invention without limitation thereto.

REFERENCES LIST 1

(1) Fukuzumi, S.; Ohkubo, K.; Suenobu, T. Long-Lived Charge Separation and Applications in Artificial Photosynthesis. *Acc. Chem. Res.* 2014, 47 (5), 1455-1464.

(2) Nocera, D. G. The Artificial Leaf. *Acc. Chem. Res.* 2012, 45 (5), 767-776.

(3) Su, J.; Vayssieres, L. A Place in the Sun for Artificial Photosynthesis? *ACS Energy Lett.* 2016, 1 (1), 121-135.

(4) Takanabe, K. Photocatalytic Water Splitting: Quantitative Approaches toward Photocatalyst by Design. *ACS Catal.* 2017, 7 (11), 8006-8022.

(5) Sun, J.; Zhong, D. K.; Gamelin, D. R. Composite Photoanodes for Photoelectrochemical Solar Water Splitting. *Energy Environ. Sci.* 2010, 3 (9), 1252-1261.

(6) Nanayakkara, S. U.; van de Lagemaat, J.; Luther, J. M. Scanning Probe Characterization of Heterostructured Colloidal Nanomaterials. *Chem. Rev.* 2015, 115 (16), 8157-8181.

(7) Selinsky, R. S.; Ding, Q.; Faber, M. S.; Wright, J. C.; Jin, S. Quantum Dot Nanoscale Heterostructures for Solar Energy Conversion. *Chem. Soc. Rev.* 2013, 42 (7), 2963-2985.

(8) Bonaccorso, F.; Colombo, L.; Yu, G.; Stoller, M.; Tozzini, V.; Ferrari, A. C.; Ruoff, R. S.; Pellegrini, V. Graphene, Related Two-Dimensional Crystals, and Hybrid Systems for Energy Conversion and Storage. *Science* 2015, 347 (6217), 1246501:1-9.

(9) Semonin, O. E.; Luther, J. M.; Beard, M. C. Quantum Dots for Next-Generation Photovoltaics. *Mater. Today* 2012, 15 (11), 508-515.

(10) Pelcher, K. E.; Milleville, C. C.; Wangoh, L.; Chauhan, S.; Crawley, M. R.; Marley, P. M.; Piper, L. F. J.; Watson, D. F.; Banerjee, S. Integrating $\beta$-$Pb_{0.33}V_2O_5$ Nanowires with Cdse Quantum Dots: Toward Nanoscale Heterostructures with Tunable Interfacial Energetic Offsets for Charge Transfer. *Chem. Mater.* 2015, 27 (7), 2468-2479.

(11) Milleville, C. C.; Pelcher, K. E.; Sfeir, M. Y.; Banerjee, S.; Watson, D. F. Directional Charge Transfer Mediated by Mid-Gap States: A Transient Absorption Spectroscopy Study of CdSe Quantum Dot/$\beta$-$Pb_{0.33}V_2O_5$ Heterostructures. *J. Phys. Chem. C* 2016, 120 (9), 5221-5232.

(12) Pelcher, K. E.; Milleville, C. C.; Wangoh, L.; Cho, J.; Sheng, A.; Chauhan, S.; Sfeir, M. Y.; Piper, L. F. J.; Watson, D. F.; Banerjee, S. Programming Interfacial Energetic Offsets and Charge Transfer in $\beta$-$Pb_{0.33}V_2O_5$/Quantum-Dot Heterostructures: Tuning Valence-Band Edges to Overlap with Midgap States. *J. Phys. Chem. C* 2016, 120 (51), 28992-29001.

(13) Fujishima, A.; Honda, K. Electrochemical Photolysis of Water at a Semiconductor Electrode. *Nature* 1972, 238 (5358), 37-38.

(14) Kanan, M. W.; Surendranath, Y.; Nocera, D. G. Cobalt-Phosphate Oxygen-Evolving Compound. *Chem. Soc. Rev.* 2009, 38 (1), 109-114.

(15) Kanan, M.; Yano, J.; Surendranath, Y.; Dined, M.; Yachandra, V. K.; Nocera, D. G. Structure and Valency of a Cobalt-phosphate Water Oxidation Catalyst Determined by in Situ X-Ray Spectroscopy. *J. Am. Chem. Soc.* 2010, 132 (25), 13692-13701.

(16) Kamat, P. V. Quantum Dot Solar Cells. The next Big Thing in Photovoltaics. *J. Phys. Chem. Lett.* 2013, 4 (6), 908-918.

(17) Bang, J. H.; Kamat, P. V. Quantum Dot Sensitized Solar Cells. A Tale of Two Semiconductor Nanocrystals: CdSe and CdTe. *ACS Nano* 2009, 3 (6), 1467-1476.

(18) Kim, W. D.; Baum, F.; Kim, D.; Lee, K.; Moon, J. H.; Lee, D. C. Photocorrosion-Assisted Transformation of Metal Selenide Nanocrystals into Crystalline Selenium Nanowires. *Cryst. Growth Des.* 2014, 14 (3), 1258-1263.

(19) Lee, Y.-L.; Lo, Y.-S. Highly Efficient Quantum-Dot-Sensitized Solar Cell Based on Co-Sensitization of CdS/CdSe. *Adv. Funct. Mater.* 2009, 19 (4), 604-609.

(20) Sheng, P.; Li, W.; Cai, J.; Wang, X.; Tong, X.; Cai, Q.; Grimes, C. A. A Novel Method for the Preparation of a Photocorrosion Stable Core/Shell CdTe/CdS Quantum Dot $TiO_2$ Nanotube Array Photoelectrode Demonstrating an AM 1.5 G Photoconversion Efficiency of 6.12%. *J. Mater. Chem. A* 2013, 1 (26), 7806-7815.

(21) Park, J. P.; Heo, J. Hy.; Im, S. H.; Kim, S.-W. Exceptional Stability of Mg Implemented PbS Quantum Dot Solar Cells by Galvanic Corrosion Protection. *J. Mater. Chem. A* 2015, 3 (16), 8433-8437.

(22) Marley, P. M.; Stabile, A. A.; Kwan, C. P.; Singh, S.; Zhang, P.; Sambandamurthy, G.; Banerjee, S. Charge Disproportionation and Voltage-Induced Metal-Insulator Transitions Evidenced in $\beta$-$Pb_xV_2O_5$ Nanowires. *Adv. Funct. Mater.* 2013, 23 (2), 153-160.

(23) Wangoh, L.; Marley, P. M.; Quackenbush, N. F.; Sallis, S.; Fischer, D. A.; Woicik, J. C.; Banerjee, S.; Piper, L. F. J. Electron Lone Pair Distortion Facilitated Metal-Insulator Transition in $\beta$-$Pb_{0.33}V_2O_5$ Nanowires. *Appl. Phys. Lett.* 2014, 104 (18), 182108.

(24) Marley, P. M.; Horrocks, G. A.; Pelcher, K. E.; Banerjee, S. Transformers: The Changing Phases of Low-Dimensional Vanadium Oxide Bronzes. *Chem. Commun.* 2015, 51 (25), 5181-5198.

(25) Zavalij, P. Y.; Whittingham, M. S. Structural Chemistry of Vanadium Oxides with Open Frameworks. *Acta Crystallogr. B* 1999, 55 (5), 627-663.

(26) De Jesus, L. R.; Andrews, J. L.; Parija, A.; Banerjee, S. Defining Diffusion Pathways in Intercalation Cathode Materials: Some Lessons from $V_2O_5$ on Directing Cation Traffic. *ACS Energy Lett.* 2018, 3 (4), 915-931.

(27) Andrews, J. L.; Mukherjee, A.; Yoo, H. D.; Parija, A.; Marley, P. M.; Fakra, S.; Prendergast, D.; Cabana, J.; Klie, R. F.; Banerjee, S. Reversible Mg-Ion Insertion in a Metastable One-Dimensional Polymorph of $V_2O_5$. *Chem* 2018, 4 (3), 564-585.

(28) Ip, A. H.; Thon, S. M.; Hoogland, S.; Voznyy, O.; Zhitomirsky, D.; Debnath, R.; Levina, L.; Rollny, L. R.; Carey, G. H.; Fischer, A.; Kemp, K. W.; Kramer, I. J.; Ning, Z.; Labelle, A. J.; Chou, K. W.; Amassian, A.; Sargent, E. H. Hybrid Passivated Colloidal Quantum Dot Solids. *Nat. Nanotechnol.* 2012, 7 (9), 577-582.

(29) Kim, D.; Kim, D. H.; Lee, J. H.; Grossman, J. C. Impact of Stoichiometry on the Electronic Structure of PbS Quantum Dots. *Phys. Rev. Lett.* 2013, 110 (19), 196802:1-5.

(30) Yamauchi, T.; Isobe, M.; Ueda, Y. Charge Order and Superconductivity in Vanadium Oxides. *Solid State Sci.* 2005, 7 (7), 874-881.

(31) Walsh, A.; Payne, D. J.; Egdell, R. G.; Watson, G. W. Stereochemistry of Post-Transition Metal Oxides: Revision of the Classical Lone Pair Model. *Chem. Soc. Rev.* 2011, 40 (9), 4455-4463.

(32) Stoltzfus, M. W.; Woodward, P. M.; Seshadri, R.; Klepeis, J. H.; Bursten, B. Structure and Bonding in $SnWO_4$, $PbWO_4$, and $BiVO_4$: Lone Pairs vs Inert Pairs. *Inorg. Chem.* 2007, 46 (10), 3839-3850.

(33) Jesus, L. R. De; Zhao, Y.; Horrocks, G. A.; Andrews, J. L.; Stein, P.; Xu, B.-X.; Banerjee, S. Lithiation across Interconnected $V_2O_5$ Nanoparticle Networks. *J. Mater. Chem. A* 2017, 5, 20141-20152.

(34) Andrews, J. L.; De Jesus, L. R.; Tolhurst, T. M.; Marley, P. M.; Moewes, A.; Banerjee, S.; Jesus, L. R. De; Tolhurst, T. M.; Marley, P. M.; Moewes, A.; Banerjee, S. Intercalation-Induced Exfoliation and Thickness-Modulated Electronic Structure of a Layered Ternary Vanadium Oxide. *Chem. Mater.* 2017, 29, 3285-3294.

(35) Horrocks, G. A.; Parija, A.; De Jesus, L. R.; Wangoh, L.; Sallis, S.; Luo, Y.; Andrews, J. L.; Jude, J.; Fischer, D. A.; Prendergast, D.; Piper, L. F. J.; Banerjee, S. Mitigating Cation Diffusion Limitations and Intercalation-Induced

(36) Marley, P. M.; Banerjee, S. Reversible Interconversion of a Divalent Vanadium Bronze between δ and β Quasi-1D Structures. *Inorg. Chem.* 2012, 51 (9), 5264-5269.

(37) Marley, P. M.; Singh, S.; Abtew, T. A.; Jaye, C.; Fischer, D. A.; Zhang, P.; Sambandamurthy, G.; Banerjee, S. Electronic Phase Transitions of δ-$Ag_xV_2O_5$ Nanowires: Interplay between Geometric and Electronic Structures. *J. Phys. Chem. C* 2014, 118 (36), 21235-21243.

(38) Ganne, M.; Jouanneaux, A.; Tournoux, M.; Le Bail, A. Structure and Phase Transitions of Low-Dimensional Thallium Vanadium Bronze $Tl_xV_2O_5$ (0.44<x<0.48). *J. Solid State Chem.* 1992, 97 (1), 186-198.

(39) Marley, P. M.; Abtew, T. A.; Farley, K. E.; Horrocks, G. A.; Dennis, R. V.; Zhang, P.; Banerjee, S. Emptying and Filling a Tunnel Bronze. *Chem. Sci.* 2015, 6 (3), 1712-1718.

(40) Soni, U.; Arora, V.; Sapra, S. Wurtzite or Zinc Blende? Surface Decides the Crystal Structure of Nanocrystals. *CrystEngComm* 2013, 15 (27), 5458-5463.

(41) Whittingham, M. S.; Dines, M. B. N-Butyllithium—An Effective, General Cathode Screening Agent. *J. Electrochem. Soc.* 1977, 124 (9), 1387-1388.

(42) Lee, K. T.; Ramesh, T. N.; Nan, F.; Botton, G.; Nazar, L. F. Topochemical Synthesis of Sodium Metal Phosphate Olivines for Sodium-Ion Batteries. *Chem. Mater.* 2011, 23 (16), 3593-3600.

(43) Parize, J.-L.; Medouar, A.; Savariault, J.-M.; Ballivet-Tkatchenko, D.; Galy, J. Formation of Sodium and Copper Vanadium Oxibronzes via Oxalate Decomposition: Thermal and X-Ray Studies. *Mater. Res. Bull.* 1989, 24 (9), 1147-1153.

(44) Patridge, C. J.; Wu, T.-L.; Sambandamurthy, G.; Banerjee, S. Colossal Above-Room-Temperature Metal-Insulator Switching of a Wadsley-Type Tunnel Bronze. *Chem. Commun.* 2011, 47 (15), 4484-4486.

(45) Wahila, M. J.; Butler, K. T.; Lebens-higgins, Z. W.; Hendon, C. H.; Nandur, A. S.; Treharne, R. E.; Quackenbush, N. F.; Sallis, S.; Mason, K.; Paik, H.; Schlom, D. G.; Woicik, J. C.; Guo, J.; Arena, D. A.; White, B. E.; Watson, G. W.; Walsh, A.; Piper, L. F. J Lone-Pair Stabilization in Transparent Amorphous Tin Oxides: A Potential Route to p-Type Conduction Pathways. *Chem. Mater.* 2016, 28, 4706-4713.

(46) Hanyš, P.; Janeček, P.; Matolín, V.; Korotcenkov, G.; Nehasil, V. XPS and TPD Study of Rh/$SnO_2$ System—Reversible Process of Substrate Oxidation and Reduction. *Surf. Sci.* 2006, 600, 4233-4238.

(47) Walsh, A.; Watson, G. W. Influence of the Anion on Lone Pair Formation in Sn(II) Monochalcogenides: A DFT Study. *J. Phys. Chem. B* 2005, 109 (40), 18868-18875.

(48) Dollimore, D.; Griffiths, D. L.; Nicholson, D. The Thermal Decomposition of Oxalates. Part II. Thermogravimetric Analysis of Various Oxalates in Air and in Nitrogen. *J. Chem. Soc.* 1963, 2617-2623.

(49) Vogel, R.; Hoyer, P.; Weller, H. Quantum-Sized PbS, CdS, $Ag_2S$, $Sb_2S_3$, and $Bi_2S_3$ Particles as Sensitizers for Various Nanoporous Wide-Bandgap Semiconductors. *J. Phys. Chem.* 1994, 98 (12), 3183-3188.

(50) Lee, H. J.; Chen, P.; Moon, S. J.; Sauvage, F.; Sivula, K.; Bessho, T.; Gamelin, D. R.; Comte, P.; Zakeeruddin, S. M.; Seok, S. II; Grätzel, M.; Nazeeruddin, Md. K. Regenerative PbS and CdS Quantum Dot Sensitized Solar Cells with a Cobalt Complex as Hole Mediator. *Langmuir* 2009, 25 (13), 7602-7608.

(51) Eyert, V.; Höck, K.-H. Electronic Structure of $V_2O_5$: Role of Octahedral Deformations. *Phys. Rev. B* 1998, 57 (20), 12727-12737.

(52) Maganas, D.; Roemelt, M.; Hävecker, M.; Trunschke, A.; Knop-Gericke, A.; Schlögl, R.; Neese, F. First Principles Calculations of the Structure and V L-Edge X-Ray Absorption Spectra of $V_2O_5$ Using Local Pair Natural Orbital Coupled Cluster Theory and Spin-Orbit Coupled Configuration Interaction Approaches. *Phys. Chem. Chem. Phys.* 2013, 15 (19), 7260-7276.

(53) Velazquez, J. M.; Jaye, C.; Fischer, D. a; Banerjee, S. Near Edge X-Ray Absorption Fine Structure Spectroscopy Studies of Single-Crystalline $V_2O_5$ Nanowire Arrays. *J. Phys. Chem. C* 2009, 113 (18), 7639-7645.

(54) Tolhurst, T. M.; Leedahl, B.; Andrews, J. L.; Marley, P. M.; Banerjee, S.; Moewes, A. Contrasting 1D Tunnel-Structured and 2D Layered Polymorphs of $V_2O_5$: Relating Crystal Structure and Bonding to Band Gaps and Electronic Structure. *Phys. Chem. Chem. Phys.* 2016, 18 (23), 15798-15806.

(55) De Jesus, L. R.; Horrocks, G. A.; Liang, Y.; Parija, A.; Jaye, C.; Wangoh, L.; Wang, J.; Fischer, D. A.; Piper, L. F. J.; Prendergast, D.; Banerjee, S. Mapping Polaronic States and Lithiation Gradients in Individual $V_2O_5$ Nanowires. *Nat. Commun.* 2016, 7, 12022.

(56) Hinuma, Y.; Grüneis, A.; Kresse, G.; Oba, F. Band Alignment of Semiconductors from Density-Functional Theory and Many-Body Perturbation Theory. *Phys. Rev. B* 2014, 90 (15), 155405.

(57) Jasieniak, J.; Califano, M.; Watkins, S. E. Size-Dependent Valence and Conduction Band-Edge Energies of Semiconductor Nanocrystals. *ACS Nano* 2011, 5 (7), 5888-5902.

(58) Lee, J. R. I.; Meulenberg, R. W.; Hanif, K. M.; Mattoussi, H.; Klepeis, J. E.; Terminello, L. J.; Van Buuren, T. Experimental Observation of Quantum Confinement in the Conduction Band of CdSe Quantum Dots. *Phys. Rev. Lett.* 2007, 98 (14), 146803:1-4.

(59) Bawendi, M. G.; Wilson, W. L.; Rothberg, L.; Carroll, P. J.; Jedju, T. M.; Steigerwald, M. L.; Brus, L. E. Electronic Structure and Photoexcited-Carrier Dynamics in Nanometer-Size CdSe Clusters. *Phys. Rev. Lett.* 1990, 65 (13), 1623-1626.

(60) Klimov, V. I. Optical Nonlinearities and Ultrafast Carrier Dynamics in Semiconductor Nanocrystals. *J. Phys. Chem. B* 2000, 104 (26), 6112-6123.

(61) Klimov, V. I. Spectral and Dynamical Properties of Multiexcitons in Semiconductor Nanocrystals. *Annu. Rev. Phys. Chem.* 2007, 635-673.

(62) Smith, A. M.; Lane, L. A.; Nie, S. Mapping the Spatial Distribution of Charge Carriers in Quantum-Confined Heterostructure. *Nat. Commun.* 2014, 5, 4506.

(63) Marcus, R. A. On the Theory of Oxidation-Reduction Reactions Involving Electron Transfer. I. *J. Chem. Phys.* 1956, 24 (5), 966-978.

(64) Marcus, R. A. Electron Transfer Reactions in Chemistry: Theory and Experiment. *Rev. Mod. Phys.* 1993, 65 (3), 599-610.

(65) Dibbell, R. S.; Watson, D. F. Distance-Dependent Electron Transfer in Tethered Assemblies of CdS Quantum Dots and $TiO_2$ Nanoparticles. *J. Phys. Chem. C* 2009, 113 (22), 3139-3149.

(66) Guijarro, N.; Shen, Q.; Giménez, S.; Mora-Seró, J.; Bisquert, J.; Lana-Villarreal, T.; Toyoda, T.; Gómez, R.

Direct Correlation between Ultrafast Injection and Photoanode Performance in Quantum Dot Sensitized Solar Cells. *J. Phys. Chem. C* 2010, 114 (50), 22352-22360.

(67) Lee, T.; Duncan, D. A. A Two-Color Beamline for Electron Spectroscopies at Diamond Light Source. *Synchrtron Radiat. News* 2018, 31 (4), 16-22.

REFERENCES LIST 2

(1) Hohenberg, P.; Kohn, W. Inhomogeneous Electron Gas. *Phys. Rev. B* 1964, 136 (3), 864-871.
(2) Kohn, W.; Sham, L. J. Self-Consistent Equations Including Exchange and Correlation Effects. *Phys. Rev. A* 1965, 140 (4), 1133-1138.
(3) Giannozzi, P.; Baroni, S.; Bonini, N.; Calandra, M.; Car, R.; Cavazzoni, C.; Ceresoli, D.; Chiarotti, G. L.; Cococcioni, M.; Dabo, I.; Corso, A. D.; de Gironcoli, S.; Fabris, S.; Fratesi, G.; Gebauer, R.; Gerstmann, U.; Gougoussis, C.; Kokalj, A.; Lazzeri, M.; Martin-Samos, L.; Marzari, N.; Mauri, F.; Mazzarello, R.; Paoini, S.; Pasquarello, A.; Paulatto, L.; Sbraccia, C.; Scandolo, S.; Sclauzero, G.; Seitsonen, A. P.; Smogunov, A.; Umari, P.; Wentzcovitch, R. M. QUANTUM ESPRESSO: A Modular and Open-Source Software Project for Quantum Simulations of Materials. *J. Phys. Condens. Matter* 2009, 21 (39), 395502.
(4) Perdew, J. P.; Burke, K.; Ernzerhof, M. Generalized Gradient Approximation Made Simple. *Phys. Rev. Lett.* 1996, 77 (18), 3865-3868.
(5) Vanderbilt, D. Soft Self-Consistent Pseudopotentials in a Generalized Eigenvalue Formalism. *Phys. Rev. B* 1990, 41 (11), 7892-7895.
(6) Silversmit, G.; Depla, D.; Poelman, H.; Marin, G. B.; De Gryse, R. Determination of the V 2p XPS Binding Energies for Different Vanadium Oxidation States ($V^{5+}$ to $V^{0+}$) *J. Electron Spectros. Relat. Phenomena* 2004, 135, 167-175.
(7) Marley, P. M.; Abtew, T. A.; Farley, K. E.; Horrocks, G. A.; Dennis, R. V.; Zhang, P.; Banerjee, S. Emptying and Filling a Tunnel Bronze. *Chem. Sci.* 2015, 6 (3), 1712-1718.
(8) Andrews, J. L.; Mukherjee, A.; Yoo, H. D.; Parija, A.; Marley, P. M.; Fakra, S.; Prendergast, D.; Cabana, J.; Klie, R. F.; Banerjee, S. Reversible Mg-Ion Insertion in a Metastable One-Dimensional Polymorph of $V_2O_5$. *Chem* 2018, 4 (3), 564-585.
(9) Hu, W.; Du, X.; Wu, Y.; Wang, L. Novel $\varepsilon$-$Cu_{0.95}V_2O_5$ Hollow Microspheres and $\alpha CuV_2O_5$ Nanograins: Facile Synthesis and Application in Lithium-Ion Batteries. *J. Power Sources* 2013, 237, 112-118.
(10) Dollimore, D.; Griffiths, D. L.; Nicholson, D. The Thermal Decomposition of Oxalates. Part II. Thermogravimetric Analysis of Various Oxalates in Air and in Nitrogen. *J. Chem. Soc.* 1963, 2617-2623.
(11) Parize, J.-L.; Medouar, A.; Savariault, J.-M.; Ballivet-Tkatchenko, D.; Galy, J. Formation of Sodium and Copper Vanadium Oxibronzes via Oxalate Decomposition: Thermal and X-Ray Studies. *Mater. Res. Bull.* 1989, 24 (9), 1147-1153.
(12) Pelcher, K. E.; Milleville, C. C.; Wangoh, L.; Chauhan, S.; Crawley, M. R.; Marley, P. M.; Piper, L. F. J.; Watson, D. F.; Banerjee, S. Integrating $\beta$-$Pb_{0.33}V_2O_5$ Nanowires with Cdse Quantum Dots: Toward Nanoscale Heterostructures with Tunable Interfacial Energetic Offsets for Charge Transfer. *Chem. Mater.* 2015, 27 (7), 2468-2479.
(13) Pelcher, K. E.; Milleville, C. C.; Wangoh, L.; Cho, J.; Sheng, A.; Chauhan, S.; Sfeir, M. Y.; Piper, L. F. J.; Watson, D. F.; Banerjee, S. Programming Interfacial Energetic Offsets and Charge Transfer in $\beta$-$Pb_{0.33}V_2O_5$/Quantum-Dot Heterostructures: Tuning Valence-Band Edges to Overlap with Midgap States. *J. Phys. Chem. C* 2016, 120 (51), 28992-29001.
(14) Milleville, C. C.; Pelcher, K. E.; Sfeir, M. Y.; Banerjee, S.; Watson, D. F. Directional Charge Transfer Mediated by Mid-Gap States: A Transient Absorption Spectroscopy Study of CdSe Quantum Dot/$\beta$-$Pb_{0.33}V_2O_5$ Heterostructures. *J. Phys. Chem. C* 2016, 120 (9), 5221-5232.
(15) Marley, P. M.; Stabile, A. A.; Kwan, C. P.; Singh, S.; Zhang, P.; Sambandamurthy, G.; Banerjee, S. Charge Disproportionation and Voltage-Induced Metal-Insulator Transitions Evidenced in $\beta$-$Pb_xV_2O_5$ Nanowires. *Adv. Funct. Mater.* 2013, 23 (2), 153-160.
(16) Toby, B. H. EXPGUI, a Graphical User Interface for GSAS. *J. Appl. Crystallogr.* 2001, 34 (2), 210-213.
(17) Momma, K.; Izumi, F. VESTA 3 for Three-Dimensional Visualization of Crystal, Volumetric and Morphology Data. *J. Appl. Crystallogr.* 2011, 44 (6), 1272-1276.
(18) Shannon, R. D. Revised Effective Ionic Radii and Systematic Studies of Interatomic Distances in Halides and Chalcogenides. *Acta Crystallogr.* Sect. A 1976, 32 (5), 751-767.
(19) Kumar, S.; Nann, T. Hexagonal CdTe Nanoparticles of Various Morphologies. *Chem. Commun.* 2003, 19, 2478-2479.
(20) Hinuma, Y.; Grüneis, A.; Kresse, G.; Oba, F. Band Alignment of Semiconductors from Density-Functional Theory and Many-Body Perturbation Theory. *Phys. Rev. B* 2014, 90 (15), 155405.

REFERENCES LIST 3

1. J. Sun, D. K. Zhong and D. R. Gamelin, En. Environ. Sci. 3, 1252-1261 (2010).
2. R. S. Selinsky, Q. Ding, M. S. Faber, J. C. Wright and S. Jin, Chem. Soc. Rev. 42, 2963-2985 (2013).
3. S. Kundu and A. Patra, Chem. Rev. 117, 712-757 (2017).
4. Z. Pan, H. Rao, I. Mora-Seró, J. Bisquert and X. Zhong, Chem. Soc. Rev. 47, 7659-7702 (2018).
5. J. Cho, A. Sheng, N. Suwandaratne, L. Wangoh, J. L. Andrews, P. Zhang, L. F. J. Piper, D. F. Watson and S. Banerjee, Acc. Chem. Res. 52, 645-655 (2019).
6. S. Yue, L. Li, S. C. McGuire, N. Hurley and S. S. Wong, En. Environ. Sci. 12, 1454-1494 (2019).
7. S. Kim, B. Fisher, H.-J. Eisler and M. Bawendi, J. Am. Chem. Soc. 125, 11466-11467 (2003).
8. H. Zhu, N. Song and T. Lian, J. Am. Chem. Soc. 133, 8762-8771 (2011).
9. L. E. Brus, J. Chem. Phys. 80 (9), 4403-4409 (1984).
10. W. W. Yu, L. Qu, W. Guo and X. Peng, Chem. Mater. 15, 2854-2860 (2003).
11. P. V. Kamat, J. Phys. Chem. C 112, 18737-18753 (2008).
12. D. Bera, L. Qian, T.-K. Tseng and P. H. Holloway, Materials 3, 2260-2345 (2010).
13. D. F. Watson, J. Phys. Chem. Lett. 1, 2299-2309 (2010).
14. N. C. Anderson and J. S. Owen, Chem. Mater. 25, 69-76 (2013).
15. N. C. Anderson, M. P. Hendricks, J. J. Choi and J. S. Owen, J. Am. Chem. Soc. 135, 18536-18548 (2013).
16. M. A. Boles, D. Ling, T. Hyeon and D. V. Talapin, Nat. Mater. 15, 141-153 (2016).
17. M. S. Kodaimati, K. P. McClelland, C. He, S. Lian, Y. Jiang, Z. Zhang and E. A. Weiss, Inorg. Chem. 57, 3659-3670 (2018).

18. K. Tvrdy, P. A. Frantsuzov and P. V. Kamat, Proc. Natl. Acad. Sci. U.S.A. 108, 29-34 (2011).
19. D. G. Sellers and D. F. Watson, J. Phys. Chem. C 116, 19215-19224 (2012).
20. R. S. Dibbell and D. F. Watson, J. Phys. Chem. C 113, 3139-3149 (2009).
21. D. G. Sellers, A. A. Button, J. N. Nasca, G. E. Wolfe II, S. Chauhan and D. F. Watson, J. Phys. Chem. C 119, 27737-27748 (2015).
22. D. Gross, A. S. Susha, T. A. Klar, E. Da Como, A. L. Rogach and J. Feldmann, Nano Lett. 8, 1482-1485 (2008).
23. M. Wu, P. Mukherjee, D. N. Lamont and D. H. Waldeck, J. Phys. Chem. C 114, 5751-5759 (2010).
24. A. Dalui, A. Chakraborty, U. Thupakula, A. H. Khan, S. Sengupta, B. Satpati, D. D. Sarma, I. Dasgupta and S. Acharya, J. Phys. Chem. C 120, 10118-10128 (2016).
25. B. Graff, B. P. Bloom, E. Wierzbinski and D. H. Waldeck, J. Am. Chem. Soc. 138, 13260-13270 (2016).
26. L. R. De Jesus, G. A. Horrocks, Y. Liang, A. Parija, C. Jaye, L. Wangoh, J. Wang, D. A. Fischer, L. F. J. Piper, D. Prendergast and S. Banerjee, Nat. Comm. 7, 12022 (2016).
27. G. A. Horrocks, M. F. Likely, J. M. Velazquez and S. Banerjee, J. Mater. Chem. A 1, 15265-15277 (2013).
28. J. M. Velazquez, C. Jaye, D. A. Fischer and S. Banerjee, J. Phys. Chem. C 113, 7639-7645 (2009).
29. J. L. Andrews, J. Cho, L. Wangoh, N. Suwandaratne, A. Sheng, S. Chauhan, K. Nieto, A. Mohr, K. J. Kadassery, M. R. Popeil, P. K. Thakur, M. Y. Sfeir, D. C. Lacy, T.-L. Lee, P. Zhang, D. F. Watson, L. F. J. Piper and S. Banerjee, J. Am. Chem. Soc. 140, 17163-17174 (2018).
30. Y.-L. Chan, S.-Y. Pung and S. Sreekantan, J. Catal., 370696 (2014).
31. K. Schwarz and P. Blaha, Comp. Mater. Sci. 28, 259-273 (2003).
32. P. Blaha, K. Schwarz, G. Madsen, D. Kvasnicka and J. Luitz, (WIEN2K, Technische Universitat Wien, Austria, 2007).
33. J. S. Nevins, K. M. Coughlin and D. F. Watson, ACS Appl. Mater. Interfaces 3, 4242-4253 (2011).
34. K. M. Coughlin, J. S. Nevins and D. F. Watson, ACS Appl. Mater. Interfaces 5, 8649-8654 (2013).
35. K. E. Pelcher, C. C. Milleville, L. Wangoh, S. Chauhan, M. R. Crawley, P. M. Marley, L. F. J. Piper, D. F. Watson and S. Banerjee, Chem. Mater. 27, 2468-2479 (2015).
36. C. C. Milleville, K. E. Pelcher, M. Y. Sfeir, S. Banerjee and D. F. Watson, J. Phys. Chem. C 120, 5221-5232 (2016).
37. P. Wang, M. Wang, J. Zhang, C. Li, X. Xu and Y. Jin, ACS Appl. Mater. Interfaces 9, 35712-35720 (2017).
38. F. Jalilehvand, B. O. Leung and V. Mah, Inorg. Chem. 48, 5758-5771 (2009).
39. Y.-K. Kim, S. J. Park, J. P. Koo, G. T. Kim, S. Hong and J. S. Ha, Nanotechnology 18, 015304 (2007).
40. S. Myung, K. Heo, M. Lee, Y.-H. Choi, S.-H. Hong and S. Hong, Nanotechnology 18, 205304 (2007).
41. S. Banerjee, S. Jia, D.-I. Kim, R. D. Robinson, J. Kysar, J. Bevk and I. P. Herman, Nano Lett. 6, 175-180 (2006).
42. A. P. Alivisatos, T. D. Harris, P. J. Carroll, M. L. Steigerwald and L. E. Brus, J. Chem. Phys. 90, 3463-3468 (1989).
43. R. Rossetti, S. Nakahara and L. E. Brus, J. Chem. Phys. 79 (2), 1086-1088 (1983).
44. K. Han, W. B. Im, J. Heo and W. J. Chung, Chem. Comm. 52, 3564-3567 (2016).
45. P. T. C. Freire, M. A. Araujo Silva, V. C. S. Reynoso, A. R. Vaz and V. Lemos, Physicsal Review B 55, 6743-6746 (1997).
46. P. M. Amirtharaj and F. H. Pollak, Appl. Phys. Lett. 45, 789-791 (1984).
47. P. M. Marley, T. A. Abtew, K. E. Farley, G. A. Horrocks, R. V. Dennis, P. Zhang and S. Banerjee, Chem. Sci. 6, 1712-1718 (2015).
48. E. Menéndez-Proupin, A. Amézaga and N. Cruz Hernández, Physica B 452, 119-123 (2014).
49. V. Kocevski, J. Rusz, O. Eriksson and D. D. Sarma, Sci. Rep. 5, 10865 (2015).
50. C. G. Van de Walle and J. Neugebauer, Nature 423, 626-628 (2003).
51. H.-X. Liu, F.-L. Tang, H.-T. Xue, Y. Zhang, Y.-W. Cheng and Y.-D. Feng, Chin. Phys. B 25, 123101 (2016).
52. K. E. Pelcher, C. C. Milleville, L. Wangoh, J. Cho, A. Sheng, S. Chauhan, M. Y. Sfeir, L. F. J. Piper, D. F. Watson and S. Banerjee, J. Phys. Chem. C 120, 28992-29001 (2016).
53. H. Zhu and T. Lian, En. Environ. Sci. 5, 9406-9418 (2012).
54. A. J. Morris-Cohen, M. T. Frederick, L. C. Cass and E. A. Weiss, J. Am. Chem. Soc. 133, 10146-10154 (2011).
55. J. Huang, Z. Huang, S. Jin and T. Lian, J. Am. Chem. Soc. 112, 19734-19738 (2008).
56. D. A. Hines, R. P. Forrest, S. A. Corcelli and P. V. Kamat, J. Phys. Chem. B 119, 7439-7446 (2015).
57. A. Othonos, C. Christofides and M. Zervos, Appl. Phys. Lett. 103, 133112 (2013).
58. A. J. Morris-Cohen, M. Malicki, M. D. Peterson, J. W. J. Slavin and E. A. Weiss, Chem. Mater. 25 (1155-1165) (2013).
59. C. Burda, S. Link, M. Mohamed and M. El-Sayed, J. Phys. Chem. B 105, 12286-12292 (2001).
60. S. Rawalekar, S. Kaniyankandy, S. Verma and H. N. Ghosh, J. Phys. Chem. C 114, 1460-1466 (2010).
61. P. Singhal and H. N. Ghosh, J. Phys. Chem. C 2014 (118), 16358-16365 (2014).
62. V. I. Klimov, D. W. McBranch, C. A. Leatherdale and M. G. Bawendi, Phys. Rev. B: Condens. Matter 60, 13740-13749 (1999).

We claim:

1. A composition comprising a $M_xV_2O_5$ material, said composition comprising $Ni_xV_2O_5$, $Pb_xV_2O_5$, $Co_xV_2O_5$, $Zn_xV_2O_5$, $Sn_xV_2O_5$, $Hg_xV_2O_5$, $Tl_xV_2O_5$, $Ga_xV_2O_5$, $In_xV_2O_5$, or a combination thereof, where x is 0.0000001 to 0.67, provided that in the case of $Pb_xV_2O_5$, x may not be 0.27-0.33, wherein the composition comprises a plurality of quantum dots or a quantum-confined thin film disposed on at least a portion of the surface of the $M_xV_2O_5$ material.

2. The composition of claim 1, wherein the composition has the following nominal composition: $Ni_{0.331}V_2O_5$ or $Sn_{0.23}V_2O_5$.

3. The composition of claim 1, wherein the composition has the following structure:

i) lattice parameters, and atom positions for $Sn_{0.225}V_2O_5$

| a = 15.339(2) Å; b = 3.6217(3) Å; c = 10.0781(8) Å; β = 109.829(7)°; V = 526.67(6) Å³; $\chi^2$ = 6.147; Rw = 6.52%; wRp = 8.96% | | | | | |
|---|---|---|---|---|---|
| Atom | x | y | z | Occupancy | Uiso |
| Sn(1) | 1.0095(12) | 0.00 | 0.412(2) | 0.225(6) | 0.006 |
| V(1) | 0.1189(8) | 0.00 | 0.1209(11) | 1.0 | 0.008 |
| V(2) | 0.3511(9) | 0.00 | 0.1032(14) | 1.0 | 0.008 |
| V(3) | 0.2965(8) | 0.00 | 0.4175(13) | 1.0 | 0.008 |

-continued

| a = 15.339(2) Å; b = 3.6217(3) Å; c = 10.0781(8) Å; β = 109.829(7)°; V = 526.67(6) Å³; $\chi^2$ = 6.147; Rw = 6.52%; wRp = 8.96% | | | | | |
|---|---|---|---|---|---|
| Atom | x | y | z | Occupancy | Uiso |
| O(1) | 0.00(0) | 0.00(0) | 0.00(0) | 1.0 | 0.015 |
| O(2) | 0.0958(25) | 0.00 | 0.285(4) | 1.0 | 0.015 |
| O(3) | 0.1529(24) | 0.50 | 0.095(4) | 1.0 | 0.015 |
| O(4) | 0.2533(24) | 0.00 | 0.214(4) | 1.0 | 0.015 |
| O(5) | 0.4482(23) | 0.00 | 0.254(4) | 1.0 | 0.015 |
| O(6) | 0.3258(23) | 0.50 | 0.0228(33) | 1.0 | 0.015 |
| O(7) | 0.4129(27) | 0.00 | 0.518(4) | 1.0 | 0.015 |
| O(8) | 0.2748 | 0.50 | 0.3861 | 1.0 | 0.015 | and/or bond angles and lengths for $MO_x$ polyhedra for $Sn_{0.225}V_2O_5$

| V—O Polyhedra | V—O | Distance (Å) | O—V—O | Angle (°) |
|---|---|---|---|---|
| V(1)O₆ Octahedra | V(1)—O(1) | 1.818(10) | O(1)—V(1)—O(3) | 99.5(11) |
| | | | O(1)—V(1)—O(4) | 167.9(14) |
| | V(1)—O(2) | 1.81(4) | O(1)—V(1)—O(6) | 95.4(10) |
| | | | O(2)—V(1)—O(3) | 105.8(11) |
| | V(1)—O(3) | 1.927(13) | O(2)—V(1)—O(3) | 105.8(11) |
| | | | O(2)—V(1)—O(4) | 93.5(15) |
| | V(1)—O(3) | 1.927(13) | O(2)—V(1)—O(6) | 166.0(16) |
| | | | O(3)—V(1)—O(3) | 140.0(22) |
| | V(1)—O(4) | 1.954(35) | O(3)—V(1)—O(4) | 77.1(12) |
| | | | O(3)—V(1)—O(6) | 71.7(12) |
| | V(1)—O(6) | 1.91(4) | O(3)—V(1)—O(4) | 77.1(11) |
| | | | O(3)—V(1)—O(3) | 71.7(11) |
| | | | O(4)—V(1)—O(6) | 72.5(15) |
| V(2)O₆ Octahedra | V(2)—O(3) | 1.98(4) | O(3)—V(2)—O(4) | 137.4(13) |
| | | | O(3)—V(2)—O(5) | 127.5(21) |
| | V(2)—O(4) | 2.15(4) | O(3)—V(2)—O(6) | 69.5(10) |
| | | | O(3)—V(2)—O(6) | 69.5(10) |
| | V(2)—O(5) | 1.730(28) | O(4)—V(2)—O(5) | 95.0(18) |
| | | | O(4)—V(2)—O(6) | 98.0(14) |
| | V(2)—O(6) | 1.968(13) | O(4)—V(2)—O(6) | 98.0(14) |
| | | | O(5)—V(2)—O(6) | 110.6(10) |
| | V(2)—O(6) | 1.968(13) | O(5)—V(2)—O(6) | 110.6(10) |
| | V(2)—O(6) | 2.576(26) | O(5)—V(2)—O(6) | 133.9(17) |
| V(3)O₅ Square Pyramid | V(3)—O(4) | 1.926(35) | O(4)—V(3)—O(7) | 122.5(16) |
| | V(3)—O(7) | 1.728(30) | O(4)—V(3)—O(7) | 80.8(4) |
| | V(3)—O(8) | 1.8490(24) | O(4)—V(3)—O(8) | 80.8(4) |
| | V(3)—O(8) | 1.8490(24) | O(7)—V(3)—O(8) | 100.98(34) |
| | V(3)—O(8) | 2.565(12) | O(7)—V(3)—O(8) | 100.98(34) |
| | | | O(8)—V(3)—O(8) | 156.7(7) |
| Sn(1)O₇ Distorted pentagonal bipyramid | Sn(1)—O(2) | 2.13(5) | O(2)—Sn(1)—O(5) | 77.4(12) |
| | | | O(2)—Sn(1)—O(5) | 77.4(12) |
| | Sn(1)—O(5) | 2.385(24) | O(2)—Sn(1)—O(7) | 79.0(12) |
| | | | O(2)—Sn(1)—O(7) | 79.0(12) |
| | Sn(1)—O(5) | 2.385(24) | O(5)—Sn(1)—O(5) | 98.8(13) |
| | Sn(1)—O(7) | 2.771(31) | O(5)—Sn(1)—O(7) | 68.2(9) |
| | Sn(1)—O(7) | 2.771(31) | O(5)—Sn(1)—O(7) | 155.1(17) |
| | Sn(1)—O(7) | 2.150(19) | O(5)—Sn(1)—O(7) | 68.2(9) |
| | Sn(1)—O(7) | 2.150(19) | O(7)—Sn(1)—O(7) | 114.7(16) | ii) lattice parameters, and atom positions for $\beta$-$Ni_{0.333}V_2O_5$

| a = 15.3711(7) Å, b = 3.6100(1) Å, c = 10.0726(5) Å, $\beta$ = 109.968(4) Å, V = 525.34(3) Å$^3$ $\chi^2$ = 6.379, Rw = 4.85%, wRp = 6.81% | | | | |
|---|---|---|---|---|
| Atom | x | Y | z | Occupancy | Uiso |
| Ni(1) | 1.0042 | 0.000(0) | 0.3926(11) | 0.507(5) | 0.008 |
| V(1) | 0.1240(5) | 0.000(0) | 0.1138(7) | 1.0 | 0.008 |
| V(2) | 0.3392(4) | 0.000(0) | 0.1067(6) | 1.0 | 0.008 |
| V(3) | 0.2881(5) | 0.000(0) | 0.4234(6) | 1.0 | 0.008 |
| O(1) | 0.0000(0) | 0.000(0) | 0.0000(0) | 1.0 | 0.0126 |
| O(2) | 0.1083(15) | 0.000(0) | 0.2653(19) | 1.0 | 0.0126 |

-continued

| a = 15.3711(7) Å, b = 3.6100(1) Å, c = 10.0726(5) Å, $\beta$ = 109.968(4) Å, V = 525.34(3) Å$^3$ $\chi^2$ = 6.379, Rw = 4.85%, wRp = 6.81% | | | | |
|---|---|---|---|---|
| Atom | x | Y | z | Occupancy | Uiso |
| O(3) | 0.1321(16) | 0.500(0) | 0.0555(19) | 1.0 | 0.0126 |
| O(4) | 0.2860(15) | 0.000(0) | 0.2501(21) | 1.0 | 0.0126 |
| O(5) | 0.4400(13) | 0.000(0) | 0.2324(21) | 1.0 | 0.0126 |
| O(6) | 0.3129(14) | 0.500(0) | 0.1005(21) | 1.0 | 0.0126 |
| O(7) | 0.4083(14) | 0.000(0) | 0.4670(18) | 1.0 | 0.0126 |
| O(8) | 0.2496(19) | 0.500(0) | 0.4100(0) | 1.0 | 0.0126 | and/or bond angles and lengths for $\beta$-$Ni_{0.331}V_2O_5$

| V—O Polyhedra | V—O | Distance (Å) | O—V—O | Angle (°) |
|---|---|---|---|---|
| V(1)O$_6$ Octahedra | V(1)—O(1) | 1.859(7) | O(1)—V(1)—O(2) | 97.4(9) |
| | V(1)—O(2) | 1.624(18) | O(1)—V(1)—O(3) | 88.3(7) |
| | V(1)—O(3) | 1.915(7) | | 88.3(7) |
| | V(1)—O(3) | 1.915(7) | O(2)—V(1)—O(3) | 109.5(6) |
| | V(1)—O(4) | 2.267(18) | | 109.5(6) |
| | V(1)—O(6) | 2.65127(12) | O(3)—V(1)—O(3) | 140.9(12) |
| V(2)O$_6$ Octahedra | V(2)—O(3) | 1.832(20) | O(3)—V(2)—O(4) | 169.0(11) |
| | | | O(3)—V(2)—O(5) | 103.7(11) |
| | V(2)—O(4) | 1.888(20) | O(3)—V(2)—O(6) | 95.0(8) |
| | | | | 95.0(8) |
| | V(2)—O(5) | 1.632(18) | O(4)—V(2)—O(5) | 87.2(9) |
| | | | O(4)—V(2)—O(6) | 83.0(7) |
| | V(2)—O(6) | 1.846(5) | | 83.0(7) |
| | | | O(5)—V(2)—O(6) | 99.5(7) |
| | V(2)—O(6) | 1.846(5) | | 99.5(7) |
| | V(2)—O(6) | 2.548(17) | | 155.8(14) |
| V(3)O$_5$ Square pyramid | V(3)—O(4) | 2.872(11) | O(4)—V(3)—O(7) | 84.7(9) |
| | V(3)—O(7) | 2.872(11) | O(4)—V(3)—O(8) | 91.75(27) |
| | | | | 91.75(27) |
| | V(3)—O(8) | 1.8903(20) | | 162.8(8) |
| | V(3)—O(8) | 1.8903(20) | O(7)—V(3)—O(8) | 107.27(20) |
| | | | | 107.27(20) |
| | V(3)—O(8) | 1.953(7) | | 112.5(7) |
| | | | O(8)—V(3)—O(8) | 145.4(4) |
| | | | | 83.31(21) |
| | | | | 83.31(21) |
| Ni(1)O$_7$ Pentagonal bipyramid | Ni(1)—O(2) | 2.368(24) | O(2)—Ni(1)—O(7) | 135.33(34) |
| | Ni(1)—O(5) | 2.397(14) | | 88.5(6) |
| | Ni(1)—O(5) | 2.397(14) | O(5)—Ni(1)—O(5) | 97.7(8) |
| | Ni(1)—O(7) | 2.402(13) | O(5)—Ni(1)—O(7) | 61.8(5) |
| | | | | 125.0(6) |
| | | | | 168.9(9) |
| | Ni(1)—O(7) | 2.402(13) | | 81.3(4) |
| | Ni(1)—O(7) | 2.597(15) | O(2)—Ni(1)—O(5) | 80.4(7) |
| | | | O(7)—Ni(1)—O(7) | 97.5(7) |
| | Ni(1)—O(7) | 2.597(15) | | 127.7(6) |
| | | | | 64.3(8) | or iii) lattice parameters for $\beta$-$M_xV_2O_5$ materials, wherein M is Ni, Co, Sn, and Pb

| Sample | x | a (Å) | b (Å) | c (Å) | $\beta$ (Å) | V (Å) | Radius (Å)[18] |
|---|---|---|---|---|---|---|---|
| $\zeta$-$V_2O_5$ | NA | 15.25253(3) | 3.602132(4) | 10.104167(13) | 110.088(0) | 521.369(1) | N/A |
| $Ni_xV_2O_5$ | 0.331 | 15.3711(7) | 3.6101(1) | 10.0726(5) | 109.968(4) | 525.335(27) | 0.63 |
| $Co_xV_2O_5$ | 0.270 | 15.384 | 3.6185 | 10.0893 | 110.130 | 527.36 | 0.67 |
| $Sn_xV_2O_5$ | 0.225 | 15.339(2) | 3.6217(3) | 10.0781(8) | 109.829(7) | 526.67(6) | 1.22 |
| $Pb_xV_2O_5$ | 0.220 | 15.470(2) | 3.6153(4) | 10.083(1) | 109.396(10) | 531.947 | 1.23. |

4. The composition of claim 1, wherein the $M_xV_2O_5$ material is selected from the group consisting of nanoparticles, nanowires, nanorods, nanospheres, nanocubes, nanostars, nanosheets, and combinations thereof.

5. The composition of claim 1, wherein the $M_xV_2O_5$ material is a nanowire.

6. The composition of claim 1, wherein the $M_xV_2O_5$ material is a thin film.

7. The composition of claim 1, wherein the $M_xV_2O_5$ material is doped at an oxygen anion site with one element selected from the group consisting of S, Se, Te, P and F.

8. The composition of claim 1, wherein the quantum dots are cadmium chalcogenide quantum dots, zinc chalcogenide quantum dots, cadmium/zinc chalcogenide quantum dots, or combinations thereof.

9. The composition of claim 1, wherein the quantum-confined thin film is a cadmium chalcogenide, zinc chalcogenide, cadmium/zinc chalcogenide, or combinations thereof.

10. The composition of claim 1, wherein one or more metal cation is intercalated into the $M_xV_2O_5$ material and the metal cations are selected from the group consisting of copper cations, nickel cations, cobalt cations, zinc cations, tin cations, mercury cations, thallium cations, gallium cations, indium cations, bismuth(III) cations and combinations thereof.

\* \* \* \* \*